United States Patent
Macaluso

(10) Patent No.: US 11,117,481 B2
(45) Date of Patent: Sep. 14, 2021

(54) METHODS AND APPARATUS FOR POWERING A VEHICLE

(71) Applicant: Anthony Macaluso, San Diego, CA (US)

(72) Inventor: Anthony Macaluso, San Diego, CA (US)

(*) Notice: Subject to any disclaimer, the term of this patent is extended or adjusted under 35 U.S.C. 154(b) by 0 days.

(21) Appl. No.: 17/208,641

(22) Filed: Mar. 22, 2021

(65) Prior Publication Data

US 2021/0206283 A1    Jul. 8, 2021

Related U.S. Application Data

(63) Continuation of application No. 16/847,538, filed on Apr. 13, 2020.

(Continued)

(51) Int. Cl.
*B60L 53/24* (2019.01)
*B60L 53/16* (2019.01)
(Continued)

(52) U.S. Cl.
CPC .............. *B60L 53/24* (2019.02); *B60L 50/30* (2019.02); *B60L 50/40* (2019.02); *B60L 50/62* (2019.02);
(Continued)

(58) Field of Classification Search
CPC .......... B60L 53/24; B60L 50/62; B60L 53/16; B60L 50/40; B60L 53/18
See application file for complete search history.

(56) References Cited

U.S. PATENT DOCUMENTS 2,660,443 A    11/1953   Miller
4,214,160 A    7/1980    Fies et al.
(Continued)

FOREIGN PATENT DOCUMENTS

WO    WO 2009/149769    12/2009
WO    WO 2010/133863    11/2010
WO    WO-2010133863 A2 *  11/2010    .............. B60L 50/90

OTHER PUBLICATIONS

U.S. Appl. No. 16/847,538, filed Apr. 13, 2020, Methods and Apparatus for Powering a Vehicle.

(Continued)

*Primary Examiner* — Jared Fureman
*Assistant Examiner* — Duc M Pham
(74) *Attorney, Agent, or Firm* — Knobbe, Martens, Olson & Bear, LLP

(57) ABSTRACT

This application is directed to an apparatus for providing electrical charge to a vehicle. The apparatus comprises a driven mass, a generator, a charger, a hardware controller, and a communication circuit. The driven mass rotates in response to a kinetic energy of the vehicle and is coupled to a shaft such that rotation of the driven mass causes the shaft to rotate. The driven mass exists in one of (1) an extended position and (2) a retracted position. The generator generates an electrical output based on a mechanical input coupled to the shaft such that rotation of the shaft causes the mechanical input to rotate. The charger is electrically coupled to the generator and: receives the electrical output, generates a charge output based on the electrical output, and conveys the charge output to the vehicle. The controller controls whether the driven mass is in the extended position or the retracted position in response to a signal received from the communication circuit.

20 Claims, 22 Drawing Sheets

Related U.S. Application Data

(60) Provisional application No. 62/967,406, filed on Jan. 29, 2020, provisional application No. 62/883,523, filed on Aug. 6, 2019, provisional application No. 62/858,902, filed on Jun. 7, 2019.

(51) Int. Cl.
*B60L 53/18* (2019.01)
*B60L 50/62* (2019.01)
*B60L 53/22* (2019.01)
*B60L 50/40* (2019.01)
*B60L 50/30* (2019.01)

(52) U.S. Cl.
CPC ............. *B60L 53/16* (2019.02); *B60L 53/18* (2019.02); *B60L 53/22* (2019.02)

(56) References Cited

U.S. PATENT DOCUMENTS

| | | | |
|---|---|---|---|
| 4,314,160 | A | 2/1982 | Boodman et al. |
| 4,476,947 | A | 10/1984 | Rynbrandt |
| 5,045,646 | A | 9/1991 | Musachio |
| 5,412,293 | A * | 5/1995 | Minezawa .............. B60L 50/51 318/376 |
| 5,680,907 | A | 10/1997 | Weihe |
| 5,767,663 | A | 6/1998 | Lu |
| 5,921,334 | A | 7/1999 | Al-Dokhi |
| 6,220,381 | B1 | 4/2001 | Damron et al. |
| 6,390,215 | B1 | 5/2002 | Kodama |
| 6,502,842 | B2 | 1/2003 | Ko |
| 7,183,746 | B1 | 2/2007 | Carter |
| 7,514,803 | B2 | 4/2009 | Wilks |
| 7,547,980 | B2 | 6/2009 | Harrison |
| 7,753,010 | B2 | 7/2010 | Rutledge |
| 7,913,783 | B2 | 3/2011 | Elmaleh |
| 8,063,609 | B2 | 11/2011 | Salasoo et al. |
| 8,206,263 | B2 | 6/2012 | Tsuchikawa |
| 8,347,999 | B2 | 1/2013 | Koelsch |
| 8,712,620 | B2 | 4/2014 | Jackson |
| 8,723,344 | B1 | 5/2014 | Dierickx |
| 8,872,368 | B1 | 10/2014 | Kim et al. |
| 9,321,357 | B2 | 4/2016 | Caldeira et al. |
| 9,415,660 | B2 | 8/2016 | Koelsch |
| 9,457,666 | B2 | 10/2016 | Caldeira et al. |
| 9,981,553 | B2 | 5/2018 | Schafer et al. |
| 10,293,702 | B2 | 5/2019 | Tu et al. |
| 10,513,180 | B2 | 12/2019 | Quill |
| 10,787,089 | B1 | 9/2020 | Macaluso |
| 11,007,878 | B2 | 5/2021 | Kamino et al. |
| 2004/0012205 | A1 | 1/2004 | Sua-An |
| 2005/0224263 | A1 | 10/2005 | Vasilantone |
| 2006/0238258 | A1 | 10/2006 | D'Amore |
| 2007/0075677 | A1 | 4/2007 | Alvarez-Troncoso |
| 2007/0187957 | A1 | 8/2007 | Harrison |
| 2008/0066979 | A1 | 3/2008 | Carter |
| 2008/0223637 | A1 | 9/2008 | Bartilson |
| 2009/0033254 | A1 | 2/2009 | Nagashima et al. |
| 2009/0079417 | A1 | 3/2009 | Mort et al. |
| 2010/0019718 | A1 | 1/2010 | Salasoo et al. |
| 2013/0081886 | A1 | 4/2013 | Jaberian |
| 2013/0096759 | A1 | 4/2013 | Breton et al. |
| 2013/0119665 | A1 | 5/2013 | Berbari |
| 2013/0332014 | A1 | 12/2013 | Jackson |
| 2014/0285209 | A1 * | 9/2014 | Stichowski ............. B60L 53/16 324/503 |
| 2014/0368041 | A1 | 12/2014 | Tu et al. |
| 2016/0111907 | A1 | 4/2016 | Lynds |
| 2016/0164373 | A1 | 6/2016 | Liao et al. |
| 2016/0236578 | A1 | 8/2016 | Liao |
| 2017/0063124 | A1 | 3/2017 | Yu et al. |
| 2018/0009329 | A1 | 1/2018 | Tellez |
| 2018/0083469 | A1 | 3/2018 | Bauer et al. |
| 2018/0215272 | A1 | 8/2018 | Vitullo et al. |
| 2018/0312159 | A1 | 11/2018 | Jent, II |
| 2019/0001804 | A1 | 1/2019 | Wilhide |
| 2019/0004580 | A1 | 1/2019 | Wilhide |
| 2019/0140245 | A1 | 5/2019 | Mensch |
| 2019/0351895 | A1 | 11/2019 | Ben-Ari |
| 2019/0351948 | A1 | 11/2019 | Derissaint |
| 2020/0384873 | A1 | 12/2020 | Macaluso |
| 2021/0023954 | A1 | 1/2021 | Macaluso |
| 2021/0046833 | A1 | 2/2021 | Macaluso |
| 2021/0126509 | A1 | 4/2021 | Macaluso |

OTHER PUBLICATIONS

U.S. Appl. No. 16/861,110 (U.S. Pat. No. 10,787,089), filed Apr. 28, 2020, Methods and Apparatus for Powering a Vehicle.
U.S. Appl. No. 17/035,488, filed Sep. 28, 2020, Methods and Apparatus for Powering a Vehicle.
U.S. Appl. No. 17/084,531, filed Oct. 29, 2020, Methods and Apparatus for Powering a Vehicle.
U.S. Appl. No. 17/208,657, filed Mar. 22, 2021, Methods and Apparatus for Powering a Vehicle.
U.S. Appl. No. 17/208,726, filed Mar. 22, 2021, Methods and Apparatus for Powering a Vehicle.
U.S. Appl. No. 17/208,524, filed Mar. 22, 2021, Methods and Apparatus for Powering a Vehicle.
U.S. Appl. No. 17/141,518, filed Jan. 5, 2021, Methods and Apparatus for Providing Electricity to a Vehicle.
International Search Report and Written Opinion dated Nov. 5, 2020 in application No. PCT/US2020/036172.

* cited by examiner

| Name | Value | Unit |
|---|---|---|
| ☐ Electrical machine actual torque ⊙ | -57.4 | Nm |
| ☐ Electrical machine current (feed line, phase w) ⊙ | -5.31 | A |
| ☐ Electrical machine current (feed line, phase u) ⊙ | -143.06 | A |
| ☐ Electrical machine current (feed line, phase v) ⊙ | 148.94 | A |
| ☐ Electrical machine motor speed ⊙ | 5008 | r/min |
| ☐ High voltage system current through electrical ⊙ | -70 | A |
| ☐ Temperature electrical machine ⊙ | 51.05 | °C |
| ☐ Electrical machine voltage after rectification ⊙ | 377.2 | V |

FIG. 10A

| | | |
|---|---|---|
| ☐ Electrical machine actual torque ⊙ | -57.4 | Nm |
| ☐ Electrical machine current (feed line, phase w) ⊙ | -137.19 | A |
| ☐ Electrical machine current (feed line, phase u) ⊙ | 152.25 | A |
| ☐ Electrical machine current (feed line, phase v) ⊙ | -14.94 | A |
| ☐ Electrical machine motor speed ⊙ | 5025 | r/min |
| ☐ High voltage system current through electrical ⊙ | -70 | A |
| ☐ Temperature electrical machine ⊙ | 51.14 | °C |
| ☐ Electrical machine voltage after rectification ⊙ | 379.17 | V |

FIG. 10B

| ☐ Electrical machine actual torque ⊙ | -57.4 | Nm |
|---|---|---|
| ☐ Electrical machine current (feed line, phase w) ⊙ | 80.5 | A |
| ☐ Electrical machine current (feed line, phase u) ⊙ | -160.06 | A |
| ☐ Electrical machine current (feed line, phase v) ⊙ | 80.12 | A |
| ☐ Electrical machine motor speed ⊙ | 5011 | r/min |
| ☐ High voltage system current through electrical ⊙ | -69.6 | A |
| ☐ Temperature electrical machine ⊙ | 51.22 | °C |
| ☐ Electrical machine voltage after rectification ⊙ | 380.17 | V |

FIG. 10C

| ☐ Electrical machine actual torque ⊙ | -57.6 | Nm |
|---|---|---|
| ☐ Electrical machine current (feed line, phase w) ⊙ | 170.69 | A |
| ☐ Electrical machine current (feed line, phase u) ⊙ | -131.94 | A |
| ☐ Electrical machine current (feed line, phase v) ⊙ | -38.19 | A |
| ☐ Electrical machine motor speed ⊙ | 4969 | r/min |
| ☐ High voltage system current through electrical ⊙ | -69 | A |
| ☐ Temperature electrical machine ⊙ | 51.31 | °C |
| ☐ Electrical machine voltage after rectification ⊙ | 380.92 | V |

FIG. 10D

| ☐ Electrical machine actual torque ⊙ | -56.8 | Nm |
|---|---|---|
| ☐ Electrical machine current (feed line, phase w) ⊙ | -133.31 | A |
| ☐ Electrical machine current (feed line, phase u) ⊙ | -40.75 | A |
| ☐ Electrical machine current (feed line, phase v) ⊙ | 174.19 | A |
| ☐ Electrical machine motor speed ⊙ | 5121 | r/min |
| ☐ High voltage system current through electrical ⊙ | -69.6 | A |
| ☐ Temperature electrical machine ⊙ | 52.77 | °C |
| ☐ Electrical machine voltage after rectification ⊙ | 382.67 | V |

FIG. 10E

| ☐ Electrical machine actual torque ⊙ | -57 | Nm |
|---|---|---|
| ☐ Electrical machine current (feed line, phase w) ⊙ | 8.75 | A |
| ☐ Electrical machine current (feed line, phase u) ⊙ | 145.44 | A |
| ☐ Electrical machine current (feed line, phase v) ⊙ | -153.62 | A |
| ☐ Electrical machine motor speed ⊙ | 5062 | r/min |
| ☐ High voltage system current through electrical ⊙ | -69.4 | A |
| ☐ Temperature electrical machine ⊙ | 52.86 | °C |
| ☐ Electrical machine voltage after rectification ⊙ | 383.21 | V |

FIG. 10F

| ☐ Electrical machine actual torque ⊙ | -57.6 | Nm |
|---|---|---|
| ☐ Electrical machine current (feed line, phase w) ⊙ | -161.94 | A |
| ☐ Electrical machine current (feed line, phase u) ⊙ | 29.56 | A |
| ☐ Electrical machine current (feed line, phase v) ⊙ | 132 | A |
| ☐ Electrical machine motor speed ⊙ | 4937 | r/min |
| ☐ High voltage system current through electrical ⊙ | -68.8 | A |
| ☐ Temperature electrical machine ⊙ | 53.03 | °C |
| ☐ Electrical machine voltage after rectification ⊙ | 381.92 | V |

FIG. 10G

| ☐ Electrical machine actual torque ⊙ | -57.6 | Nm |
|---|---|---|
| ☐ Electrical machine current (feed line, phase w) ⊙ | -89.69 | A |
| ☐ Electrical machine current (feed line, phase u) ⊙ | 161.44 | A |
| ☐ Electrical machine current (feed line, phase v) ⊙ | -70.69 | A |
| ☐ Electrical machine motor speed ⊙ | 4890 | r/min |
| ☐ High voltage system current through electrical ⊙ | -69.2 | A |
| ☐ Temperature electrical machine ⊙ | 53.55 | °C |
| ☐ Electrical machine voltage after rectification ⊙ | 377.42 | V |

FIG. 10H

| ☐ Electrical machine actual torque ⌄ | -57.6 | Nm |
|---|---|---|
| ☐ Electrical machine current (feed line, phase w) ⌄ | 90.69 | A |
| ☐ Electrical machine current (feed line, phase u) ⌄ | 80 | A |
| ☐ Electrical machine current (feed line, phase v) ⌄ | -169.12 | A |
| ☐ Electrical machine motor speed ⌄ | 4971 | r/min |
| ☐ High voltage system current through electrical ⌄ | -69.8 | A |
| ☐ Temperature electrical machine ⌄ | 53.8 | °C |
| ☐ Electrical machine voltage after rectification ⌄ | 378.2 | V |

FIG. 10I

| ☐ Electrical machine actual torque ⌄ | -57.6 | Nm |
|---|---|---|
| ☐ Electrical machine current (feed line, phase w) ⌄ | 149.38 | A |
| ☐ Electrical machine current (feed line, phase u) ⌄ | -145.5 | A |
| ☐ Electrical machine current (feed line, phase v) ⌄ | -1.88 | A |
| ☐ Electrical machine motor speed ⌄ | 4987 | r/min |
| ☐ High voltage system current through electrical ⌄ | -70 | A |
| ☐ Temperature electrical machine ⌄ | 53.89 | °C |
| ☐ Electrical machine voltage after rectification ⌄ | 377.1 | V |

FIG. 10J

| ☐ Electrical machine actual torque ⊙ | -57.6 | Nm |
|---|---|---|
| ☐ Electrical machine current (feed line, phase w) ⊙ | -174.06 | A |
| ☐ Electrical machine current (feed line, phase u) ⊙ | 111 | A |
| ☐ Electrical machine current (feed line, phase v) ⊙ | 63.12 | A |
| ☐ Electrical machine motor speed ⊙ | 4996 | r/min |
| ☐ High voltage system current through electrical ⊙ | -69.6 | A |
| ☐ Temperature electrical machine ⊙ | 54.06 | °C |
| ☐ Electrical machine voltage after rectification ⊙ | 378.51 | V |

FIG. 10K

| ☐ Electrical machine actual torque ⊙ | -57.6 | Nm |
|---|---|---|
| ☐ Electrical machine current (feed line, phase w) ⊙ | 62.12 | A |
| ☐ Electrical machine current (feed line, phase u) ⊙ | -169.25 | A |
| ☐ Electrical machine current (feed line, phase v) ⊙ | 108.25 | A |
| ☐ Electrical machine motor speed ⊙ | 4954 | r/min |
| ☐ High voltage system current through electrical ⊙ | -69.6 | A |
| ☐ Temperature electrical machine ⊙ | 54.41 | °C |
| ☐ Electrical machine voltage after rectification ⊙ | 378.86 | V |

FIG. 10L

| ☐ Electrical machine actual torque ⊙ | -9.2 | Nm |
|---|---|---|
| ☐ Electrical machine current (feed line, phase w) ⊙ | 113.06 | A |
| ☐ Electrical machine current (feed line, phase u) ⊙ | -147 | A |
| ☐ Electrical machine current (feed line, phase v) ⊙ | 34.5 | A |
| ☐ Electrical machine motor speed ⊙ | 5587 | r/min |
| ☐ High voltage system current through electrical ⊙ | -0.2 | A |
| ☐ Temperature electrical machine ⊙ | 55.27 | °C |
| ☐ Electrical machine voltage after rectification ⊙ | 377.32 | V |

FIG. 10M

| ☐ Electrical machine actual torque ⊙ | -9.2 | Nm |
|---|---|---|
| ☐ Electrical machine current (feed line, phase w) ⊙ | 84.94 | A |
| ☐ Electrical machine current (feed line, phase u) ⊙ | -74.75 | A |
| ☐ Electrical machine current (feed line, phase v) ⊙ | -9.62 | A |
| ☐ Electrical machine motor speed ⊙ | 5600 | r/min |
| ☐ High voltage system current through electrical ⊙ | -28.4 | A |
| ☐ Temperature electrical machine ⊙ | 55.69 | °C |
| ☐ Electrical machine voltage after rectification ⊙ | 378.07 | V |

FIG. 10N

| ☐ Electrical machine actual torque ⊙ | -56.6 | Nm |
|---|---|---|
| ☐ Electrical machine current (feed line, phase w) ⊙ | -74.19 | A |
| ☐ Electrical machine current (feed line, phase u) ⊙ | -88.31 | A |
| ☐ Electrical machine current (feed line, phase v) ⊙ | 163 | A |
| ☐ Electrical machine motor speed ⊙ | 5153 | r/min |
| ☐ High voltage system current through electrical ⊙ | -70.8 | A |
| ☐ Temperature electrical machine ⊙ | 56.5 | °C |
| ☐ Electrical machine voltage after rectification ⊙ | 376.88 | V |

FIG. 10O

| ☐ Electrical machine actual torque ⊙ | -56.6 | Nm |
|---|---|---|
| ☐ Electrical machine current (feed line, phase w) ⊙ | 37.38 | A |
| ☐ Electrical machine current (feed line, phase u) ⊙ | -164.44 | A |
| ☐ Electrical machine current (feed line, phase v) ⊙ | 128.12 | A |
| ☐ Electrical machine motor speed ⊙ | 5137 | r/min |
| ☐ High voltage system current through electrical ⊙ | -70.8 | A |
| ☐ Temperature electrical machine ⊙ | 56.59 | °C |
| ☐ Electrical machine voltage after rectification ⊙ | 378.29 | V |

FIG. 10P

METHODS AND APPARATUS FOR POWERING A VEHICLE

CROSS REFERENCE TO RELATED APPLICATIONS

This application is a continuation of U.S. patent application Ser. No. 16/847,538, filed Apr. 13, 2020 and titled "METHODS AND APPARATUS FOR POWERING A VEHICLE", which claims benefit of priority and is related to U.S. provisional Patent Application No. 62/858,902, filed Jun. 7, 2019, U.S. provisional Patent Application No. 62/883,523, filed Aug. 6, 2019, and U.S. provisional Patent Application No. 62/967,406, filed Jan. 29, 2020. The disclosure of each of these applications is incorporated herein in its entirety for all purposes.

BACKGROUND

Field of the Disclosure

The present disclosure relates generally to providing energy for a vehicle powered, at least in part, by electricity, and more specifically, to generating and conveying or storing the electricity for consumption by electric motors to drive or power the vehicle or a portion thereof while the vehicle is mobile.

Description of the Related Art

Electric vehicles derive locomotion power from electricity often received from an energy storage device within the electric vehicle. The energy storage device could be a battery, a battery array, or an energy storage and/or containment device. Hybrid electric vehicles include regenerative charging that capture power from vehicle braking and traditional motors to charge the energy storage device and provide power to the vehicle. Battery electric vehicles (BEVs) are often proposed to have an energy storage/containment device (for example, a battery or battery array or capacitor array) that is charged through some type of wired or wireless connection at one or more stationary locations, for example household or commercial supply sources. The wired charging connections require cables or other similar connectors physically connected to a stationary power supply. The wireless charging connections require antenna(s) or other similar structures wirelessly connected to a power supply that generates a wireless field via its own antenna(s). However, such wired and wireless stationary charging systems may be inconvenient or cumbersome and have other drawbacks, such as degradation during energy transference, inefficiencies or losses, requiring a specific location for charging, and so forth. As such, alternatives for stationary wired or wireless charging systems and methods that efficiently and safely transfer power for charging electric vehicles are desirable.

SUMMARY

Various embodiments of systems, methods and devices within the scope of the appended claims each have several aspects, no single one of which is solely responsible for the desirable attributes described herein. Without limiting the scope of the appended claims, the description below describes some prominent features.

Details of one or more embodiments of the subject matter described in this specification are set forth in the accompanying drawings and the description below. Other features, aspects, and advantages will become apparent from the description, the drawings, and the claims. Note that relative dimensions of the following figures may not be drawn to scale.

In one aspect, an apparatus for providing electrical charge to a vehicle is disclosed. The apparatus includes a driven mass, a generator, a charger, a hardware controller, and a communication circuit. The driven mass is configured to rotate in response to a kinetic energy of the vehicle, the driven mass coupled to a shaft such that rotation of the driven mass causes the shaft to rotate, wherein the driven mass exists in (1) an extended position in which the kinetic energy of the vehicle causes the driven mass to rotate and (2) a retracted position in which the kinetic energy of the vehicle does not cause the driven mass to rotate. The generator is configured to generate an electrical output based on a mechanical input, the generator having a pulley mechanically coupled to the shaft such that rotation of the shaft causes the pulley to rotate. The charger is electrically coupled to the generator and configured to receive the electrical output from the generator, generate a charge output based on the electrical output, and convey the charge output to the vehicle. The hardware controller is configured to control whether the driven mass is in the extended position or the retracted position in response to a signal received from a vehicle controller. The communication circuit is configured to receive the signal from the vehicle controller.

In some aspects, the driven mass includes a wheel, and the extended position includes the wheel positioned in contact with a ground surface on which the vehicle travels. In some aspects, the charger includes a charging cable coupled to a charging port of the vehicle, and the charge output is conveyed to the vehicle via the charging cable and the charging port. In some aspects, apparatus further includes a circuit element positioned in series with the generator and the charger, wherein the circuit element creates an open circuit between the generator and the charging port of the vehicle. In some aspects, the apparatus further includes a filtering circuit configured to filter the electrical output from the generator before the electrical output from the generator is received by the charger, wherein filtering the electrical output includes one or more of filtering, cleaning, matching, converting, and conditioning the electrical output to reduce risk of damage to the charger by the electrical output. In some aspects, the driven mass includes a gear, and the extended position includes the gear engaged with one or more of a drive shaft, a motor, and a wheel of the vehicle. In some aspects, the pulley is mechanically coupled to the shaft by one or more of a chain, a belt, a gearing system, and a pulley system. In some aspects, the apparatus further comprises an energy storage device configured to store any excess portion of the charge conveyed to the vehicle when a vehicle battery or a vehicle motor is unable to accept all portions of the charge output conveyed from the charger. In some aspects, the energy storage device is further configured to convey the excess portion of the charge to the vehicle energy storage device or to the vehicle motor on demand. In some aspects, the apparatus further comprises a battery storage device and a capacitor storage device, wherein the capacitor storage device is configured to: receive at least a portion of the charge output, store at least the portion of the charge output, and convey at least the portion of the charge output to the battery storage device in one or more bursts based on a charge level of the battery storage device dropping below a threshold value.

In some aspects, the mechanical input further comprises a flywheel configured to drive the generator to generate the electrical output. In some aspects, the apparatus further comprises a one-way bearing having a first side and a second side, wherein the one-way bearing is configured to allow the first side rotate independently of the second side. In some aspects, the flywheel is mechanically coupled to the first side of the one-way bearing, the shaft is coupled to the second side, wherein the one-way bearing is configured to allow the flywheel rotate independently of the shaft. In some aspects, the apparatus further comprises an independent suspension that supports the driven mass and the generator independently from a suspension of the vehicle, wherein the independent suspension comprises one of a linkage, a spring, and a shock absorber. In some aspects, the generator is switchable such that the electrical output is pulsed in a first switched setting and is constant in a second switched setting. In some aspects, In another aspect, a method of providing electrical charge to a vehicle is disclosed. The method includes rotating a driven mass in response to a kinetic energy of the vehicle, the driven mass coupled to a shaft such that rotation of the driven mass causes the shaft to rotate, wherein the driven mass exists in (1) an extended position in which the kinetic energy of the vehicle causes the driven mass to rotate and (2) a retracted position in which the kinetic energy of the vehicle does not cause the driven mass to rotate. The method also may include generating an electrical output based on a mechanical input via a generator, the generator having a pulley mechanically coupled to the shaft such that rotation of the shaft causes the pulley to rotate. The method further may include, for example, generating a charge output based on the electrical output and conveying the charge output to the vehicle. The method also may further include controlling whether the driven mass is in the extended position or the retracted position in response to a signal received from a vehicle controller and receiving the signal from the vehicle controller.

In some aspects, the driven mass comprises a wheel, and wherein the extended position comprises the wheel positioned in contact with a ground surface on which the vehicle travels. In some aspects, conveying the charge output to the vehicle comprises conveying the charge output via a charging cable coupled to a charging port of the vehicle. In some aspects, the method further comprises creating an open circuit between the generator and the charging port of the vehicle via a circuit element or filtering the electrical output from the generator before the electrical output from the generator is received by the charger, wherein filtering the electrical output includes one or more of filtering, cleaning, matching, converting, and conditioning the electrical output to reduce risk of damage to the charger by the electrical output. In some aspects, the driven mass comprises a gear, and wherein the extended position comprises the gear engaged with one or more of a drive shaft, a motor, and a flywheel of the vehicle. In some aspects, the mechanical input is mechanically coupled to the shaft by one or more of a chain, a belt, a gearing system, and a pulley system. In some aspects, the method further comprises storing any excess portion of the charge conveyed to the vehicle when a vehicle battery or a vehicle motor is unable to accept all portions of the charge output conveyed from the charger or conveying the excess portion of the charge from the energy storage device to the vehicle energy storage device or to the vehicle on demand. In some aspects, the method further comprises receiving at least a portion of the charge output at a capacitor storage device, storing at least the portion of the charge output in the capacitor storage device, and/or conveying at least the portion of the charge output to a battery storage device in one or more bursts based on a charge level of the battery storage device dropping below a threshold value.

In some aspects, the mechanical input comprises a flywheel configured to drive the generator to generate the electrical output. In some aspects, the mechanical input further comprises a one-way bearing having a first side and a second side, wherein the one-way bearing is configured to allow the first side rotate independently of the second side in a first direction of rotation and with the second side in a second direction of rotation. In some aspects, the flywheel is mechanically coupled to the first side of the one-way bearing, the shaft is coupled to the second side, wherein the one-way bearing is configured to allow the flywheel rotate independently of the shaft in the first direction of rotation and with the shaft in the second direction of rotation. In some aspects, the method further comprises supporting, via an independent suspension, the driven mass and the generator independently from a suspension of the vehicle, wherein the independent suspension comprises one of a linkage, a spring, and a shock absorber. In some aspects, the method further comprises switching the generator between generating a pulsed electrical output or a constant electrical output or performing a voltage dump from the generator output terminal via a capacitor, a switch assembly, and a backup energy storage.

In another aspect, an apparatus for providing electrical charge to a vehicle is disclosed. The apparatus comprises a driven mass configured to rotate in response to a kinetic energy of the vehicle, the driven mass coupled to a shaft such that rotation of the driven mass causes the shaft to rotate and a generator configured to generate an electrical output at a generator output terminal based on a mechanical input, the mechanical input mechanically coupled to the shaft such that rotation of the shaft causes the mechanical input to rotate. The apparatus further comprises a capacitor module selectively and electrically coupled to the generator output terminal and configured to: receive a first portion of the electrical output generated by the generator, store the first portion of the electrical output as a first energy as an electric field of the capacitor module, and convey the first energy to a load of the vehicle on demand. The apparatus further comprises a battery module selectively and electrically coupled to the generator output terminal and configured to: receive a second portion of the electrical output generated by the generator, store the second portion of the electrical output as a second energy in a chemical energy form, and convey the second energy to the load of the vehicle on demand. The hardware controller is configured to control whether the capacitor module, the battery module, or a combination of the capacitor module and the battery module is coupled to the generator output terminal in response to a received signal.

In some aspects, the mechanical input comprises a flywheel configured to store mechanical energy received from the driven mass and the flywheel is mechanically coupled to the first side of the one-way bearing, wherein the shaft is coupled to the second side, and wherein the one-way bearing is configured to allow the flywheel rotate independently of the shaft in the first direction of rotation and together with the shaft in the second direction of rotation. In some aspects, the apparatus further comprises an independent suspension that supports the driven mass and the generator independently from a suspension of the vehicle, wherein the independent suspension comprises one of a linkage, a spring, and a shock absorber.

In another aspect, a method of providing electrical charge to a vehicle is disclosed. The method comprises rotating a driven mass in response to a kinetic energy of the vehicle, the driven mass coupled to a shaft such that rotation of the driven mass causes the shaft to rotate, generating, via generator, an electrical output at a generator output terminal of the generator based on a mechanical input, the mechanical input mechanically coupled to the shaft such that rotation of the shaft causes the mechanical input to rotate, conveying a first portion of the electrical output generated by the generator to a capacitor module selectively and electrically coupled to the generator output terminal, storing the first portion of the electrical output as a first energy in an electric field of the capacitor module, conveying the first energy to a load of the vehicle on demand, conveying a second portion of the electrical output to a battery module selectively and electrically coupled to the generator output terminal, storing the second portion of the electrical output as a second energy in a chemical energy form, and controlling whether the capacitor module, the battery module, or a combination of the capacitor module and the battery module is coupled to the generator output terminal in response to a received signal.

In some aspects, the mechanical input comprises a flywheel configured to store mechanical energy received from the driven mass and the flywheel is mechanically coupled to the first side of the one-way bearing, wherein the shaft is coupled to the second side, and wherein the one-way bearing is configured to allow the flywheel rotate independently of the shaft in the first direction of rotation and together with the shaft in the second direction of rotation. In some aspects, the method further comprises supporting, via an independent suspension, the driven mass and the generator independently from a suspension of the vehicle, wherein the independent suspension comprises one of a linkage, a spring, and a shock absorber.

In another aspect, an apparatus for providing electrical charge to a vehicle is disclosed. The apparatus further comprises a driven mass configured to rotate in response to a kinetic energy of the vehicle, the driven mass coupled to a shaft such that rotation of the driven mass causes the shaft to rotate and a generator configured to generate an electrical output at a generator output terminal based on a mechanical input, the mechanical input mechanically coupled to the shaft such that rotation of the shaft causes the mechanical input to rotate. The apparatus further comprises a hardware controller configured to: convey at least a first portion of the electrical output to one of a capacitor module, a battery, and a motor of the vehicle, each of the capacitor module, the battery, and the motor selectively coupled to the generator output terminal, disconnect the generator output terminal from the capacitor module, the battery, and the motor in response to an interrupt signal received, initiate a dump of a residual electrical energy in the generator for a period of time, and connect the generator output terminal to one of the capacitor module, the battery, and the motor of the vehicle after the period of time expires. The interrupt signal is generated by a controller in response to one or more conditions.

In some aspects, the interrupt signal is received at periodic intervals defined based on at least one of a period of time following a previous interrupt signal, a distance traveled by the vehicle, a speed of the vehicle, and a power generated by the generator. In some aspects, the hardware controller is further configured to dump the residual electrical energy comprises the hardware controller being configured to: electrically couple the generator output terminal to a dump load for the period of time, and disconnect the generator output terminal from the dump load after the period of time passes, wherein the dump load comprises one or more of a back-up battery or capacitor.

In another aspect, a method of providing electrical charge to a vehicle is disclosed. The method comprises rotating a driven mass in response to a kinetic energy of the vehicle, the driven mass coupled to a shaft such that rotation of the driven mass causes the shaft to rotate, generating an electrical output at a generator output terminal based on a mechanical input, the mechanical input mechanically coupled to the shaft such that rotation of the shaft causes the mechanical input to rotate, conveying at least a first portion of the electrical output to one of a capacitor module, a battery, and a motor of the vehicle selectively coupled to the generator output terminal, disconnecting the generator output terminal from the capacitor module, the battery, and the motor in response to an interrupt signal received, dumping a residual electrical energy in the generator for a period of time, and connecting the generator output terminal to one of the capacitor module, the battery, and the motor of the vehicle after the period of time expires, wherein the interrupt signal is generated by a controller in response to one or more conditions.

In some aspects, the interrupt signal is received at periodic intervals defined based on at least one of a period of time following a previous interrupt signal, a distance traveled by the vehicle, a speed of the vehicle, and a power generated by the generator. In some aspects, umping the residual electrical energy comprises: electrically coupling the generator output terminal to a dump load for the period of time and disconnecting the generator output terminal from the dump load after the period of time passes, wherein the dump load comprises one or more of a back-up battery or capacitor.

In another aspect, an apparatus for providing electrical charge to a vehicle is disclosed. The apparatus comprises a motor configured to place the vehicle in motion, a driven mass configured to rotate in response to a kinetic energy of the vehicle generated when the vehicle is in motion, the driven mass coupled to a shaft such that rotation of the driven mass causes the shaft to rotate, and a generator configured to generate an electrical output at a generator output terminal based on rotation of a mechanical input, the mechanical input mechanically coupled to the shaft such that rotation of the shaft causes the mechanical input to rotate. The apparatus further comprises a capacitor module selectively and electrically coupled to the generator output terminal and configured to: receive a portion of the electrical output generated by the generator, store the portion of the electrical output as an electric field of the capacitor module when the battery has a charge that exceeds a threshold value, and convey the first energy to a load of the vehicle on demand. The apparatus further comprises a hardware controller configured to control the motor, the generator, and coupling of the capacitor module to the generator module, wherein the electrical output generated is greater than or equal to a consumption of the motor of the vehicle when the vehicle is in motion.

In another aspect, a method of providing electrical charge to a vehicle is disclosed. The method comprises rotating a driven mass in response to a kinetic energy of the vehicle, the driven mass coupled to a shaft such that rotation of the driven mass causes the shaft to rotate, generating, by a generator, an electrical output at a generator output terminal based on rotation of a mechanical input, the mechanical input mechanically coupled to the shaft such that rotation of the shaft causes the mechanical input to rotate, conveying a portion of the electrical output to a capacitor module selectively coupled to the generator output terminal with a battery of the vehicle, and storing the portion of the electrical output in the capacitor module when the battery has a charge that exceeds a threshold value, wherein the electrical output generated by the generator is greater than or equal to a consumption of a motor of the vehicle when the vehicle in motion.

BRIEF DESCRIPTION OF THE DRAWINGS

FIGS. 10A-10P are screenshots of an interface that presents various variables that are monitored during operation of the EV with an example embodiment of the OBCS described herein.

Figure 1:
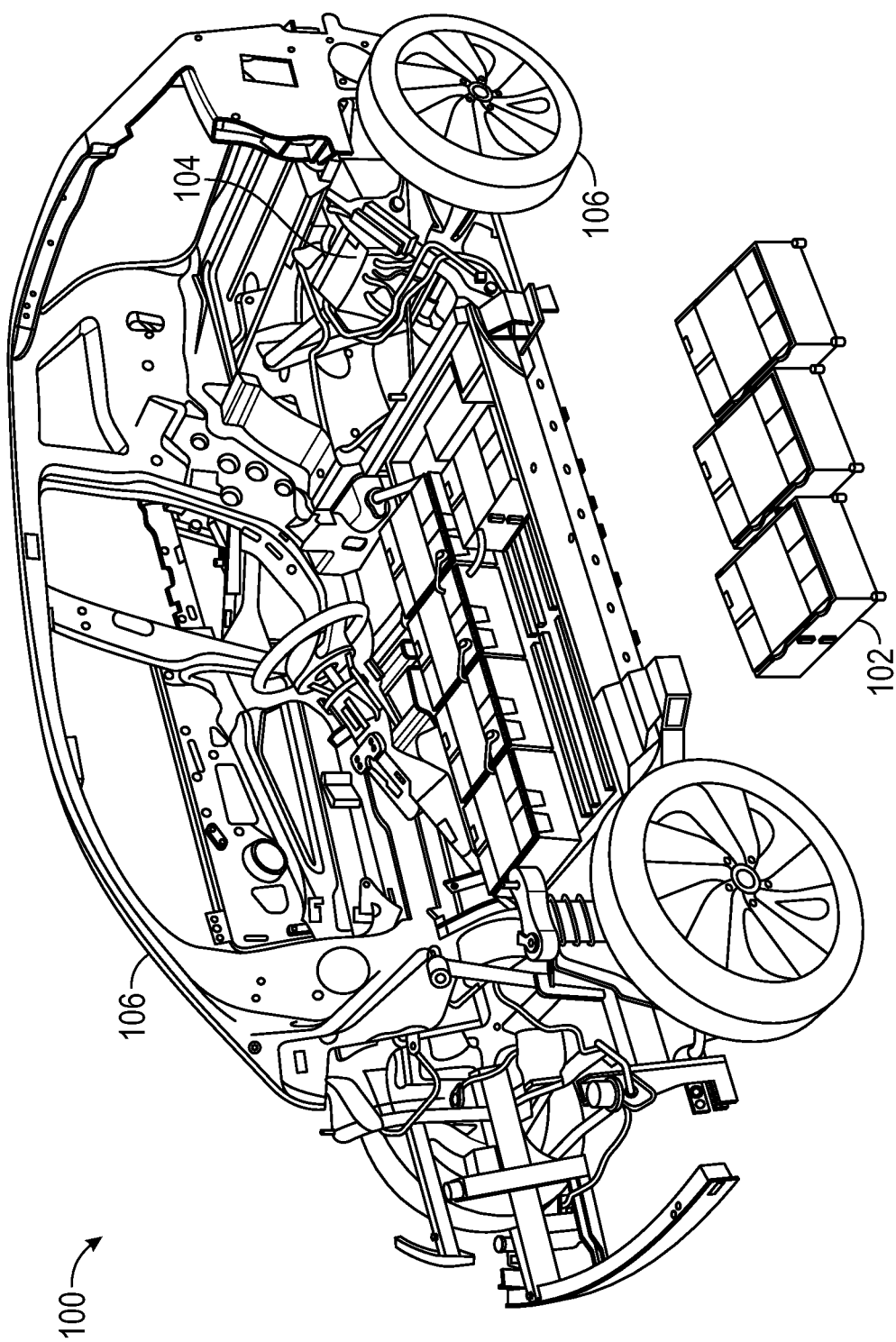
FIG. 1 is a diagram of an exemplary battery electric vehicle (BEV).

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for providing a thorough understanding of the exemplary embodiments. In some instances, some devices are shown in block diagram form.

An electric vehicle (EV) is used herein to describe a vehicle that includes, as at least part of its locomotion capabilities, electrical power derived from energy sources (e.g., one or more energy generation devices and energy storage devices, for example rechargeable electrochemical cells, capacitors, ultra-capacitors, other types of batteries, and other energy storage devices). In some embodiments, capacitor (or ultra-capacitor modules) may be ideal replacements for the battery 102 where long term storage for energy generated by the generators 302a and 302b is not needed but an ability to quickly store and discharge large amounts of energy is desired. As non-limiting examples, some EVs may be hybrid electric vehicles (HEVs) that include, besides electric motors, one or more batteries, and a traditional combustion engine for direct locomotion or to charge the vehicle's battery. Other EVs, for example battery electric vehicles (BEVs), may draw all locomotion capability from electrical power stored in a battery. An EV is not limited to an automobile and may include motorcycles, carts, scooters, buses, and the like. Additionally, EVs are not limited to any particular energy source (e.g., energy storage source or generation source) or to when the electricity is received from the energy source (for example, when the EV is at rest or in motion).

Current EVs, whether HEVs or BEVs, may be charged using stationary charging stations. Such stationary charging stations may be installed at home or in public locations, such as public parking lots, along roadways, and so forth. These stationary charging stations may use cables that couple to the EVs to convey charging power between the EVs and the stationary charging stations and/or use wireless transfer technologies to wirelessly convey charging power between the EVs and the stationary charging stations. The "stationary" aspect of charging stations may refer to the static nature of the charging stations themselves. For example, such stationary charging stations themselves are generally permanently (or semi-permanently) installed in fixed locations because of needed power feeds required to provide electricity to the charging stations (for example, a connection to a home panel for the home installation) and, therefore, require power from a power grid, thereby increasing burdens on the power grid. In some embodiments, the EVs themselves receive a charge from the stationary charging stations while the EVs are stationary (for example, parked in a parking spot) or in motion (for example, driving over or in proximity of one or more wireless charging components of the stationary charging stations while the EVs are in motion).

In some embodiments, an EV owner may utilize a generator to charge the EV. For example, the generator is a mobile generator that the EV owner is able to transport to various locations in order to charge the EV. In some embodiments, such mobile generators provide a charge to the EV when the EV does not have sufficient power to drive to a stationary charging station or to provide any charge at a location where a stationary charging station is not available. Additionally, or alternatively, the mobile generator may provide charging to the EV while the EV is in motion. However, such mobile generators often utilize gasoline or other fuels to generate electricity from a chemical and/or mechanical reaction. Therefore, use of the mobile generators may involve transporting the fuel for the generator and/or waiting for a charge provided by the mobile generators and generation of harmful byproducts that must be exhausted from the vehicle. Additionally, the mobile generators are generally unable to provide a charge at a rate greater than charge used to drive the EV. For example, the mobile generator is only able to provide hourly charging rates at the equivalent of providing electricity to allow the EV to travel between 4 miles and 25 miles while the moving EV will generally consume more electricity than this in an hour of travel. Such charging rates would be insufficient to maintain motion of the EV during use. Alternatively, or additionally, the EV owner may use a portable battery charger or other portable energy storage device that is able to transfer energy to the EV when the EV is unable to drive to a stationary charging station. Such use of portable battery chargers may involve similar constraints as the mobile generators, such as charge transfer times, and so forth. The user may also use regenerative braking or regenerative driving (for example, generating electricity while the vehicle is in motion and not necessarily braking) to charge or power the EV. For example, a regenerative driving system may generate electricity based on movement of one or more vehicle components that is moving or driven while the EV is moving.

Accordingly, the disclosure described in more detail herein provides an on-board charging system (OBCS) that charges the energy storage device (for example, the battery, the battery array, the energy containment device, or similar) or provides electricity directly to motors of the EV while the EV is in motion (or generally traveling) at a charging rate sufficient to enable significant, continued use of the EV while the EV is charging. Some embodiments incorporate a battery charger or other generator that is capable of providing charge to the energy storage device of the EV or the motors of the EV at a rate greater than that which the EV is able to discharge the energy storage device. The OBCS may be mobile in the sense that is moves with the EV while being fixedly attached to the EV. Alternatively, or additionally, the OBCS may be removable from the EV and portable to other EVs, and so forth. In some embodiments, the OBCS provides stable and consistent power on demand for the EV, thereby extending a travel range of the EV. The EV (for example, via a controller and/or communications with the OBCS) may request the OBCS to charge the EV by providing the electrical power needed at any given moment. This may be, and in fact is intended to be, a cyclical process as the EV drains its energy storage device and requests additional charge from the OBCS. Alternatively, the EV may communicate with the OBCS to provide electrical power directly to the motors of the EV, bypassing the energy storage device of the EV. The OBCS may reduce reliance of charging of EVs using grid charging and may significantly reduce the mining of fossil fuels and resulting carbon emissions.

Further details regarding the OBCS and its integration with the EV are provided below with reference to FIGS. 1-14C and corresponding description.

FIG. 1 is a diagram of an exemplary battery electric vehicle (BEV) 100, in accordance with an exemplary embodiment. The BEV 100 includes, among other components shown, a battery 102, at least one electric motor 104, a plurality of wheels 106, and a frame or body 108. The battery 102 may include a plurality of individual battery units or modules and may store energy used to drive the at least one electric motor 104. In some embodiments, the individual battery units may be coupled in series to provide a greater voltage for the battery 102 than an individual battery unit. In some embodiments, the battery 102 includes any other charge or energy storage or containment device. In some embodiments, the battery 102 is coupled to a controller (not shown, for example the EV controller) configured to monitor a charge state or a charge value of the battery 102. The controller may provide controls for how the battery 102 is charged or discharged and may provide various signals, interlocks, and so forth with respect to the battery 102. For example, the controller may limit charging of the battery 102 in certain weather conditions, vehicle conditions or states, or based on one or more interlocks (such as when a charging port door is left open, and so forth).

In some embodiments, each of the battery units (and the battery 102 as a whole) may exist in one of a plurality of charge states, including a fully charged state, a fully discharged state, a charging state, a sufficient charge state, a discharging state, and a charge desired state, among others. The controller, based on its monitoring of the charge states of the individual battery units and the battery 102 and/or a voltage of the battery 102, may allow the battery 102 to provide power to a load, for example the motor 104, request charging of the battery 102, or prevent one or more of charging and/or discharging of the battery 102 based on the charge states. Thus, if the battery 102 is discharged below a threshold charge value (for example, if the battery 102 is in the charge desired state), then the controller may prevent further discharge of the battery 102 and/or request that the battery 102 be charged. Alternatively, or additionally, if the battery 102 is receiving charge from a charger and the charge value of the battery 102 exceeds a threshold full charge value (for example, if the battery 102 is in the fully charged state), then the controller may prevent further charging of the battery 102.

The battery 102 provides electrical energy to the at least one motor 104. The at least one motor 104 converts the electrical energy to mechanical energy to rotate one or more of the plurality of wheels 106, thus causing the BEV 100 to move. In some embodiments, the at least one motor 104 is coupled to two or more of the plurality of wheels 106. In some embodiments, the at least one motor 104 includes two motors 104 that each power a single wheel 106 of the plurality of wheels 106. In some embodiments, the controller monitors the state of the at least one motor 104, for example whether the at least one motor 104 is driving at least one of the plurality of wheels 106 to cause the BEV 100 to move based on energy from the battery 102, and so forth. In some embodiments, the controller may monitor a direction in which the at least one wheel 106 is rotating.

The BEV 100 may be configured to use the wheel(s) 106, the motor(s) 104, and the battery 102 to charge the battery 102 using regenerative braking from a generative braking system (not shown). Regenerative braking enables the BEV 100 to capture energy from the rotation of the wheel(s) 106 for storage in the battery 102 when the BEV 100 is coasting (for example, moving with using energy from the battery 102 to power the motor(s) 104 to drive the wheel(s) 106) and/or braking. Regenerative braking effectively charges the BEV 100 based on kinetic energy of the BEV 100. Effectively, the motor(s) 104 convert the kinetic energy from the moving BEV 100 to electrical energy for storage in the battery 102, causing the BEV 100 to slow. In some embodiments, the controller may be used to control operation of the motor(s) 104 efficiently and effectively to enable regenerative braking when the motor(s) 104 is not being used to drive the wheel(s). For example, the controller may determine that the motor 104 is not being used to drive the corresponding wheel 106 and may switch the motor 104 into a regenerative braking mode or state to capture charge from the movement of the BEV 100. In some embodiments, if the controller determines that at least one wheel 106 is rotating at a speed faster than a speed at which it is being driving (for example, when the BEV is going down a steep hill), then the controller controls the motor 104 to perform regenerative braking or otherwise regenerate charge from the movement of the BEV. In some embodiments, the controller generates one or more alerts for display to a driver or operator of the BEV 100 or communicated to an internal or external system (for example, about charging needs, battery levels, regenerative braking, and so forth).

Though not explicitly shown in FIG. 1, the BEV 100 may include a charging port that allows the battery 102 to be connected to a power source for charging. Often, the charging port allows connection of a plug external to the BEV 100 that is then connected to an external power source, such as a wall charger, and so forth. In some embodiments, internal wiring couples the charging port to the battery 102 to allow for charging. Alternatively, or additionally, the BEV 100 includes a wireless power antenna configured to receive and/or transmit power wirelessly. As such, internal wiring couples the wireless power antenna to the battery 102 to allow for charging. In some embodiments, the internal wiring may couple either the charging port and/or the wireless power antenna directly to the motor 104. The controller may detect when the battery 102 is receiving a charge via the charging port and/or the wireless power antenna.

Figure 2:
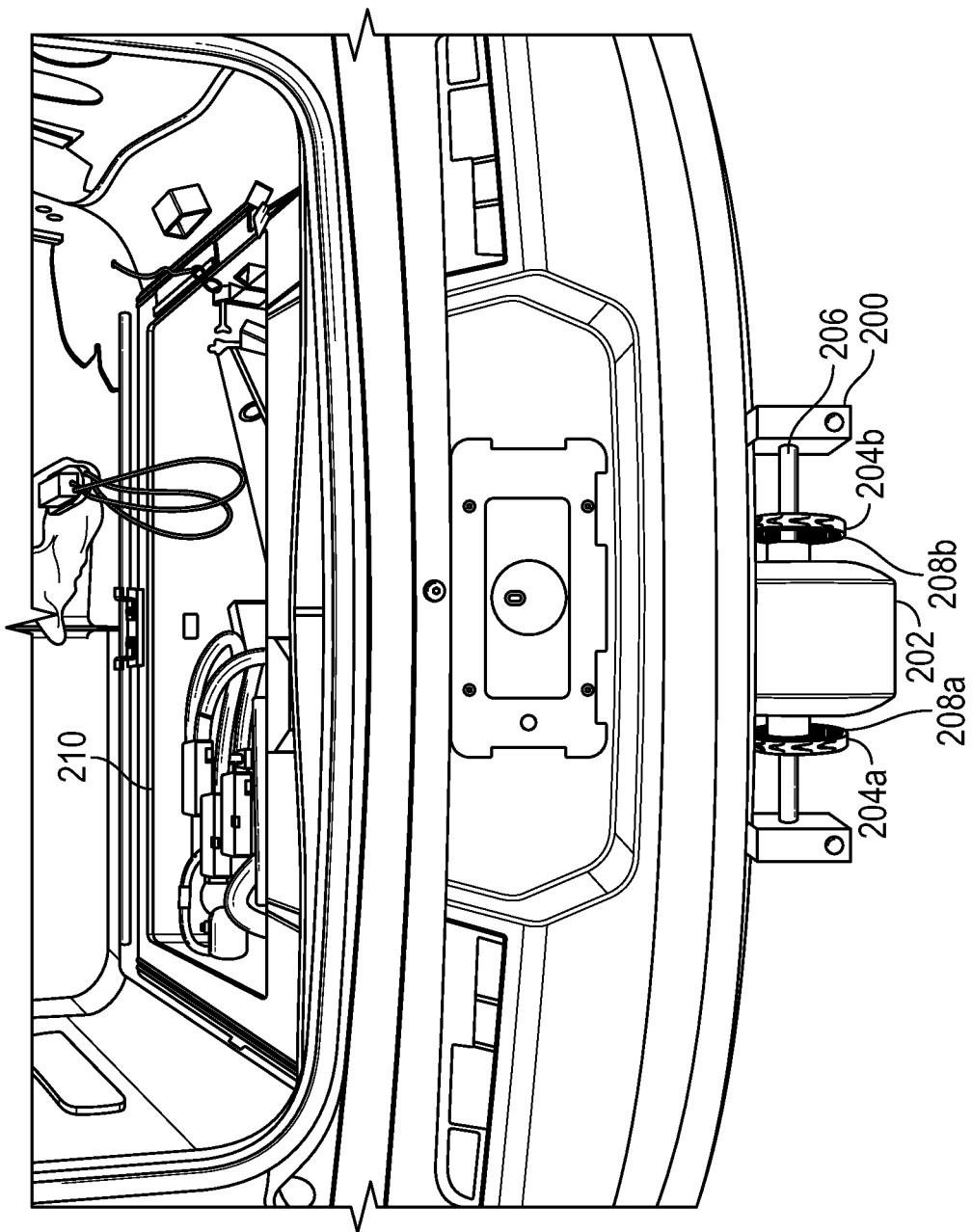
FIG. 2 is a diagram of an exemplary "fifth" wheel configured to drive or power an on-board charging system (OBCS) capable of charging an energy storage device of the BEV of FIG. 1.

FIG. 2 is a diagram of an exemplary "fifth" wheel 202 configured to drive or power an on-board charging system (OBCS) 210 capable of charging the battery 102 of the BEV 100 of FIG. 1, in accordance with an exemplary embodiment. The fifth wheel 202 as shown is in an extended state such that the fifth wheel 202 is in contact with the ground or road surface and, thus, rotates while the BEV 100 is in motion. The controller may extend or retract the fifth wheel 202 such that the fifth wheel 202 is not always in contact with the ground or road surface. In some embodiments, the fifth wheel 202 is replaced with or integrated as a small motor or geared component driven by a drive shaft, motor 104, wheel 106, or other driven component of the BEV 100. In some embodiments, the small motor or geared component may include a small fixed gear electric motor that rotates the shaft at a desirable rotations per minute (RPM). For discussion herein, the fifth wheel 202 will be described as being driven when in contact with the ground, though any other means of being driven (for example, the small motor or geared component driven by a drive shaft) is envisioned. As such, the fifth wheel 202, whether in contact with the ground or integrated with another drive component within the BEV 100, rotates in response to the BEV 100 being driven to move or otherwise moving. In some embodiments, although the fifth wheel 202 is in contact with the ground, the fifth wheel 202 may not carry a significant portion of weight of the BEV 100. As such, in some embodiments, a minimal or small amount of drag will be created or caused by the fifth wheel 202. The controller may be configured to control the amount of drag that the fifth wheel 202 creates (for example, how much pressure the fifth wheel 202 exerts downward on the road surface.

The fifth wheel 202 is coupled to a drive shaft (herein referred to as the "shaft") 206. As the fifth wheel 202 rotates, the shaft 206 also rotates at a same, similar, or corresponding rate as the fifth wheel 202. In some embodiments, the fifth wheel 202 and the shaft 206 may be coupled such that the shaft 206 rotates at a greater or reduced rate as compared to the fifth wheel 202. In some embodiments, the shaft 206 is coupled to a support structure 200. The support structure 200 may be attached to the frame or body 108 of the BEV 100 and allow for the fifth wheel 202 to be extended or retracted as needed while supported by the BEV 100. Two sprockets or gears 208a and 208b are disposed on the shaft 206 such that when the shaft 206 rotates, the sprockets 208a and 208b also rotate. In some embodiments, the sprockets 208a and 208b and the shaft 206 may be coupled such that the sprockets 208a and 208b rotate at a greater or reduced rate as compared to the shaft 206.

The sprockets 208a and 208b engage with a chain, belt, gearing, pulley, or similar device 204a and 204b, respectively. The chains 204a and 204b cause one or more devices (not shown in this figure) coupled via the chains 204a and 204b to rotate at a rate that corresponds to the rate of rotation of the sprockets 208a and 208b. In some embodiments, the one or more devices coupled to the sprockets 208a and 208b via the chains, gearing, pulley, or similar device 204a and 204b are components of or otherwise coupled to the OBCS 210. For example, the devices to which the sprockets 208a and 208b are coupled via the chains (and so forth) 204a and 204b provide power (for example, by way of kinetic energy) to the OBCS 210 to enable the OBCS 210 to charge the BEV 100 while the BEV 100 is in motion. Thus, in some embodiments, the devices to which the sprockets 208a and 208b are coupled via the chains 204a and 204b may include generators, alternators, or similar mechanical to electrical energy conversion devices, as described in further detail below. In some embodiments, the small motor described above may act as a fail over motor to drive the shaft driving the generators 302a and 302b should one of the chains 204a and 204b fail.

In some embodiments, the OBCS 210 includes any existing, off the shelf BEV charger or a custom developed BEV charger, such as a level 1 electric vehicle charger, a level 2 electric vehicle charger, a level 3 electric vehicle charger, and so forth. The OBCS 210 may couple to the charging port of the BEV 100, thereby allowing the OBCS 210 to charge the battery 102 of the BEV 100. Alternatively, the OBCS 210 may provide charge wirelessly to the wireless power antenna of the BEV 100. In some embodiments, the OBCS 210 may be used in conjunction with power received via the charging port when the OBCS 210 provides power via the wireless power antenna or in conjunction with power received via the wireless power antenna when the OBCS 210 provides power via the charging port. Thus, charging by an external system (for example, stationary charging systems) may occur in conjunction with charging by the OBCS 210.

The level one charger generates a charge for the battery 102 of the BEV 100 based on a 120-volt (V) alternating current (AC) connection, which is generally referred to as a standard household wall outlet. Charge times with the level 1 charger are generally longer than those for other chargers. Generally, the level one charger may charge the battery 102 of the BEV 100 at a rate of 4-8 miles per hour (MPH) of charging. The level 2 charger generates the charge for the battery 102 of the BEV 100 based on a 240V AC connection. Charge times with the level 2 charger are generally much quicker than those with the level one charger but slower than the level 3 charger. The level 2 charger may generally charge the battery 102 of the BEV 100 at a rate of 15-30 miles per hour of charging. The level 3 charger generates the charge for the battery 102 of the BEV 100 based on a 480V direct current (DC) connection. Charge times with the level 3 charger are generally much quicker than those with the level 2 charger. The level 3 charger may generally charge the battery 102 of the BEV 100 at a rate of 45+ miles per half-hour of charging. Higher level chargers may provide greater levels of energy to the BEV 100 to allow the battery 102 to be charged at faster rates than even the level 3 charger.

In some embodiments, the BEV 100 includes multiple fifth wheels 202, sprockets 208, and/or chains 204 coupling the sprockets 208 to one or more devices. The one or more fifth wheels 202 and the corresponding one or more sprockets 208 may rotate with one or more corresponding shafts 206. In some embodiments, each fifth wheel 202 is mounted via its respective shaft 206 to its own support structure 200. In some embodiments, each fifth wheel 202, when additional fifth wheels 202 exist, is coupled to its own energy conversion device(s) through one or more sprockets 208 and chains 204 that rotate with the corresponding shaft 206 of the additional fifth wheels 202. By including additional fifth wheels 202, more mechanical energy may be converted to electrical energy for supply by the OBCS 210 as compared to with a single fifth wheel 202.

Figure 3:
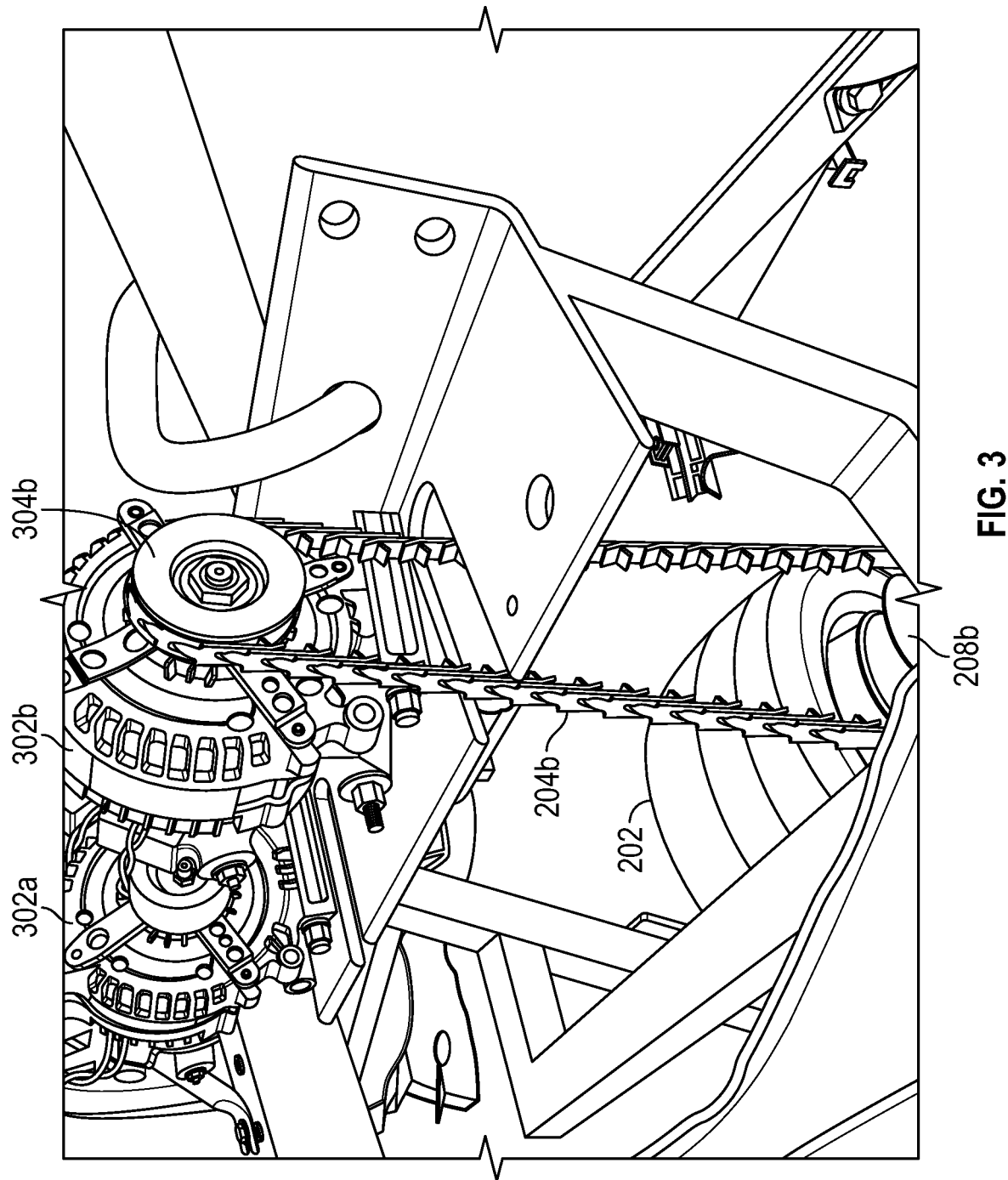
FIG. 3 is a diagram of the fifth wheel of FIG. 2 mechanically coupled to two generators that convert a mechanical rotation of the fifth wheel into electrical energy outputs.

FIG. 3 is a diagram of the fifth wheel 202 of FIG. 2 mechanically coupled to two generators 302a and 302b that convert mechanical rotation of the fifth wheel 202 into electrical energy outputs, in accordance with an exemplary embodiment. In some embodiments, the generators 302a and 302b may be replaced with alternators or similar electricity generating devices. Each of the generators 302a and 302b has a rotor coupled to a drive pulley 304a and 304b, respectively. The drive pulley 304 of each generator 302 may rotate, causing the corresponding rotor to rotate and causing the generators 302 to generate an electrical energy output via a cable (not shown in this figure). The drive pulleys 304a and 304b are coupled to the fifth wheel 202 via one of the sprockets 208a and 208b and one of the chains 204a and 204b, respectively. The cable may supply any generated electrical energy output to the OBCS 210 as an input energy to the OBCS 210. In some embodiments, the two generators 302a and 302b may be replaced by any number of generators 302, from a single generator to many generators. In some embodiments, the generators 302 may generate AC electricity or DC electricity, depending on the application. When the generators 302 generate AC power, an AC-to-DC converter may be used to condition and convert the generated electricity for storage. When the generators 302 generate DC power, an DC-to-DC converter may be used to condition the generated electricity for storage.

As described above, the fifth wheel 202 is designed to rotate when the BEV 100 is in motion and the fifth wheel 202 is extended and/or otherwise in contact with the ground or road surface (or otherwise being driven while the BEV is in motion). When the fifth wheel 202 rotates, that rotation causes the shaft 206 to rotate, causing the sprockets 208a and 208b to also rotate. Accordingly, the chains 204a and 204b coupled to the sprockets 208a and 208b move or rotate around the sprockets 208a and 208b, respectively. The movement of the chains 204a and 204b while the BEV 100 is in motion and the fifth wheel 202 is in contact with the ground causes the pulleys 304a and 304b of the rotors of the generators 302a and 302b, respectively, to rotate. As described above, the rotation of the pulleys 304 of the generators 302 causes the rotors of the generators 302 to rotate to cause the generators 302 to generate the electrical energy output via the cable, where the electrical energy output corresponds to the mechanical rotation of the pulleys 304. Thus, rotation of the fifth wheel 202 causes the generators 302a and 302b to generate electrical energy outputs. In some embodiments, the generators 302a and 302b (in combination and/or individually) may generate electrical energy outputs at greater than 400 VAC (for example in a range between 120 VAC and 480 VAC) delivering up to or more than 120 kW of power to the OBCS 210. In some embodiments, the power output of the generators 302a and 302b, in combination and/or individually, may range between 1.2 kilowatts (kW) and 120 kW, for example 1.2 kW, 3.3 kW, 6.6 kW, 22 kW, 26 kW, 62.5 kW, and 120 kW, and so forth. In some embodiments, the generators 302a and 302b provide up to or more than 150 kW of power. The power provided by the generators may be adjusted by adjusting the particular generators used or by otherwise limiting an amount of power being delivered from the OBCS 210 to the battery 102 (or similar charge storage devices), as needed.

In some embodiments, the fifth wheel 202 may be designed to be smaller in diameter than the wheels 106 of the BEV 100. By making the fifth wheel 202 smaller in diameter than the wheels 106 of the BEV 100, the fifth wheel 202 may rotate more revolutions per distance traveled than the wheels 106. Accordingly, the fifth wheel 202 rotates at a faster RPM than the wheels 106. The shaft 206, coupled to the fifth wheel 202, has a smaller diameter than the fifth wheel 202. The sprockets 208a and 208b coupled to the shaft 206 have a larger diameter than the shaft 206 but a smaller diameter than the fifth wheel 202. In some embodiments, the diameters of the various components (for example, the fifth wheel 202, the shaft 206 and/or the sprockets 208a and 208) may be varied to further increase the rate of rotation (or rotational speed) of the corresponding components. In some embodiments, the diameter of the fifth wheel 202 may be reduced further as compared to the wheels 106. In some embodiments, gearing between the fifth wheel 202 and the shaft 206 and/or between the shaft 206 and the sprockets 208a and 208b may further increase the difference in the rotational rates or speeds of the various components as compared to the wheel 106.

As shown in FIG. 3, the pulleys 304 (and the rotors) of the generators 302 have a smaller diameter than the sprockets 208. Accordingly, the pulleys 304 may rotate at a faster or greater RPM than the sprockets 208 and the fifth wheel 202. Accordingly, the rotors of the generators 302 coupled to the pulleys 304 may rotate at a faster RPM (as compared to the fifth wheel 202) and generate electrical energy that is output to the OBCS 210 via the cable described above. In some embodiments, adjusting the diameters of the various components described herein to cause the pulleys 304a and 304b to rotate at different RPMs and can cause the generators 302a and 302b to generate different amounts of power for transmission to the OBCS 210 (for example, faster rotation may result in more power generated by the generators 302a and 302b than slower rotation). By varying the sizing of the various components, the rotors of the generators 302a and 302b may rotate at greater or smaller rotation rates. The greater the rotational rate, the more power that is generated by the generators 302a and 302b. Thus, to maximize power generation by the generators 302a and 302b, the various components (for example, the fifth wheel 202, the shaft 206, the sprockets 208, the pulleys 304, and so forth), may be sized to maximize the rotation rate of and power generated by the generators 302.

In some embodiments, the wheels 106 of the BEV 100 may be between 15" and 22" in diameter, inclusive. Specifically, the wheels 106 of the BEV 100 may be 15", 16", 17", 18", 19", 20", 21", or 22" in diameter. The corresponding fifth wheel 202 may be between 7" and 13", inclusive. Specifically, the fifth wheel 202 may be 7", 8", 9", 10", 11", 12", or 13" in diameter. In some embodiments, the fifth wheel 202 has a diameter selected such that the ratio of the diameter of the wheel 106 to the diameter of the fifth wheel 202 meets a certain threshold value (for example, 1.5:1, 1.6:1, 1.7:1, 1.8:1, 1.9:1, 2:1, 3:1, 15:1 and so forth). This means that the fifth wheel 202 may rotate at a speed such that a ratio of the rotation speed of the fifth wheel 202 to the rotation speed of the wheel 106 is the same as the ratio between the diameter of the fifth wheel 202 to the diameter of the wheel 106.

In some embodiments, the sprockets 208a and 208b may have a diameter that is approximately half the diameter of the fifth wheel 202. For example, a ratio of the diameter of the fifth wheel 202 to the sprockets 208a and 208b may be approximately 2:1 such that the sprockets 208a and 208b rotate at approximately twice the rotational speed or RPMs as the fifth wheel 202. More specifically, the diameter of the sprockets 208a and 208b may be between 3" and 5", where the diameter is one of 3", 4", and 5". Similarly, the sprockets 208a and 208b may have a larger diameter than the pulleys 304a and 304b; for example, the pulleys 304a and 304b may have diameters of less than 5" (more specifically, one or more of 1", 2", 3", 4", and 5", inclusive. The resulting rotation of the pulleys 304a and 304b occurs at sufficiently high, sustained speeds or RPMs that the corresponding generators 302a and 302b generate electrical power at levels sufficient to energy the OBCS 210 to charge the battery 102 of the BEV 100 while the BEV 100 is in motion.

As the rotors for the generators 302a and 302b rotate, they induce a magnetic field within windings in stator coils of the generators 302a and 302b. The magnetic field generated within the coils may be controlled (for example, increased or decreased) by changing a number of coils in each of the generators 302a and 302b, thus changing the sizing of the generators 302a and 302b. The energy generated by the generators 302a and 302 may be varied (for example, increased or decreased) by introducing and/or changing a number of capacitors or other components utilized in conjunction with the generators 302a and 302b (for example, within the generators 302a and 302b or in series downstream of the generators 302a and 302b), and/or by using a permanent magnet coil in the generators 302. The magnetic field generated within the coils may be directly related to the energy (for example, a current) generated by the generators 302a and 302b. In some embodiments, the magnetic field is related to the torque on the generator such that as the torque on the generator increases, the magnetic field rises. As such, to reduce wear and tear on components in the BEV 100 and to optimize voltage generation, the magnetic field is managed as described herein. In some embodiments, when the fifth wheel 202 comprises the small motor as described above, the small motor is an AC or DC motor and acts as a fail over device that is coupled directly to the rotors of the generators 302 such that the small motor is able to drive the generator should the pulley 204, the fifth wheel 202, or other device coupling the fifth wheel 202 to the generators 302 fail.

Figure 4:
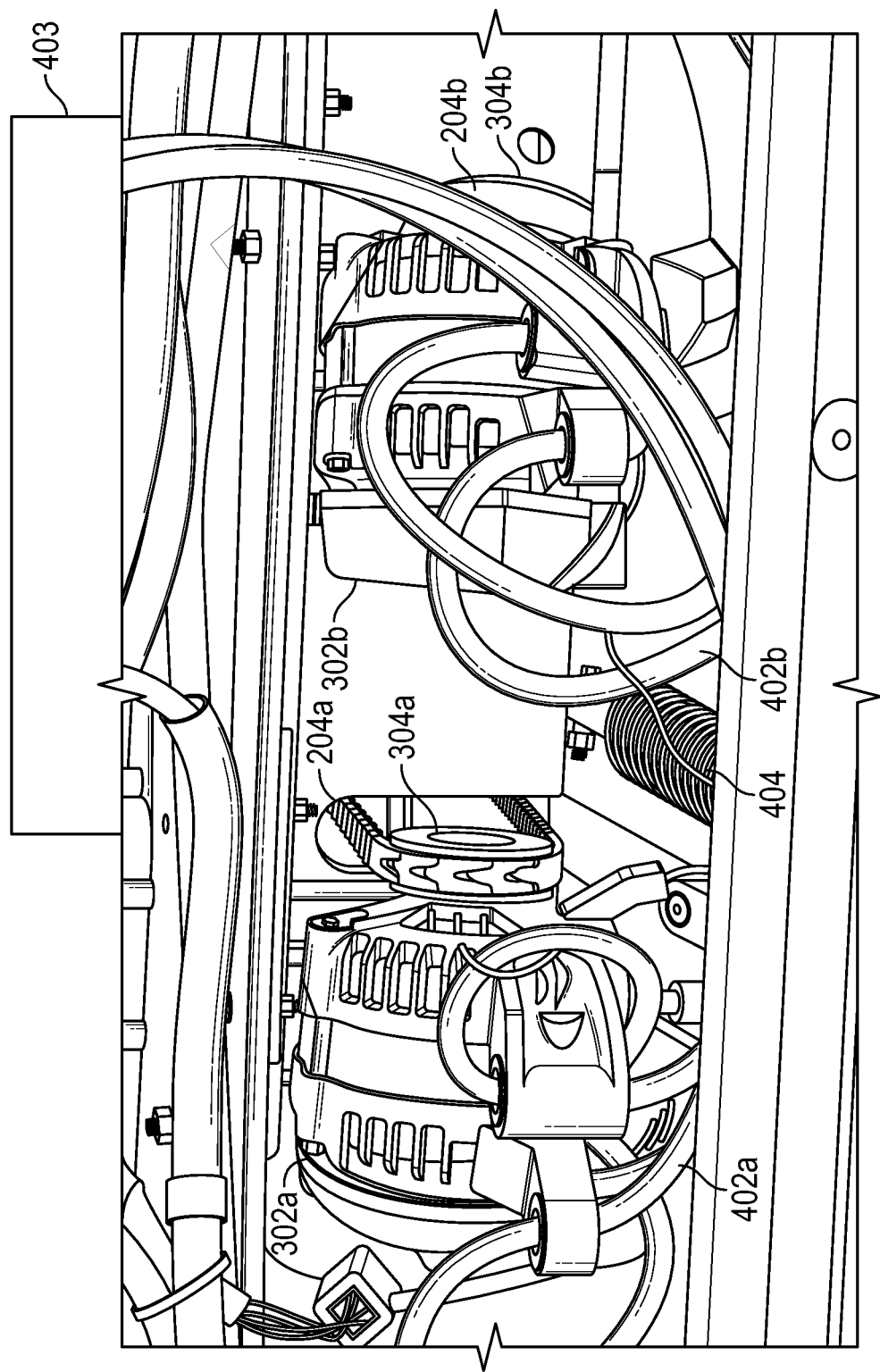
FIG. 4 is an alternate view of the two generators of FIG. 3 and cabling that couples the generators to a mobile battery charger coupled to a charging port for the BEV.

FIG. 4 is an alternate view of the two generators 302a and 302b of FIG. 3 and cabling 402a and 402b that couples the generators 302a and 302b to a battery charger 403 coupled to a charging port for the BEV 100, in accordance with an exemplary embodiment. The generators 302a and 302b are shown with cables 402a and 402b, respectively, that couple the generators 302a and 302b to the battery charger 403. The OBCS 210 may include the battery charger 403 described herein. The battery charger 403 may comprise one or more other components or circuits used to rectify or otherwise condition the electricity generated by the generators 302a and 302b. For example, the one or more other components or circuits may comprise one or more of a matching circuit, an inverter circuit, a conditioning circuit, a rectifying circuit, a conversion circuit, and so forth. The matching circuit may matching conditions of a load to the source (for example, impedance matching, and so forth). The conversion circuit may comprise a circuit that converts an alternating current (AC) signal to a direct current (DC) signal, a DC/DC conversion circuit, a DC/AC conversion circuit and so forth. The conditioning circuit may condition a signal input into the conditioning circuit, and the rectifying circuit may rectify signals. In some embodiments, the support structure 200 may be mounted to the BEV 100 with a shock system or springs 404 to assist with reducing impacts of the road, etc., on the BEV 100 and/or the OBCS 210.

In some embodiments, a rate of rotation of seven hundred (700) revolutions or rotations per minute (RPM) for the fifth wheel 202 identifies a lowest threshold RPM of the fifth wheel 202 at which the generators 302a and 302b will provide sufficient electrical power to charge the battery 102 of the BEV 100 via the OBCS 210. In some embodiments, the fifth wheel 202 may rotate at 3,600 or 10,000 RPM or the generators 302a and 302b (and/or the generator unit 710 described below) may rotate at 3,600 or 10,000 RPM. Furthermore, at or above 700 RPMs for the fifth wheel 202, the fifth wheel 202 (and/or any coupled flywheel) may be capable of maintaining its rate of rotation (for example, the 700 RPMs) even if the fifth wheel 202 it not kept in contact with the ground or road surface while the BEV 100 is moving. For example, the fifth wheel 202 may have a driven mass (referenced herein as "mass") of between 15 and 75 kilograms (for example, one of 15, 20, 25, 30, 35, 40, 45, 50, 55, 60, 65, 70, and 75 kilograms and so forth, or any value therebetween) and the mass may enable the fifth wheel 202 to continue to rotate when not driven by the contact with the ground due to inertia of the fifth wheel 202. For example, once the fifth wheel 202 reaches at least 700 RPMs, the fifth wheel 202 may be retracted from contact with the ground or road surface and continue to rotate at least 700 RPMs based on the inertia of the fifth wheel 202 (and/or any coupled flywheel), enabling the generators 302a and 302b to continue generating power to charge the battery 102 of the BEV 100 when the fifth wheel 202 is retracted. Furthermore, at fifth wheel 202 RPMs greater than or equal to 700 RPMs, the corresponding diameters of the components between the fifth wheel 202 and the generators 302a and 302b (for example, the sprockets 208a and 208b, the pulleys 304a and 304b, and so forth) cause the generators 302a and 302b to generate sufficient power (for example, between 1.2 kW and 120 kW or more) to charge the battery 102 of the BEV 100 using the battery charger 403 at a rate that is greater than a discharge rate of the battery 102 driving the motor 104 and wheels 106 of the BEV 100 to keep the BEV 100 in motion. Thus, at fifth wheel 202 speeds of at least 700 RPM, the generators 302a and 302b generate sufficient electrical energy to replenish the battery 102 as the motors 104 and the wheels 106 move the BEV 100 and drain battery 102. Thus, the fifth wheel 202 may be used to regenerate the battery 102 while the BEV 100 is in motion, therefore extending a range of the BEV 100. In some embodiments, the OBCS 210 enables the harvesting of mechanical energy from the movement of the BEV 100 before the such energy is lost to heat or friction, and so forth. Thus, the OBCS 210, as described herein, may convert kinetic energy that may otherwise be lost to electrical energy for consumption by the BEV 100. In some embodiments, the generators 302a and/or 302b may each generate a voltage of up to 580 VAC when driven by the fifth wheel 202, for example at the rotational speed of between about 700 and 10,000 RPM.

In some embodiments, the fifth wheel 202 or other small motor may be coupled to a flywheel (not shown in this figure) that is configured to generate the inertia used to store kinetic energy of the BEV 100. In some embodiments, the flywheel may be selectively coupled to the fifth wheel 202 or other small motor to allow the flywheel to be selectively engaged with the fifth wheel 202, for example when the BEV 100 is slowing down, when the BEV 100 is accelerating, and so forth. Additionally, the flywheel may be coupled to the fifth wheel 202 via a clutch or similar coupling to allow the flywheel to be driven by the fifth wheel 202 or small motor but not allow the flywheel to drive the fifth wheel 202 or small motor. When the flywheel is included, the flywheel may have a mass of between 15 and 75 kilograms (for example, one of 15, 20, 25, 30, 35, 40, 45, 50, 55, 60, 65, 70, and 75 kilograms and so forth, or any value therebetween).

In some embodiments, the one or more other components or circuits (e.g., the capacitors, matching, filtering, rectifying, and so forth, circuits) clean, convert, and/or condition the electricity provided by the generators 302a and 302b before the electricity reaches the battery charger 403 and/or motor 104. For example, cleaning and/or conditioning the electricity may comprise filtering the electricity or matching of values between a load and a source. Converting the electricity may comprise converting an AC signal to a DC signal, or vice versa (for example, converting an AC signal generated by the generators 302a and 302b to a DC signal for storage in the battery 102 or similar energy storage device. Cleaning, converting, and/or conditioning the electricity provided to the battery charger 403 may help maintain operation of the battery charger 403 and reduce fluctuations in the quality of electricity consumed by the battery charger 403 to charge the battery 102 or drive the motors 104 or the motors 104 to drive the BEV 100. In some embodiments, the battery charger 403 may be selectively coupled directly to the motor 104 instead of having to feed electricity through the battery 102 to then feed the motor 104. Cleaning the energy provided to the battery charger 403 or the motor 104 may also reduce risk of damage to the battery charger 403 and/or the motor 104 that may be caused by the electricity from the generators 302a and 302b. In some embodiments, one or more of the circuits described above may reduce and/or control variance in the electricity generated by the generators 302a and 302b. Similarly, changes in the generators 302a and 302b (for example, inclusion of different circuits in the generators 302a and 302b themselves) may cause the generators 302a and 302b to reduce and/or control variance of the magnetic fields generated in and the electricity generated by the generators 302a and 302b. In some embodiments, the battery charger 403 may be synchronized with the generators 302a and 302b (or other similar generator units).

In some embodiments, the extending and retracting of the fifth wheel 202 may occur based on communications with the controller that monitors the state of charge of the battery 102 and/or demand from the motor 104. For example, when the controller determines that the battery 102 requires a charge or the motor demands electricity (for example, the BEV 100 is accelerating), the controller issues a signal to a fifth wheel 202 control system that causes the fifth wheel 202 to be extended to be in contact with the ground or road surface while the BEV 100 is in motion. Once the fifth wheel 202 reaches an RPM of at least 700 RPM, the rate of rotation (for example, the RPMs) of the fifth wheel 202 may be controlled and/or monitored such that the battery 102 is charged such that the charge of the battery 102 is maintained or increased or such that the motor 104 is provided with sufficient energy to drive the BEV 100. For example, if the controller determines that the battery 102 needs to be charged while the BEV 100 is in motion, the controller may issue the signal to charge the battery 102 to the fifth wheel 202 system. This signal may cause the fifth wheel 202 system to extend the fifth wheel 202 to contact the ground or road surface. When the fifth wheel 202 reaches 700 RPM while the BEV 100 is moving, the generators 302a and 302b generate sufficient electrical energy to charge the battery 102 at a rate greater than it is being discharged by the motor 104 to move the BEV 100 or to feed the motor 104 at a level sufficient to fully drive the BEV 100. As the controller monitors the charge of the battery 102 or the demand from the motor 104, when the charge level or the charge state of the battery 102 or the motor demand 104 reaches a second threshold, the controller may issue a second signal to stop charging the battery 102 or stop feeding the motor 104. This second signal may cause the fifth wheel 202 to be retracted or otherwise disconnect the feed of electricity from the battery 102 or the motor 104.

In some embodiments, retracting the fifth wheel 202 occurs in a controlled matter. In some embodiments, the fifth wheel 202 continues to rotate when it is initially retracted and no longer in contact with the ground or road surface. As such, the generators 302a and 302b coupled to the fifth wheel 202 continue to generate electrical energy while the fifth wheel 202 continues to rotate based on its inertia. The controller may issue the second signal before the battery 102 is fully charged so as to not waste any energy generated by the generators 302a and 302b. In some embodiments, energy generated by the generators 302a and 302b may be offloaded from the BEV 100, for example to a land-based grid or energy storage device (for example, a home battery, and so forth).

In some embodiments, the controlled deceleration of the rotation of the fifth wheel 202 when the fifth wheel 202 is retracted occurs due to a brake or similar component that causes the fifth wheel 202 to stop rotating in a controlled manner. In some embodiments, the brake may include a physical brake or other slowing techniques. In some embodiments, the braking of the fifth wheel 202 is regenerative to provide energy to the battery 102 or the motor 104 while the fifth wheel 202 is braking.

In some embodiments, as described above, the fifth wheel 202 extends in response to the first signal from the controller requesting that the battery 102 of the BEV 100 be charged. As noted above, the fifth wheel 202 may have a mass that allows the fifth wheel 202 to continue to rotate under inertia, etc., when the fifth wheel 202 is retracted and no longer in contact with the ground or road surface while the BEV is in motion. In some embodiments, the fifth wheel 202 is coupled to the flywheel or similar component that spins under the inertia, etc., after the fifth wheel 202 is retracted from the ground or road surface. Based on the inertia of the fifth wheel 202 or the flywheel or similar component, mechanical energy may be generated from the movement of the BEV 100 and stored for conversion to electricity (for example, by the generators 302a and 302b, etc.).

Once the fifth wheel 202 is extended to contact the ground or road surface, the fifth wheel 202 begins rotating when the BEV 101 is moving. Due to the smaller size of the fifth wheel 202, as described above, the fifth wheel 202 rotates with more RPMs than the wheels 106 of the BEV 100. While the fifth wheel 202 rotates, the sprockets 208a and 208b described above also rotate, causing the generators 302a and 302b to generate electrical energy. The continued reduction in diameters of components between the wheels 106 and the pulleys 304 of the generators 302 ensures that the generators 302 rotate at a sufficiently fast rate (RPMs) that they generate power to supply to the OBCS 210, as described herein. The electrical energy is fed to the OBCS 210, which charges the BEV 100 via the charging port of the BEV 100, or directly to the motor 104. The fifth wheel 202 is retracted in response to the second signal from the controller, and may or may not continue to rotate and generate electricity under its inertia.

As described above, due to the mass and other properties of the fifth wheel 202 or the flywheel or similar components, the fifth wheel 202 or the fly wheel or similar components may continue to rotate or otherwise maintain some mechanical energy though the fifth wheel 202 is no longer in contact with the ground or road surface while the BEV 100 is moving. In some embodiments, the fifth wheel 202, once it reaches the 700 RPMs described above, is able to maintain its rotation even though the fifth wheel 202 is no longer being "driven" by the ground or road surface when the BEV 100 is moving. As such, the generators 302a and 302b are able to continue to generate electrical energy for charging the battery 102 or feeding the motor 104 of the BEV 100 via the OBCS 210. In some embodiments, the fifth wheel 202 or the flywheel or similar components may continue to generate mechanical energy that is converted to electrical energy by the generators 302a and 302b until the fifth wheel 202 or flywheel or similar components are stopped using the brake or similar components, as described above, or until the fifth wheel 202 or flywheel or similar components stop rotating due to friction. In some embodiments, the fifth wheel 202 or flywheel may be replaced with a geared motor or similar component that is smaller in diameter than the wheels 106.

In some embodiments, the OBCS 210 includes a second controller that communicates with the controller of the BEV 100. In some embodiments, the second controller is configured to monitor and/or control one or more of the fifth wheel 202, the generators 302a and 302b, and/or the OBCS 210 to control generating a charge for the battery 102 or the motor 104. In some embodiments, the second controller may be configured to engage the brake or otherwise control the fifth wheel 202 to slow the fifth wheel 202 in a controlled manner, for example based on whether or not the OBCS 210 can accept electricity from the generators 302a and 302b. In some embodiments, the second controller may prevent the battery 102 from being overcharged by the OBCS 210. In some embodiments, the OBCS 210 may include controls, etc., to prevent overcharging of the battery 102. In some embodiments, the second controller may be configured to disengage a safety or control that would prevent the BEV 100 from charging while moving or to control whether and when the OBCS 210 provides electricity directly to the motor 104 as opposed to the battery 102.

In some embodiments, the OBCS 210 includes a circuit breaker, fused connection, contactor, or similar electrically or mechanically switchable circuit element or component (not shown) designed to protect downstream components from the electrical output, for example, an excess current signal. In some embodiments, the circuit breaker is installed in series between the generators 302a and 302b and the battery charger 403 or in series between the battery charger 403 and the BEV charging port. In some embodiments, the circuit breaker is controlled by one or more of the controller of the BEV or the second controller of the OBCS 210 and disconnects downstream components from any upstream components. For example, if the battery 102 reaches a full state while being charged by the OBCS 210 or the motor 104 stops requesting energy, the BEV controller may send a signal to the circuit breaker to open the circuit/path between so that the battery 102 and/or the motor 104 is no longer receiving electricity from the OBCS 210. In some embodiments, the circuit breaker receives the "open" command or signal from the second controller of the OBCS 210, which receives a signal that the battery 102 is in the fully charged state or the motor 104 no longer demands energy from the BEV controller. In some embodiments, the similar "stop charging" command may be provided to the OBCS 210 (from one or both of the BEV controller and the second controller of the OBCS 210) and the OBCS 210 may stop providing a charge to the BEV based on receipt of such a command.

In some embodiments, the battery 102 may have an input path by which the battery 102 is charged and an output path by which the battery 102 is discharged. In some embodiments, the input path may be similar (for example, in routing) to the output path. In some embodiments, the input and output paths may be different (for example, in routing). In some embodiments, the input path includes a single input node by which a charge is received to charge the battery 102. For example, the single input node is coupled to the charging port of the BEV 100 and/or the regenerative braking system described above. In some embodiments, the input path includes a plurality of input nodes individually coupled to different charge sources. For example, a first input node is coupled to the charging port of the BEV 100 while a second input node is coupled to the regenerative braking port. As other charge sources are introduced, for example a capacitor array, another battery, a range extending generator, or another charge storage device, as described in further detail below, additional input nodes may be added to the battery 102 or the other charge sources may be coupled to the single input node along with the charging port and the regenerative braking system. Similarly, the output path may include a single output node or a plurality of output nodes by which the battery 102 are discharged to one or more loads, such as the electric motors 104 that move the BEV 100, an DC/AC converter, or the other battery, capacitor, or charge storage device.

Figure 5:
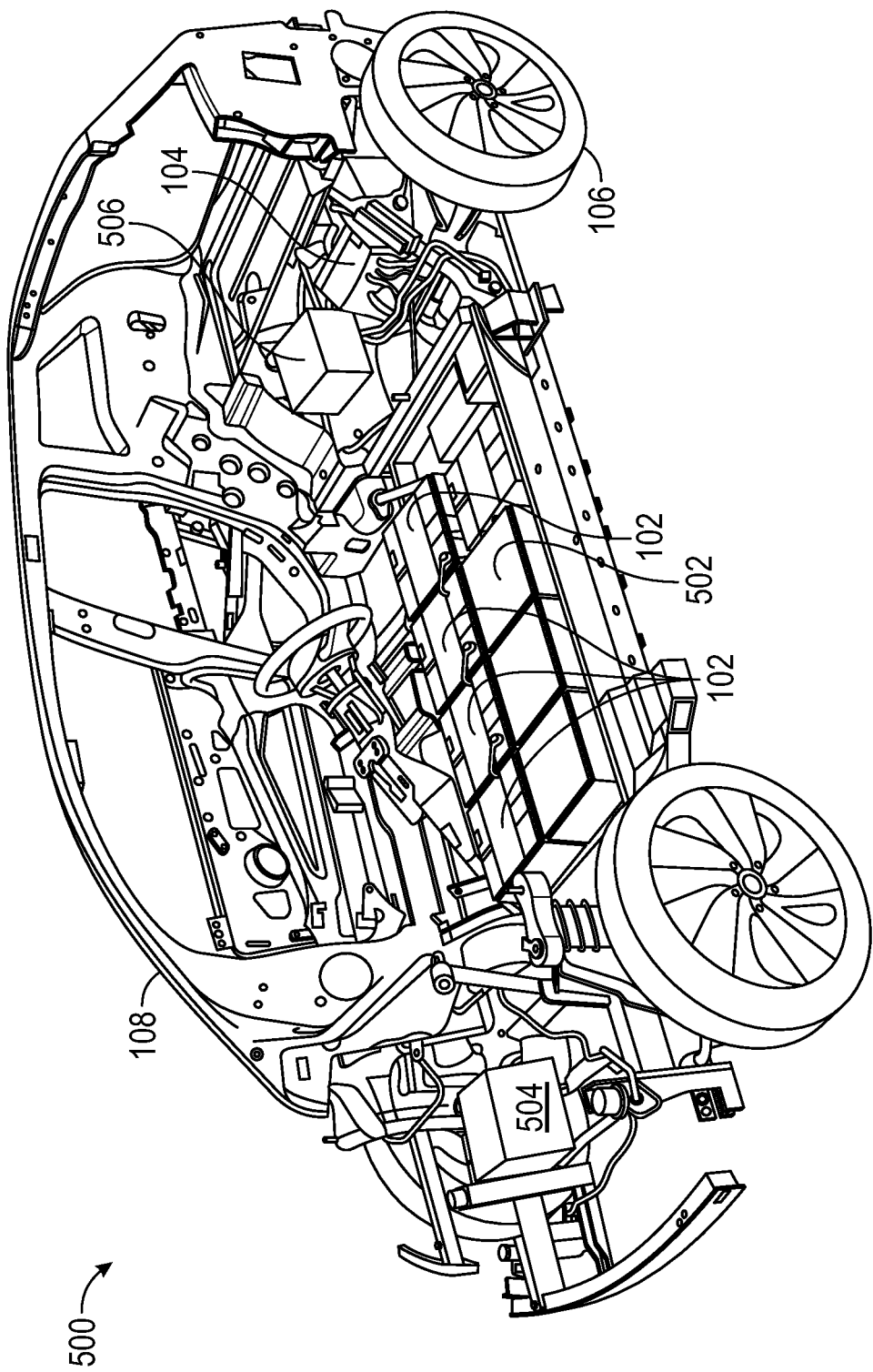
FIG. 5 is a diagram of the exemplary BEV of FIG. 1 incorporating one or more capacitor modules as a supplemental and/or intermediate energy storage device.

FIG. 5 is a diagram of the exemplary BEV 500 of FIG. 1 incorporating one or more capacitor modules 502 as a supplemental and/or intermediate energy storage device. In some embodiments, the capacitor modules 502 are disposed alongside the battery 102. The capacitor modules 502 and the battery 102 are electrically coupled to at least one deep cycle battery 504. The capacitor modules 502 and the deep cycle battery 504 may be coupled to a DC-to-DC converter 506 that the battery 102 provides energy to the capacitor modules 502 and/or to the deep cycle battery 504 and vice versa.

The battery 102 (for example, battery energy storage devices) as described herein generally store energy electrochemically. As such, a chemical reaction causes the release of energy (for example, electricity) that can be utilized in an electric circuit (for example, any of the circuits or motors described herein). In some embodiments, the battery 102 that is predominantly used in BEVs 500 is a lithium ion battery. Lithium ion batteries use lithium ion chemical reactions to discharge and charge the batteries. Due to the corresponding chemical processes associated with the charging and discharging, the charging and discharging of the battery 102 may be relatively time consuming. Additionally, the charging and discharging of the battery 102 may degrade the chemical components (for example, the lithium) within the battery 102. However, the battery 102 is capable of storing large amounts of energy and, thus, have high energy densities.

An alternative energy storage device is the capacitor (for example, supercapacitor and/or ultracapacitor) module 502 or energy storage device. The capacitor module 502 may store energy electrostatically instead of chemically. The capacitor module 502 may be charged and/or discharged more quickly than the battery 102. The capacitor module 502 may be smaller in size than the corresponding battery 102 and, thus, may have a higher power density as compared to the corresponding battery 102. However, while the capacitor module 502 may be charged and/or discharged more quickly than the corresponding battery 102, the capacitor module 102 may have a lower energy density as compared to the battery 102. As such, for the capacitor module 502 to have a corresponding energy density as compared to the corresponding battery 102, the capacitor module 502 will have to be physically much larger than the corresponding battery 102.

In some embodiments, the capacitor modules 502 may be used in combination with the battery 102. For example, as shown in FIG. 5, the BEV 500 may include one or more the capacitor modules 502 installed alongside the battery 102. In some embodiments, the BEV 500 includes a plurality of capacitor modules 502. In some embodiments, one or more batteries 102 are replaced with one or more capacitor modules 502. As shown, the capacitor modules 502 may be connected in series or in parallel with the battery 102, dependent on the use case. For example, the capacitor modules 502 may be connected in series or parallel with the battery 102 when supplementing the voltage in the battery 102 or when charging the battery 102 and/or the capacitor modules 502. Therefore, the battery 102 and the capacitor modules 502 may provide voltage support to each other. As such, the capacitor modules 502 may provide supplemental energy when the battery 102 are discharged or be used in place of the battery 102 altogether.

In some embodiments, the capacitor modules 502 provide a burst of energy on demand to the battery 102 or to the motor 104. For example, the capacitor modules 502 are coupled to the vehicle (or another) controller that monitors a charge level of the battery 102 and/or an energy demand of the motors 104. The controller may control coupling of the capacitor modules 502 to the battery 102 to charge the battery 102 with the burst of energy from the capacitor modules 502 when the charge level of the battery 102 falls below a threshold value or may couple the capacitor modules 502 or the battery 102 to supplement an output energy of the battery 102.

The deep cycle battery 504 may be disposed at any location in the BEV 500 such that the deep cycle battery 504 is electrically coupled to the capacitor modules 502, the battery 102, and the generators 302a and 302b. The deep cycle battery 504 (or the battery 102 or the capacitor module 502) may provide a sink or destination for excess energy generated by the generator 302a and 302b. For example, when the generators 302a and/or 302b generate energy and the capacitor modules 502 and the battery 102 are fully charged and/or otherwise unable to accept additional charge, the excess energy generated by the generators 302 and/or 302b may be stored in the deep cycle battery 504. This excess energy may then be fed back into the generators 302a and 302b or back into the battery 102 and/or the capacitor modules 502. In some embodiments, when excess energy overflows to the deep cycle battery 504, the deep cycle battery 504 provides backup power to the BEV 500 and/or provide power to any components of the BEV 500, for example providing starting assistance if needed. As such, the deep cycle battery 504 may be coupled to the battery 102 and the capacitor modules 502 in a reconfigurable manner such that the deep cycle battery 504 may be used for storage of the overflow energy but also be connected to provide power to the battery 102 and/or the capacitor modules 502. In some embodiments, the deep cycle battery 504 provides load balancing to the battery 102 and/or the capacitor modules 502. In some embodiments, the capacitor modules 502 and/or the deep cycle battery 504 feeds power back to the generators 302a and 302b and/or directly into one of the battery 102 and/or the capacitor modules 502. In some embodiments, the deep cycle battery 504 couples directly to a load of the BEV 500. Thus, in some embodiments, one or more components of the BEV 500 (for example, one or more motors 104, the drivetrain, auxiliary systems, heat, ventilation, and air conditioning (HVAC) systems, and so forth) receives power from one or more of the battery 102, the capacitor modules 502, and the deep cycle battery 504. In some embodiments, when the generators 302a and/or 302b generate energy and the battery 102 is fully charged and/or otherwise unable to accept additional charge and the motors 104 do not need any energy, the energy generated by the generators 302a and 302b may be excess energy. This excess energy may be stored in the capacitor module 502. This excess energy may then be fed back into the generators 302a and 302b or back into the battery 102 and/or the motor 104. In some embodiments, when excess energy overflows to the capacitor module 502, the capacitor module 502 provides backup power to the BEV 500 and/or provides power to any components of the BEV 500, for example providing starting assistance if needed.

The DC-to-DC converter 506 may provide energy conversion between the generators 302 and one or more of the capacitor modules 502 and the deep cycle battery 504. In some embodiments, the DC-to-DC converter 506 is integrated with the OBCS 210. For example, the DC-to-DC converter 506 is a component of the OBCS 210 that provides voltage conversion to charge the battery 102 and also charge the capacitor modules 502 and/or the deep cycle battery 504. In some embodiments, the deep cycle battery 504 and the capacitor modules 502 are not coupled to the OBCS 210 and instead receive their energy directly from the generators 302, for example via the DC-to-DC converter 506. In some embodiments, the DC-to-DC converter 506 may comprise one or more components in the battery charger 403.

As shown in FIG. 5, the various components of the BEV 500 are integrated such that power generated by the fifth wheel 202 or a similar energy generation, regeneration, or recovery system (for example, regenerative braking, solar panels, and so forth) is stored in any of the battery 102, the capacitor modules 502, and the deep cycle battery 504. In some embodiments, the deep cycle battery 504 and/or the capacitor modules 502 provide load balancing for the battery 102, and vice versa. As such, the deep cycle battery 504 and/or the capacitor modules 502 may be coupled (in a switchable manner) to both the output of the generators 302 (via the DC-to-DC converter 506 and/or the OBCS 210) and also the input of the generators 302. Alternatively, the deep cycle battery 504 and/or the capacitor module 502 couples (in a switchable manner) to both the output of the battery 102 and also the input of the battery 102. In some embodiments, the outputs of the deep cycle battery 504 and the capacitor modules 502 couple with the generators 302a and 302b to ensure that the battery 102 is charged with a sufficient voltage level.

Figure 6:
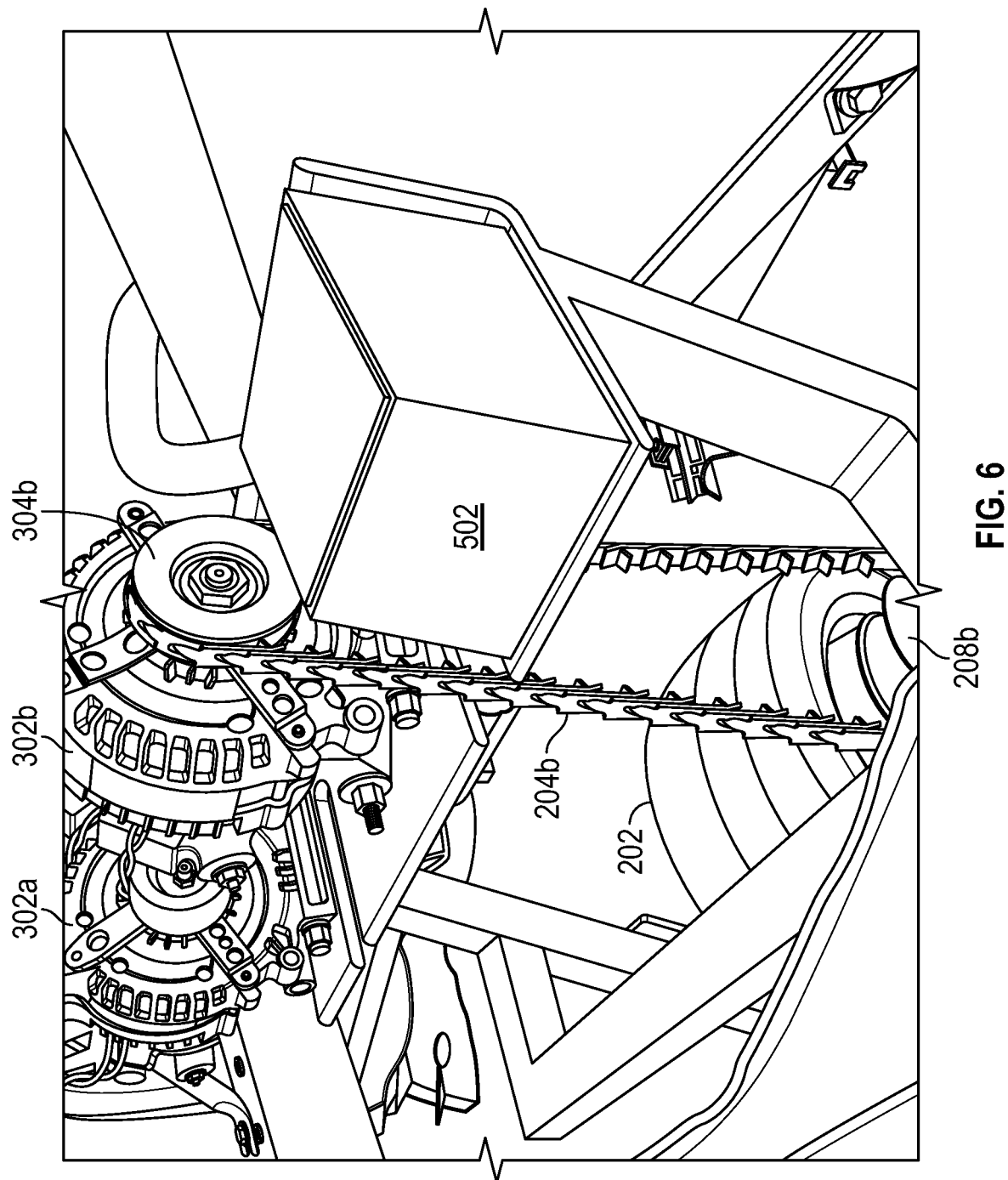
FIG. 6 is a diagram of the coupling of the fifth wheel and the two generators of FIG. 3 with the addition of a capacitor module into the charging system of the BEV.

FIG. 6 is a diagram of the coupling of the fifth wheel 202 and the two generators 302a and 302b of FIG. 3 with the addition of a capacitor module 502 into the charging system of the BEV 100/500. As shown, one or more of the capacitor modules 502 described above may be located and/or positioned as shown in FIG. 6. As described herein, the capacitor module 502 may be used to store energy for delivery to the battery 102 or the motor 104.

Figure 7:
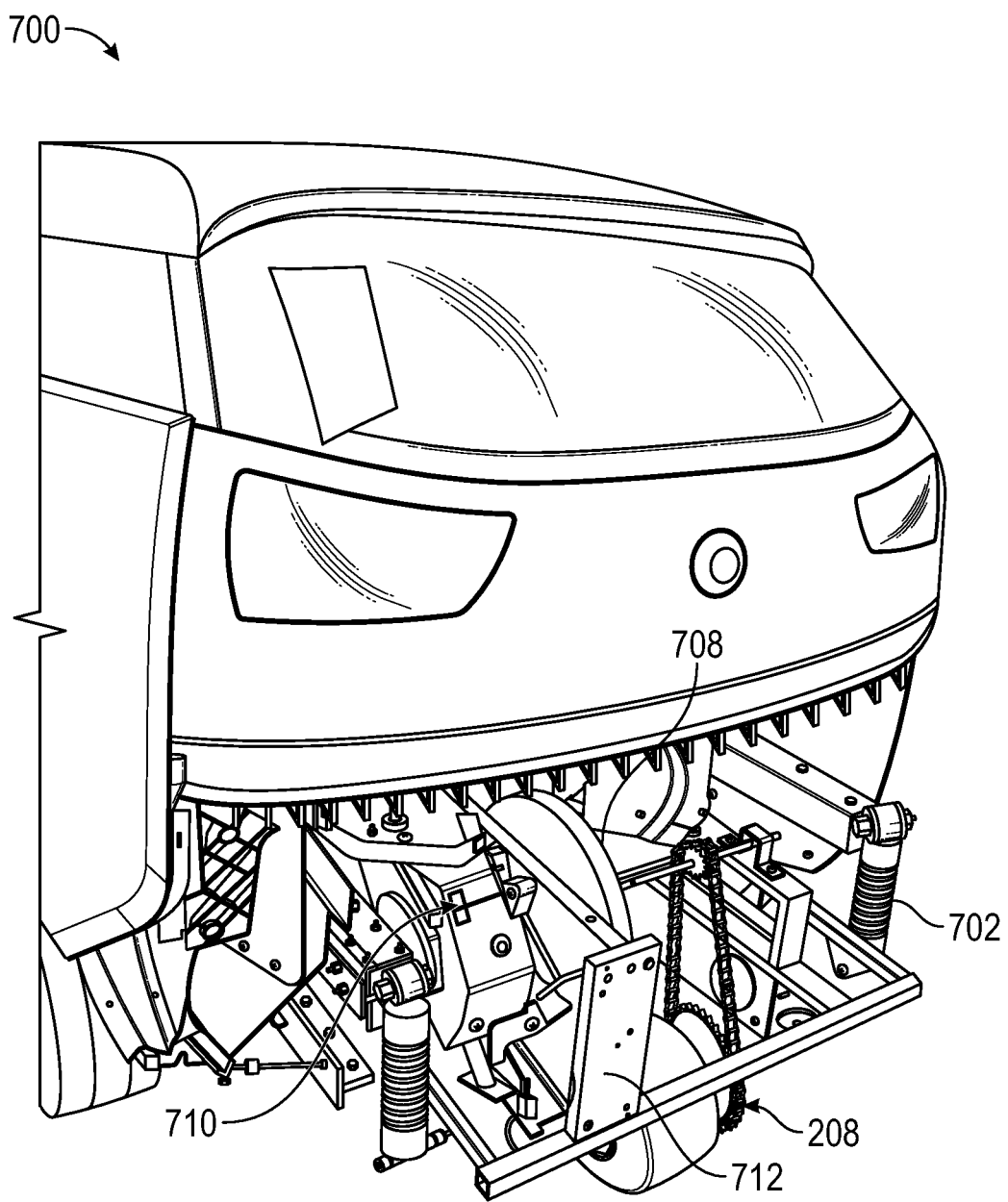
FIG. 7 is an alternate fifth wheel system illustrating the fifth wheel of FIG. 2 mechanically coupled to a generation unit that converts a mechanical rotation of the fifth wheel into an electrical energy output.

FIG. 7 is an alternate fifth wheel system 700 illustrating the fifth wheel of FIG. 2 mechanically coupled to a generation unit 710 that converts a mechanical rotation of the fifth wheel into an electrical energy output to the BEV 100, for example the battery 102 or the capacitor module 502. In some embodiments, the OBCS 210 described herein comprises the generation unit 710 (for example, instead of or in addition to the generators 302a and 302b described above). The generation unit 710 and the generators 302a and 302b may be used interchangeably herein. In some embodiments, the generation unit 710 may be directly coupled to the battery 102, the capacitor module 502, and/or the motor 104. The system 700 includes the fifth wheel 202 as supported by the support structure 200 as shown in FIG. 2. In some embodiments, the support structure 200 includes an independent suspension system 702 that enables the fifth wheel 202 and the corresponding components coupled to the fifth wheel 202 to move vertically and/or horizontally relative to the ground or the road surface or the BEV 100 to react or respond to variations in the road or road surface. The independent suspension 702 may operate independently of the suspension of the BEV 100, thus allowing the fifth wheel 202 and corresponding components to move differently from the BEV 100, allowing the fifth wheel system 700 to "float freely" relative to the BEV 100. The independent suspension 702 may help protect the components coupled to the fifth wheel 202 (for example, the components shown in FIG. 7) by reducing the effects of the variations in the road or road surface to the components. In some embodiments, the independent suspension 702 includes one or more shocks, struts, linkages, springs, shock absorbers, or similar components that help enable, compensate for, and/or reduce the vertical and/or horizontal movement of the fifth wheel 202 and coupled components. In some embodiments, the independent suspension 702 also includes various components that improve stability of the components of the OBCS 210 described herein. For example, the independent suspension 702 may include a stabilization bracket 712 disposed between a flywheel 708 and a generation unit 710, described in more detail below. The stabilization bracket 712 disposed between the flywheel 708 and the generation unit 710 may provide stabilizing supports between two components that move or have moving parts. The generation unit 710 may include the generator 302 described above or an alternator or any corresponding component(s) that generate electricity from mechanical energy. The generation unit 710 may harvest the mechanical/kinetic energy from the movement of the BEV 100 (or from the inertia caused by the movement of the BEV 100) prior to a build-up of friction or heat or other conditions that may otherwise cause energy to be lost by the BEV 100 (for example, to the heat or other conditions), thereby saving and storing energy that would otherwise be lost or wasted.

The alternate system 700 further may include the fifth wheel 202 configured to rotate or spin on the shaft 206. As described above, the rotation of the fifth wheel 202 causes the shaft 206 to rotate and further causes the sprocket 208 and chain 204 to rotate. The chain 204 is coupled to a second shaft 704, for example via a second pulley or sprocket 709 rotated by the chain 204. In some embodiments, the shaft 206 is coupled to the second shaft 704 via another means, for example a direct coupling, a geared coupling, and so forth. In some embodiments, the sprockets 208 and 709 (or similar components) and so forth may be sized to allow for balancing of rotational speeds between the various components. For example, the sprockets 208 on the shaft 206 and corresponding sprockets or gearing on the second shaft 704 are sized to balance rotations between the fifth wheel 202 and the generation unit 710. In some embodiments, the sizing for the sprockets 208 and 709 (and similar components) is selected to control the electricity generated by the generation unit 710.

In some embodiments, the second shaft 704 includes a one-way bearing 706 (shown in FIG. 8A) or similar component that allows a first portion of the second shaft 704 to rotate at least partially independently of a second portion of the second shaft 704. The first portion of the second shaft 704 may be mechanically coupled to the shaft 206 (for example, via the chain 204, the sprocket 709, and the sprocket 208 or another mechanical coupling means). The second portion of the second shaft 704 may be mechanically coupled to the flywheel 708 or other mass and further coupled to the generation unit 710. The flywheel 708, as described above, may be configured to store kinetic energy generated by the rotation of the fifth wheel 202 and the second shaft 704. The generation unit 710 may convert the mechanical kinetic energy of the flywheel 708 into electrical energy for storage in the battery 102, capacitor module 502, or other energy storage device or conveyance to the motor 104 of FIG. 1.

The one-way bearing 706 may enable the first portion of the second shaft 704 to cause the second portion rotate while preventing the second portion from causing the first portion to rotate. Thus, the fifth wheel 202 may cause the flywheel 708 to rotate but the rotation of the flywheel 708 may have no impact on the rotation or movement of the fifth wheel 202, the shaft 206, and the sprocket 208, and the chain 204. Furthermore, due to the one-way bearing 706, the flywheel 708 continues to rotate even if the fifth-wheel 202 slows or stops rotating. In some embodiments, the flywheel 708 includes a mass of approximately 25 kilograms (kg). This mass may vary based on the specifics of the BEV 100 and the generation unit 710. For example, the flywheel 708 can have a mass of as little as 15 kg or as much as 75 kg, as described above. The mass of the flywheel 708 may allow the inertia of the rotating flywheel 708 to continue rotating when the fifth-wheel 202 slows or stops. The inertia may cause the flywheel 708 to rotate with sufficient speed and/or duration to cause the generation unit 710 to generate more than an unsubstantially amount of electrical energy. For example, the flywheel 708 mass of approximately 25 kg allows the flywheel 708 to continue rotating for a number of minutes after the fifth wheel 202 stops rotating. For example, if the fifth wheel 202 slows to a stop from a speed of rotating at approximately 60 miles per hour (mph) in thirty seconds, the inertia of the flywheel 708 may allow the flywheel 708 to continue to rotate for an additional five to ten minutes (for example, enabling the flywheel 708 to slow to a stop from the speed of 60 mph in the five or ten minutes). Thus, the inertia of the rotating flywheel 708 may enable the generation unit 710 to continue to generate electrical energy at a greater rate for a longer period of time than if the generation unit 710 is directly coupled to the fifth wheel 202. In some embodiments, the mass of the flywheel 708 may be selected based on a desired time for the flywheel 708 to continue to rotate after the fifth wheel 202 stops rotating. For example, if the flywheel 708 is to continue rotating for thirty minutes after the fifth wheel 202 stops rotating, then the flywheel 708 may be given a mass of 50 kg. In some embodiments, the one-way bearing 706, the second shaft 704, and the flywheel 708 are designed and assembled such that friction and/or other resistance to the rotation of these components is minimized or reduced to enable a maximum amount of kinetic energy from the rotation of the fifth wheel 202 to be converted into electrical energy by the generation unit 710.

Thus, the use of the one-way bearing 706 may enable the generation unit 710 to continue to generate electricity for the battery 102, the capacitor module 502, and/or the motor 104 when the BEV 100 slows or comes to a physical stop (for example, when the BEV slows its momentum or stops moving). The one-way bearing 706 may include a first side that rotates or spins independently of a second side. The first and second sides may be coaxial. The flywheel 708 may be connected on the first side of the one-way bearing 706 and the first portion of the second shaft 704 may be connected on the second side of the one-way bearing 706. Thus, the generation unit 710 may continue to generate electrical energy at a high rate even as the BEV 100 slows or is stopped. In some embodiments, the second shaft 704 includes multiple one-way bearings 706 that allow the second shaft 704 to support multiple flywheels 708 that can independently drive one or more generation units 710, thereby allowing the inertia of the flywheels 708 to generate larger amounts of electrical energy (not shown these figures)
.

In some embodiments, instead of or in addition to the second shaft 704 including the first portion and the second portion, the one-way bearing 706 couples directly to the flywheel 708 which is coupled directly to the generation unit 710. Thus, the second shaft 704 may include a single portion where the one-way bearing 706 allows the directly coupled flywheel 708 to continue rotating even when the fifth wheel 202 slows or is not rotating. As the flywheel 708 is directly coupled to the generation unit 710, the generation unit 710 is also able to continue generating the electrical energy based on the rotation of the flywheel 708 when the fifth wheel 202 slows or stops rotating. Further details of how the flywheel 708 and the generation unit 710 are coupled are provided below.

The generation unit 710 may be electrically coupled to a capacitor (for example, one of the capacitor modules 502), the battery 102, the motor 104, and/or a cut-off switch. The cut-off switch may disconnect the output of the generation unit 710 from the capacitor, the battery 102, and/or the motor 104 such that electrical energy generated by the generation unit 710 may be transferred to the battery 102, the capacitor module 502, or to the motors 104 as needed. In some embodiments, the cut-off switch can be controlled by an operator or the controller of the BEV 100 or the second controller of the OBCS 210. For example, the controller of the BEV 100 or the OBCS 210 may receive, identify, and/or determine an interrupt signal to initiate the dump. In response to the interrupt signal, the controller may disconnect the output of the generation unit 710 from the battery 102, the capacitor module 502, and/or the motor 104. Disconnecting the output of the generation unit 710 from the capacitor, the battery 102, and/or the motor 104 may ensure that any residual electrical energy in one or more components of the OBCS 210 (for example, the generation unit 710) is transferred or "dumped" to the battery 102 and/or the capacitor module 502 and therefore control a supply of back-up high voltage. In some embodiments, during the dump, the output of the generation unit 710 may be connected to a dump load or similar destination when disconnected from the capacitor module 502, the battery 102, and/or the motor 104 to prevent damage to any coupled electrical components. In some embodiments, the dump load may comprise a back-up battery, capacitor, or similar energy storage device. In some embodiments, the voltage dump may occur for a period of time and/or at periodic intervals defined by one or more of a time for example since a previous dump, a distance traveled by the vehicle for example since the previous dump, a speed of the vehicle for example since the previous dump, and a power generated and/or output by the generation unit 710, for example since the previous dump. After the dump is complete (for example, the period of time expires), then the controller may disconnect the dump load from the generation unit output (for example, at a generation unit terminal) and reconnect the battery 102, the capacitor module 502, and the motor 104.

In some embodiments, the voltage dump may comprise opening a contactor that is positioned downstream of the generation unit 710 or the generators 302. Opening the contactor may disconnect the generation unit 710 or the generators 302 from the downstream components (for example, the load components for the generation unit 710 or the generators 302). In some embodiments, the controls for initiating and/or deactivating the dump are conveniently located for the vehicle operator to access or coupled to the controller for the BEV 100.

In some embodiments, the generation unit 710 outputs the generated electrical energy in pulses or with a constant signal. For example, the operator or the controller of the BEV 100 or the second controller of the OBCS 210 In some embodiments, the generation unit 710 is switchable between outputting the electrical energy in pulses or in the constant signal. The operator may control whether the output is pulsed or constant or the OBCS 210 may automatically control whether the output is pulsed or constant without operator intervention based on current demands of the BEV 100 and so forth. In some embodiments, when the output is pulsed, the operator and/or the OBCS 210 can control aspects of the pulsed signal, including a frequency of the pulse, an amplitude of the pulse, a duration of each pulse, and so forth. Similarly, when the output is constant, the operator and/or the OBCS 210 may control aspects of the constant signal, including a duration of the signal and an amplitude of the signal.

In some embodiments, the operator of the BEV 100 can control the height of the fifth wheel 202. For example, the operator determines when to lower the fifth wheel 202 so that it is in contact with the road or a road surface, thereby causing the fifth wheel 202 to rotate. The operator may have controls for whether the fifth wheel 202 is in a raised position, where it is not in contact with the road, or in a lowered position, where it is in contact with the road. Additionally, or alternatively, the operator may have options to control specifics of the raised or lowered position, for example how low to position the fifth wheel 202. Such controls may allow the operator to control the amount of force that the fifth wheel 202 provides on the road or road surface, which may impact the electrical energy generated by the OBCS 210. For example, when the fifth wheel 202 is pressing down on the road surface with a large amount of force, then this force may create more resistance against the fifth wheel 202 rotating when the BEV 100 is moving, thereby reducing the electrical energy generated by the OBCS 210. On the other hand, when the force on the fifth wheel 202 is small amount of force, then the fifth wheel 202 may lose contact with the road or road surface depending on variations in the road surface, thereby also reducing the electrical energy generated by the OBCS 210. Thus, the controls may provide the operator with the ability to tailor the downward force exerted by the fifth wheel 202 on the road based on road conditions and based on the need for power. In some embodiments, the OBCS 210 may automatically control the force of the fifth wheel 202 on the road to maximize electrical energy generation based on monitoring of the road surface and electrical energy being generated.

Additionally, the operator of the BEV 100 may choose to extend the fifth wheel 202 so that it contacts the road or retract the fifth wheel 202 so that it does not contact the road based on draft or drag conditions. For example, if the drag increases or is expected to increase based on various conditions, the operator may choose to retract the fifth wheel 202 or keep the fifth wheel 202 retracted. If the drag decreases or is expected to decrease based on conditions, then the operator may choose to extend the fifth wheel 202 or keep it extended. In some embodiments, the OBCS 210 may automatically extend and/or retract the fifth wheel 202 based on drag or potential drag conditions without the operator's involvement.

Figure 8A:
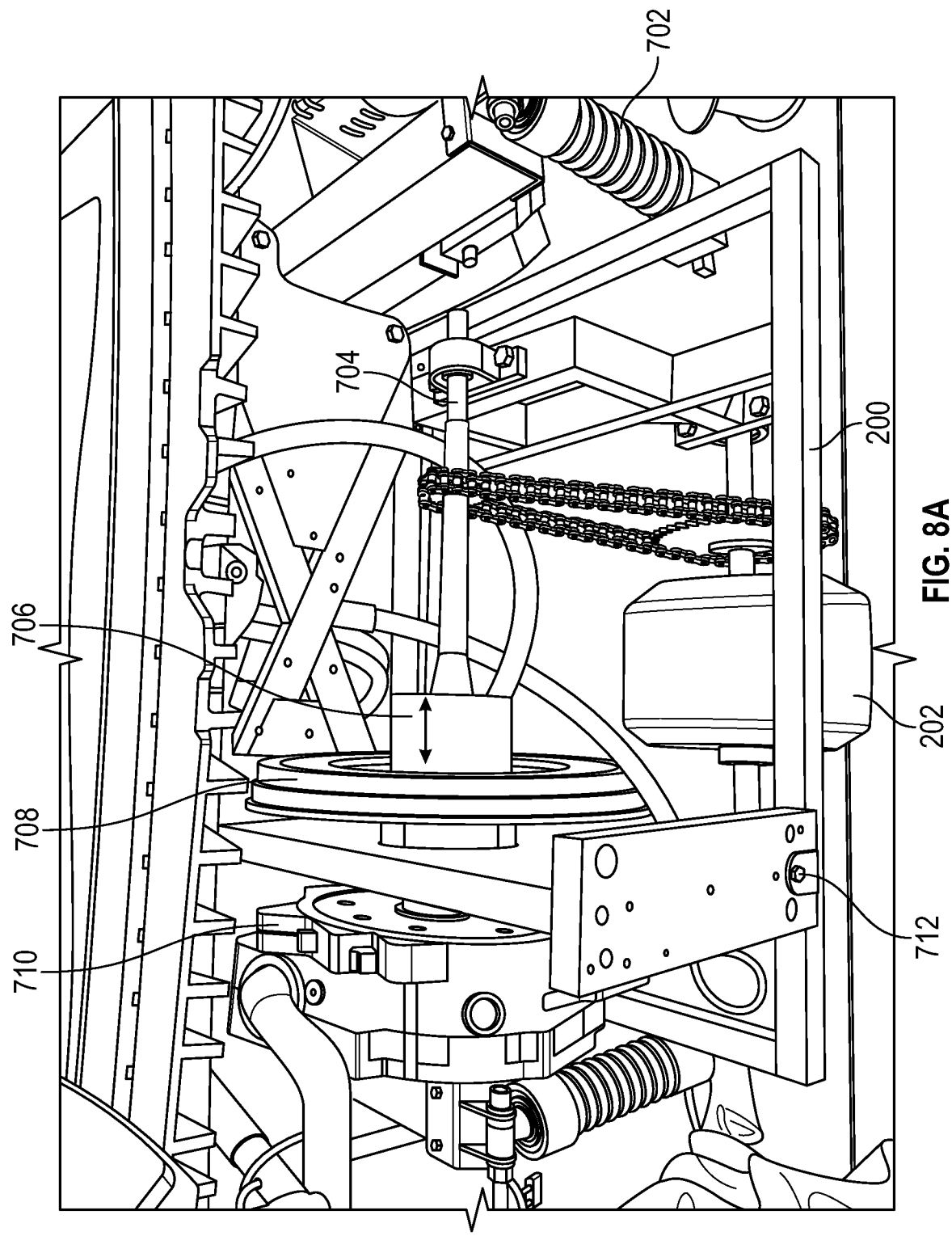
FIGS. 8A and 8B provide additional views of the alternate fifth wheel system of FIG. 7.
Figure 8B:
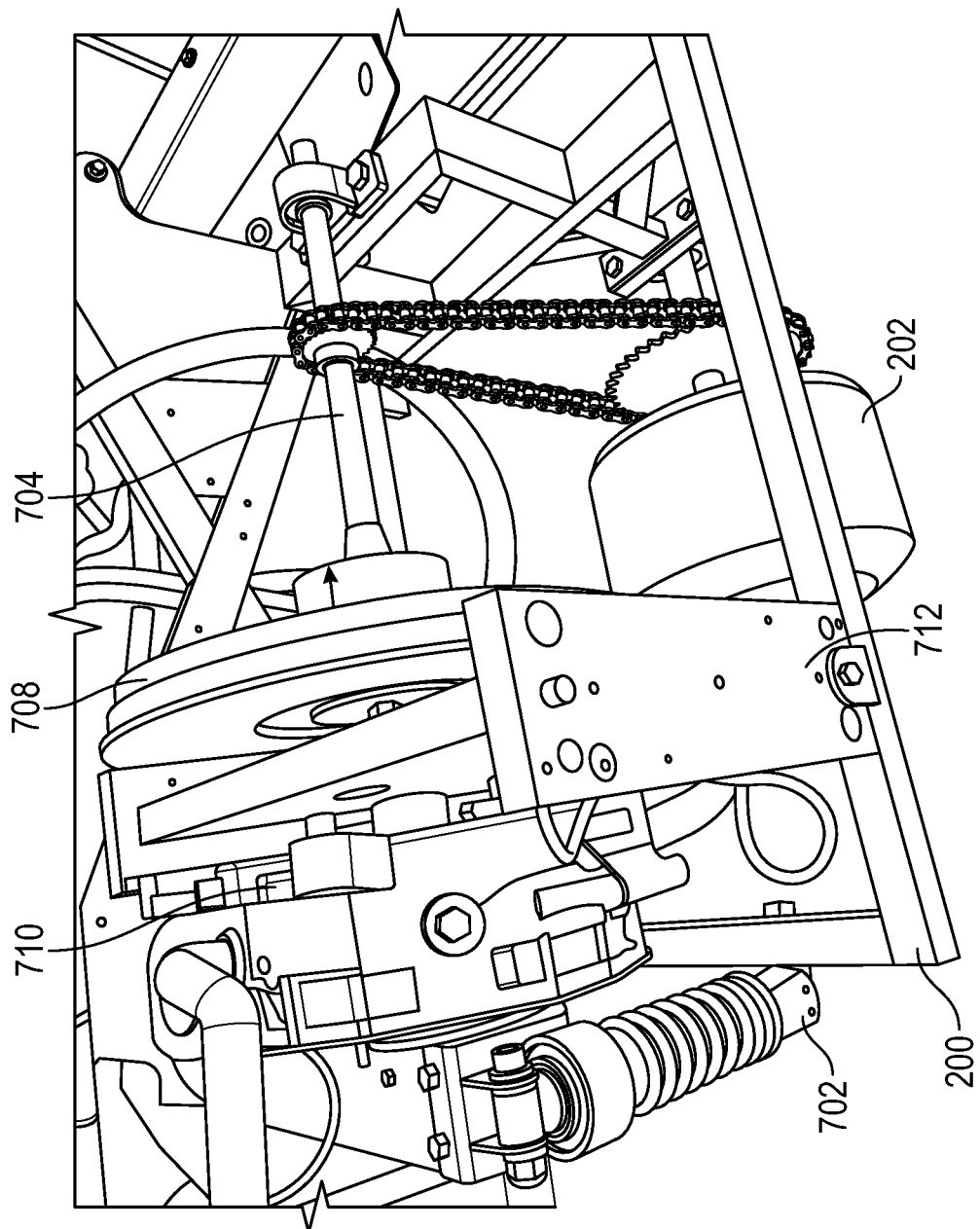

FIGS. 8A and 8B provide additional views of the alternate fifth wheel system 700 of FIG. 7. The additional views show details regarding the stabilization bracket 712 disposed between the flywheel 708 and the generation unit 710. In some embodiments, the stabilization bracket 712 bolts to the support structure 200 described herein. As the support structure 200 includes the independent suspension 702, the stabilization bracket 712 may be protected from sudden movements of the fifth wheel 202. The stabilization bracket 712 may provide support for one or both of the flywheel 708 and the generation unit 710. For example, a drive shaft or similar component may pass from the flywheel 708 to the generation unit 710 through the stabilization bracket 712. For example, the generation unit 710 includes an axle or input shaft that, when rotated, causes the generation unit 710 to generate an electrical energy output relative to the rotation of the input shaft. The input shaft of the generation unit 710 may pass into and through the stabilization bracket, as shown in further detail with respect to FIG. 9. The flywheel 708 may be directly disposed on the input shaft of the generation unit 710 or may otherwise couple to the input shaft of the generation unit 710 such that rotation of the flywheel 708 causes the input shaft to rotate. Due to the one-way bearing 706, the flywheel 708 continues to rotate even if the fifth-wheel 202 slows or stops rotating.

For example, a weight of the flywheel 708 may produce a downward force on the second shaft 704 and the one-way bearing 706. The stabilization bracket 712 may provide dual purposes of relieving some of the force on the one-way bearing 706 and the second shaft 704, thereby extending the operating lives of one or both of the one-way bearing 706 and the second shaft 704 as well as reducing vibrations, etc., of the generation unit 710, the flywheel 708, the one-way bearing 706, and the second shaft 704. The stabilization bracket 712 may keep these components from shaking during rotation, thereby providing improve stability of the support structure 200 as a whole. In some embodiments, the stabilization bracket 712 includes a hole through which the input shaft of the generation unit 710 passes. The hole may include a bearing or similar component that supports the input shaft passing through the hole while also reducing or minimizing drag or friction on the input shaft.

Figure 9:
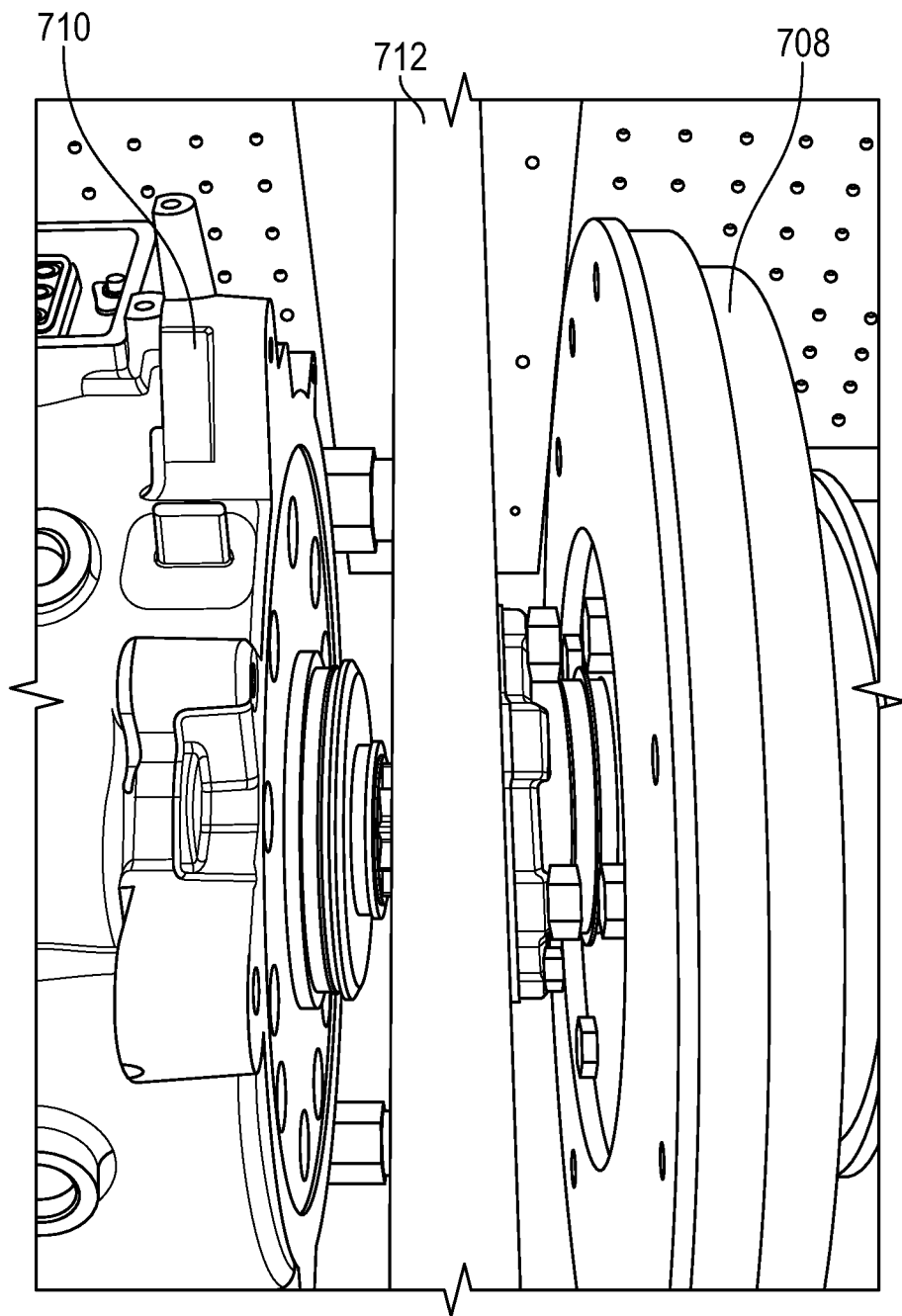
FIG. 9 illustrates a close-up view of the stabilization bracket between the generation unit and the flywheel of FIG. 7.

In some embodiments, as shown in FIG. 9, which provides a close-up view of the stabilization bracket 712 between the generation unit 710 and the flywheel 708, the generation unit 712 may be bolted to the stabilization bracket 712.

FIGS. 10A-10P are screenshots of an interface that presents various data points that are monitored during operation of the EV with an example embodiment of the generators 302, the generation unit 710, and/or the OBCS 210 described herein. Each of the screenshots of FIGS. 10A-10P include a torque field 1005 indicating a torque value generated by the fifth wheel or similar drive component (e.g., the small motor) for the OBCS 210, measured in Newton-meters (Nm). Each of the screenshots of FIGS. 10A-10P also include three phase currents for the three-phase AC power generated by the generators 302 or the generation unit 710. For example, a first phase current field 1010 indicates a current value of a first phase of the three-phase AC power generated by the generators 302 or generation unit 710 (and fed to the battery 102, capacitor module 502, or motor 104 via the battery charger 403 or similar filtering, conversion, and conditioning circuits). A second phase current 1015 field indicates a current value of a second phase of the three-phase AC power generated by the generators 302 or generation unit 710. A third phase current field 1020 indicates a current value of a third phase of the three-phase AC power generated by the generators 302 or generation unit 710. Each current value of the first phase current field 1010, the second phase current field 1015, and the third phase current field 1020 is measured in amps (A).

Each of the screenshots of FIGS. 10A-10P also include a speed field 1025 that indicates a rotational speed value of the rotor of the motor (or generator 302 or generation unit 710) of the OBCS 210, measured in rotations per minute (RPM). Each of the screenshots of FIGS. 10A-10P also include a current field 1030 that indicates a current value of a current being generated by the OBCS 210 while the motor of the OBCS 210 is rotating, the current measured in amps (A). Each of the screenshots of FIGS. 10A-10P also include a temperature field 1035 that indicates a temperature of the OBCS 210, in Celsius (C). Each of the screenshots of FIGS. 10A-10P also include a voltage field 1040 that indicates a voltage value for a voltage generated by the OBCS 210 after passing through rectification, conversion, conditioning, and so forth, measured in direct current volts (V DC). In some embodiments, the voltage field indicates voltage measure of the battery 102 or other power store that feeds the motor 104 to drive the BEV 100.

The screenshots 10A-10P described in further detail below depict electrical generation conditions of the BEV 100 while the BEV 100 is traveling. For example, for the screenshots of FIGS. 10A-10P, the BEV 100 is traveling (a) at a speed of between 48 MPH and 53 MPH along a substantially flat road surface for a majority of distance traveled and (b) up an incline for approximately 13 miles. The screenshots 10A-10P show how the phase currents (1010-1020) for the AC signal generated by the motor vary at different times but sum to substantially zero at any given moment of time (for example, indicating that the motor is feeding a balanced load). The motor speed 1025 shown in the screenshots may be indicative of the current 1030 except when the voltage dump is being completed.

FIG. 10A shows a screenshot 1001a for when the fifth wheel 202 is in contact with the road and providing a torque value in 1005a of approximately −57.4 Nm (the negative value representing a torque opposing the direction of the motion of the EV). The screenshot also shows that the first phase current value in 1010a is −5.31 A, the second phase current value in 1015a is −143.06 A, and the third phase current value in 1020a is 148.94 A. The speed value in 1025a of the generator or motor of the OBCS 210 is 5008 RPM and the OBCS 210 is generating the current value in 1030a of 70 A at the temperature value in 1035a of 51.05 C. The voltage value in 1040a generated by the OBCS 210 at the speed of 5008 RPM is 377.2 V.

The screenshot 1001a may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 70 A of current used to maintain the voltage of the EV's battery 102 and/or capacitor module 502 at or around the voltage 1040a of 377.2 V. The 70 A current 1030a is provided to the motor 104, the battery module 102, and/or the capacitor module 502 to maintain the voltage at approximately 377.2 V.

FIG. 10B shows a screenshot 1001b for when the fifth wheel 202 is in contact with the road and providing a torque value in 1005b of approximately −57.4 Nm (the negative value representing a torque opposing the direction of the motion of the EV). The screenshot also shows that the first phase current value in 1010b is −137.19 A, the second phase current value in 1015b is 152.25 A, and the third phase current value in 1020b is −14.94 A. The speed value in 1025b of the generator or motor of the OBCS 210 is 5025 RPM and the OBCS 210 is generating the current value in 1030b of −70 A at the temperature value in 1035b of 51.14 C. The voltage value in 1040b generated by the OBCS 210 at the speed of 5025 RPM is 379.17 V.

The screenshot 1001b may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 70 A of current used to maintain the voltage of the EV's battery 102 and/or capacitor module 502 at or around the voltage 1040b of 379.17 V. The 70 A current 1030b is provided to the motor 104, the battery module 102, and/or the capacitor module 502 to maintain the voltage at approximately 379.17 V.

FIG. 10C shows a screenshot 1001c for when the fifth wheel 202 is in contact with the road and providing a torque value in 1005c of approximately −57.4 Nm (the negative value representing a torque opposing the direction of the motion of the EV). The screenshot also shows that the first phase current value in 1010b is 80.5 A, the second phase current value in 1015c is −160.06 A, and the third phase current value in 1020c is 80.12 A. The speed value in 1025c of the generator or motor of the OBCS 210 is 5011 RPM and the OBCS 210 is generating the current value in 1030c of −69.6 A at the temperature 1035c of 51.22 C. The voltage value in 1040c generated by the OBCS 210 at the speed of 5011 RPM is 380.17 V.

The screenshot 1001c may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.6 A of current used to maintain the voltage of the EV's battery 102 and/or capacitor module 502 at or around the voltage 1040c of 380.17 V. The 69.6 A current 1030c is provided to the motor 104, the battery module 102, and/or the capacitor module 502 to maintain the voltage at approximately 380.17 V.

FIG. 10D shows a screenshot 1001d for when the fifth wheel 202 is in contact with the road and providing a torque value in 1005d of approximately −57.6 Nm (the negative value representing a torque opposing the direction of the motion of the EV). The screenshot also shows that the first phase current value in 1010d is 170.69 A, the second phase current value in 1015d is −131.94 A, and the third phase current value in 1020d is −38.19 A. The speed value in 1025d of the generator or motor of the OBCS 210 is 4969 RPM and the OBCS 210 is generating the current value in 1030d of −69 A at the temperature value in 1035d of 51.31 C. The voltage value in 1040d generated by the OBCS 210 at the speed of 4969 RPM is 380.92 V.

The screenshot 1001d may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69 A of current used to maintain the voltage of the EV's battery 102 and/or capacitor module 502 at or around the voltage 1040d of 380.92 V. The 69 A current 1030d is provided to the motor 104, the battery module 102, and/or the capacitor module 502 to maintain the voltage at approximately 380.92 V.

FIG. 10E shows a screenshot 1001e for when the fifth wheel 202 is in contact with the road and providing a torque value in 1005e of approximately −56.8 Nm (the negative value representing a torque opposing the direction of the motion of the EV). The screenshot also shows that the first phase current value in 1010e is −133.31 A, the second phase current value in 1015e is −40.75 A, and the third phase current value in 1020e is 174.19 A. The speed value in 1025e of the generator or motor of the OBCS 210 is 5121 RPM and the OBCS 210 is generating the current value in 1030e of −69.6 A at the temperature value in 1035e of 52.77 C. The voltage value in 1040e generated by the OBCS 210 at the speed of 4969 RPM is 382.67 V.

The screenshot 1001e may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.6 A of current used to maintain the voltage of the EV's battery 102 and/or capacitor module 502 at or around the voltage 1040e of 382.67 V. The 69.6 A current 1030e is provided to the motor 104, the battery module 102, and/or the capacitor module 502 to maintain the voltage at approximately 382.67 V.

FIG. 10F shows a screenshot 1001f for when the fifth wheel 202 is in contact with the road and providing a torque value in 1005f of approximately −57 Nm (the negative value representing a torque opposing the direction of the motion of the EV). The screenshot also shows that the first phase current value in 1010f is 8.75 A, the second phase current value in 1015f is 145.44 A, and the third phase current value in 1020f is −153.62 A. The speed value in 1025f of the generator or motor of the OBCS 210 is 5062 RPM and the OBCS 210 is generating the current value in 1030f of −69.4 A at the temperature value in 1035f of 52.86 C. The voltage value in 1040f generated by the OBCS 210 at the speed of 5062 RPM is 383.21 V.

The screenshot 1001f may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.4 A of current used to maintain the voltage of the EV's battery 102 and/or capacitor module 502 at or around the voltage 1040f of 383.21 V. The 69.4 A current 1030f is provided to the motor 104, the battery module 102, and/or the capacitor module 502 to maintain the voltage at approximately 383.21 V.

FIG. 10G shows a screenshot 1001g for when the fifth wheel 202 is in contact with the road and providing a torque value in 1005g of approximately −57.6 Nm (the negative value representing a torque opposing the direction of the motion of the EV). The screenshot also shows that the first phase current value in 1010g is −161.94 A, the second phase current value in 1015g is 29.56 A, and the third phase current value in 1020g is 132 A. The speed value in 1025g of the generator or motor of the OBCS 210 is 4937 RPM and the OBCS 210 is generating the current value in 1030g of −68.8 A at the temperature value in 1035g of 53.03 C. The voltage value in 1040g generated by the OBCS 210 at the speed of 4937 RPM is 381.92 V.

The screenshot 1001g may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 68.8 A of current used to maintain the voltage of the EV's battery 102 and/or capacitor module 502 at or around the voltage 1040g of 381.92 V. The 68.8 A current 1030g is provided to the motor 104, the battery module 102, and/or the capacitor module 502 to maintain the voltage at approximately 681.91 V.

FIG. 10H shows a screenshot 1001h for when the fifth wheel 202 is in contact with the road and providing a torque value in 1005h of approximately −57.6 Nm (the negative value representing a torque opposing the direction of the motion of the EV). The screenshot also shows that the first phase current value in 1010h is −89.69 A, the second phase current value in 1015h is 161.44 A, and the third phase current value in 1020h is −70.69 A. The speed value in 1025h of the generator or motor of the OBCS 210 is 4890 RPM and the OBCS 210 is generating the current value in 1030h of −69.2 A at the temperature value in 1035h of 53.55 C. The voltage value in 1040h generated by the OBCS 210 at the speed of 4890 RPM is 377.42 V.

The screenshot 1001h may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.2 A of current used to maintain the voltage of the EV's battery 102 and/or capacitor module 502 at or around the voltage 1040h of 377.42 V. The 69.2 A current 1030h is provided to the motor 104, the battery module 102, and/or the capacitor module 502 to maintain the voltage at approximately 377.42 V.

FIG. 10I shows a screenshot 1001i for when the fifth wheel 202 is in contact with the road and providing a torque value in 1005i of approximately −57.6 Nm (the negative value representing a torque opposing the direction of the motion of the EV). The screenshot also shows that the first phase current value in 1010i is 90.69 A, the second phase current value in 1015i is 80 A, and the third phase current value in 1020i is −169.12 A. The speed 1025i of the generator or motor of the OBCS 210 is 4971 RPM and the OBCS 210 is generating the current value in 1030i of −69.8 A at the temperature value in 1035i of 53.8 C. The voltage value in 1040i generated by the OBCS 210 at the speed of 4971 RPM is 378.2 V.

The screenshot 1001i may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.8 A of current used to maintain the voltage of the EV's battery 102 and/or capacitor module 502 at or around the voltage 1040b of 378.2 V. The 69.8 A current 1030i is provided to the motor 104, the battery module 102, and/or the capacitor module 502 to maintain the voltage at approximately 378.2 V.

FIG. 10J shows a screenshot 1001j for when the fifth wheel 202 is in contact with the road and providing a torque value in 1005j of approximately −57.6 Nm (the negative value representing a torque opposing the direction of the motion of the EV). The screenshot also shows that the first phase current value in 1010j is 149.38 A, the second phase current value in 1015j is −145.5 A, and the third phase current value in 1020j is −1.88 A. The speed value in 1025j of the generator or motor of the OBCS 210 is 4987 RPM and the OBCS 210 is generating the current value in 1030h of −70 A at the temperature value in 1035j of 53.89 C. The voltage value in 1040j generated by the OBCS 210 at the speed of 4987 RPM is 377.1 V.

The screenshot 1001j may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 70 A of current used to maintain the voltage of the EV's battery 102 and/or capacitor module 502 at or around the voltage 1040*b* of 377.1 V. The 70 A current 1030*i* is provided to the motor 104, the battery module 102, and/or the capacitor module 502 to maintain the voltage at approximately 377.1 V.

FIG. 10K shows a screenshot 1001*k* for when the fifth wheel 202 is in contact with the road and providing a torque value in 1005*k* of approximately −567.6 Nm (the negative value representing a torque opposing the direction of the motion of the EV). The screenshot also shows that the first phase current value in 1010*k* is −174.06 A, the second phase current value in 1015*k* is 111 A, and the third phase current value in 1020*k* is 63.12 A. The speed value in 1025*k* of the generator or motor of the OBCS 210 is 4996 RPM and the OBCS 210 is generating the current value in 1030*k* of −69.6 A at the temperature value in 1035*k* of 54.06 C. The voltage value in 1040*k* generated by the OBCS 210 at the speed of 4996 RPM is 378.51 V.

The screenshot 1001*k* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.6 A of current used to maintain the voltage of the EV's battery 102 and/or capacitor module 502 at or around the voltage 1040*b* of 378.51 V. The 69.6 A current 1030*k* is provided to the motor 104, the battery module 102, and/or the capacitor module 502 to maintain the voltage at approximately 378.51 V.

FIG. 10L shows a screenshot 1001*l* for when the fifth wheel 202 is in contact with the road and providing a torque value in 1005*l* of approximately −57.6 Nm (the negative value representing a torque opposing the direction of the motion of the EV). The screenshot also shows that the first phase current value in 1010*l* is 62.12 A, the second phase current value in 1015*l* is −169.25 A, and the third phase current value in 1020*l* is 108.25 A. The speed value in 1025*l* of the generator or motor of the OBCS 210 is 4954 RPM and the OBCS 210 is generating the current value in 1030*l* of −69.6 A at the temperature value in 1035*l* of 54.41 C. The voltage value in 1040*l* generated by the OBCS 210 at the speed of 4954 RPM is 378.86 V.

The screenshot 1001*l* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 69.6 A of current used to maintain the voltage of the EV's battery 102 and/or capacitor module 502 at or around the voltage 1040*b* of 378.86 V. The 69.6 A current 1030*l* is provided to the motor 104, the battery module 102, and/or the capacitor module 502 to maintain the voltage at approximately 378.86 V.

FIG. 10M shows a screenshot 1001*m* for when the fifth wheel 202 is in contact with the road and providing a torque value in 1005*m* of approximately −9.2 Nm (the negative value representing a torque opposing the direction of the motion of the EV). The screenshot also shows that the first phase current value in 1010*m* is 113.06 A, the second phase current value in 1015*m* is −147 A, and the third phase current value in 1020*m* is 34.5 A. The speed value in 1025*m* of the generator or motor of the OBCS 210 is 5587 RPM and the OBCS 210 is generating the current value in 1030*m* of −0.2 A at the temperature value in 1035*m* of 55.27 C. The voltage value in 1040*m* generated by the OBCS 210 at the speed of 5587 RPM is 377.32 V.

The screenshot 1001*m* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 0.2 A of current used to maintain the voltage of the EV's battery 102 and/or capacitor module 502 at or around the voltage 1040*m* of 377.32 V. The 0.2 A current 1030*m* is provided to the motor 104, the battery module 102, and/or the capacitor module 502 to maintain the voltage at approximately 377.32 V.

FIG. 10N shows a screenshot 1001*n* for when the fifth wheel 202 is in contact with the road and providing a torque value in 1005*n* of approximately −9.2 Nm (the negative value representing a torque opposing the direction of the motion of the EV). The screenshot also shows that the first phase current value in 1010*n* is 84.94 A, the second phase current value in 1015*n* is −74.75 A, and the third phase current value in 1020*n* is −9.62 A. The speed value in 1025*n* of the generator or motor of the OBCS 210 is 5600 RPM and the OBCS 210 is generating the current value in 1030*n* of −28.4 A at the temperature value in 1035*n* of 55.69 C. The voltage value in 1040*n* generated by the OBCS 210 at the speed of 5600 RPM is 378.07 V.

The screenshot 1001*n* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 28.4 A of current used to maintain the voltage of the EV's battery 102 and/or capacitor module 502 at or around the voltage 1040*n* of 378.07 V. The 28.4 A current 1030*n* is provided to the motor 104, the battery module 102, and/or the capacitor module 502 to maintain the voltage at approximately 378.07 V.

FIG. 10O shows a screenshot 1001*o* for when the fifth wheel 202 is in contact with the road and providing a torque value in 1005*o* of approximately −56.6 Nm (the negative value representing a torque opposing the direction of the motion of the EV). The screenshot also shows that the first phase current value in 1010*o* is −74.19 A, the second phase current value in 1015*o* is −88.31 A, and the third phase current value in 1020*o* is 163 A. The speed value in 1025*o* of the generator or motor of the OBCS 210 is 5153 RPM and the OBCS 210 is generating the current value in 1030*o* of −70.8 A at the temperature value in 1035*o* of 56.5 C. The voltage value in 1040*o* generated by the OBCS 210 at the speed of 5153 RPM is 376.88 V.

The screenshot 1001*o* may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 70.8 A of current used to maintain the voltage of the EV's battery 102 and/or capacitor module 502 at or around the voltage 1040o of 376.88 V. The 70.8 A current 1030o is provided to the motor 104, the battery module 102, and/or the capacitor module 502 to maintain the voltage at approximately 376.88 V.

FIG. 10P shows a screenshot 1001p for when the fifth wheel 202 is in contact with the road and providing a torque value in 1005p of approximately −56.6 Nm (the negative value representing a torque opposing the direction of the motion of the EV). The screenshot also shows that the first phase current value in 1010p is 37.38 A, the second phase current value in 1015p is −164.44 A, and the third phase current value in 1020o is 128.12 A. The speed value in 1025p of the generator or motor of the OBCS 210 is 5137 RPM and the OBCS 210 is generating the current value in 1030p of −70.8 A at the temperature value in 1035p of 56.59 C. The voltage value in 1040p generated by the OBCS 210 at the speed of 5137 RPM is 378.29 V.

The screenshot 1001p may show an instance when the OBCS 210 is generating electricity and providing the electricity to the battery 102, capacitor module 502, and/or the motors 104 of the EV. In some embodiments, the electricity may be provided to the motors 104 through the battery modules 102 and/or the capacitor modules 502 or via a separate connection that bypasses the battery modules 102 and/or the capacitor modules 502. The OBCS 210 may generate the 70.8 A of current used to maintain the voltage of the EV's battery 102 and/or capacitor module 502 at or around the voltage 1040b of 378.29 V. The 70.8 A current 1030p is provided to the motor 104, the battery module 102, and/or the capacitor module 502 to maintain the voltage at approximately 378.29 V.

In some embodiments, voltages flow between the generator, the battery 102, the capacitor module 502, and/or the motor 104. For example, the electricity generated by the generators 302a and 302 or the generation unit 710 may be output from the generator 302 or generation unit 710 and fed into components for converting conditioning, rectifying, matching, filtering, and/or otherwise modifying the generated electricity. Once the electricity is modified as described herein, the electricity may be conveyed to an energy storage device, such as the battery 102 and/or the capacitor module 502. The energy stored in the battery 102 or the capacitor module 502 may be used to feed one or more DC loads, for example low voltage DC loads, such as the 12V DC battery and internal features and components of the BEV 100. Alternatively, the energy stored in the battery 102 or the capacitor module 502 may be used to feed the motors 104 or other high voltage demand components. In some embodiments, the motors 104 may be AC or DC motors; when AC motors, the high voltage output from the battery 102 or the capacitor module 502 may be converted from DC to AC before feeding into the motors 104. When the motors 104 are DC motors, further conditioning may not be required before the voltage is fed to the motors 104. Alternatively, the high voltage output from the battery 102 and/or the capacitor module 502 may be used to feed into the generation unit 710 or generators 302 to jump start the generation unit 710 or generators 302 when they are being used to convert mechanical energy to electricity for storage or use in driving the motor 104. In some embodiments, when the battery 102 and the capacitor module 502 both exist in the BEV 100 as separate components, the battery 102 may feed energy to the capacitor module 502 and/or vice versa.

In some embodiments, the generators 302 and/or generation unit 710 described herein couple directly to one or more of the battery 102, the capacitor module 502, and the motor 104. Alternatively, or additionally, the generators 302 and/or generation unit are coupled to the battery charger 403, which is coupled to the battery 102, the capacitor module 502, and/or the motor 104. In some embodiments, when the generators 302 and/or generation unit 710 are not coupled to the battery charger 403, the generators 302 and/or generation unit 710 may instead be coupled to one or more circuits to rectify and/or otherwise match, convert, and/or condition the electricity generated by the generators 302 and/or generation unit before feeding the battery 102, the capacitor module 502, and/or the motor 104.

Figure 11A:
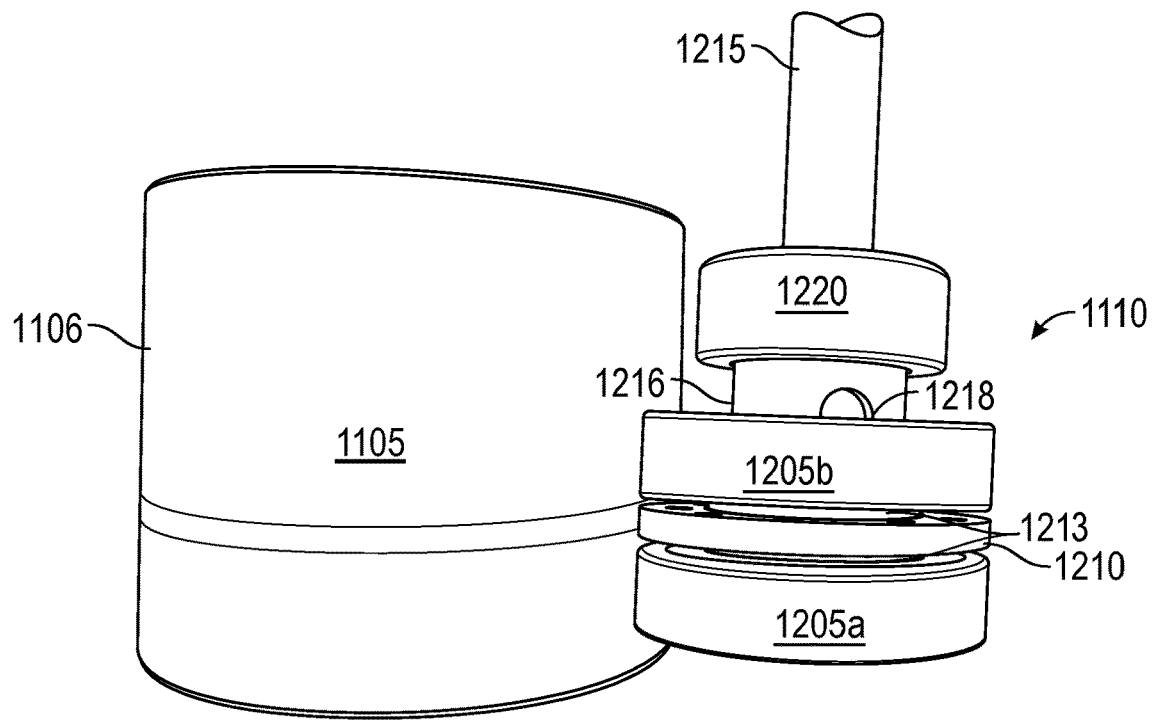
FIGS. 11A-11B depict different views of an example embodiment of components of a bearing support that supports a rotating element, the bearing support including a bearing enclosure and a bearing assembly.
Figure 11B:
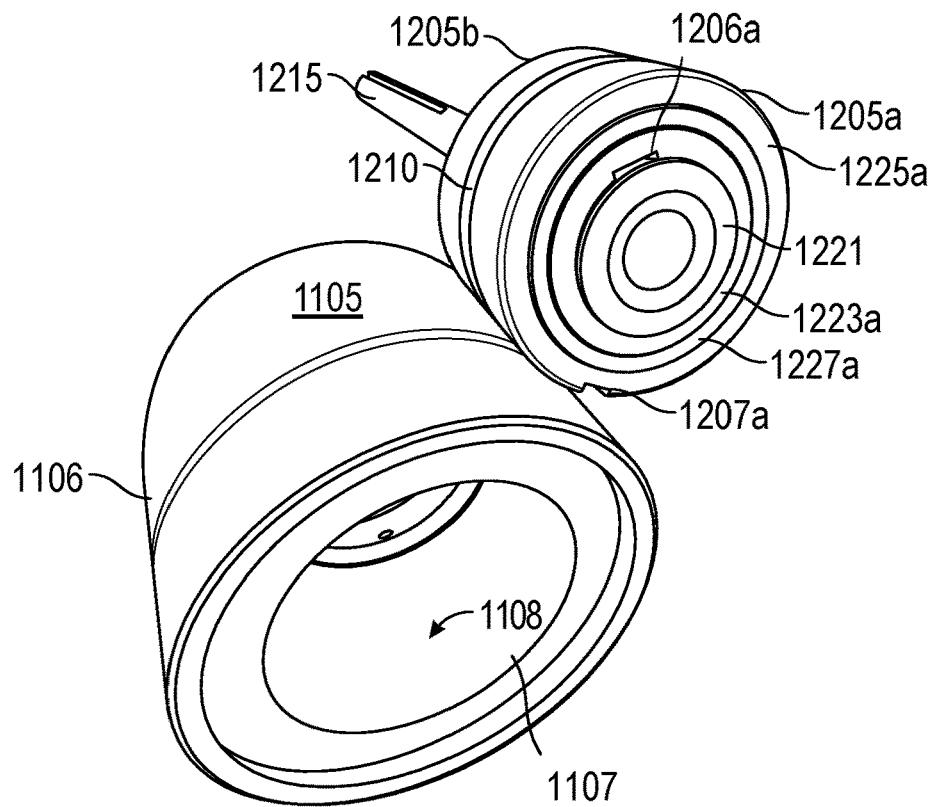

FIGS. 11A-11B depict different views of an example embodiment of components of a bearing support 1100. The bearing support 1100 can be configured to support, facilitate, or enable a rotating element, such as a rotating shaft. Further, and as will be described in more detail below, the bearing support 1100 can be advantageously configured to dissipate heat generated by rotation of the rotating element. Heat may be generated, for example, by friction between components as the rotating element rotates. If such generated heat is not sufficiently dissipated, the components may deteriorate or otherwise become damaged. For example, in some cases, if heat is not sufficiently dissipated, components may melt, degrading the function thereof.

In some embodiments, the bearing support 1100 may be used anywhere that any rotating element is physically supported or coupled to another component (e.g., another rotating or stationary component). For example, the bearing support 1100 can be used to support end, center, and/or other portions of the shaft 206 of FIG. 2 or the second shaft 704 of FIG. 7. The bearing support 1100 can support the portions of the shafts and other rotating components on the BEV 100 or the support structure 200 or couple the portions to other rotating or stationary components in the BEV 100 or the OBCS 210. In some embodiments, the one-way bearing 706 discussed above comprises the bearing support 1100. In some embodiments, the bearing support 1100 may provide support for rotating axles and components, reduction of diameters of rotating components, and so forth. The bearing support 1100 may be used in various contexts in any embodiment of the OBCS 201 described herein, with reference to FIGS. 2-9. In some embodiments, the bearing support 1100 may be used in various other applications, from automotive, industrial, consumer, appliance, and home use applications.

FIG. 11A is a top down view of the bearing support 1100, illustrated in a partially disassembled state. FIG. 11B is another perspective view of the bearing support in a partially disassembled state. In the illustrated embodiment, the bearing support 1100 comprises a bearing housing or enclosure 1105 and a bearing assembly 1110. While FIGS. 11A and 11B, illustrate the bearing support 1100 in a partially disassembled state, when assembled, at least a portion of the bearing assembly 1110 can be positioned within the bearing enclosure 1105.

As shown in FIG. 11A, the bearing assembly 1110 comprises a shaft 1215 and one or more bearings 1205 (e.g., first and second bearing 1205a, 1205b) configured to facilitate rotation of the shaft 1215. The one or more bearings 1205 can be mounted on the shaft 1215 as shown. The one or more bearings 1205 can comprise mechanical devices configured to enable rotational movement of the shaft 1215. The one or more bearings 1205 can comprise rotary bearings that convey or transfer one or more of axial and radial motions and forces between components or devices. In some embodiments, the one or more bearings 1205 may comprise one or more of a ring bearing, a rolling-element bearing, a jewel bearing, a fluid bearing, a magnetic bearing, and a flexure bearing, among other suitable bearing types.

As used herein, the one or more bearings 1205 may be enable rotational rotation. In some embodiments, additional bearings 1205 or only one of the bearings 1205*a* and 1205*b* may be used in any application. As best shown in FIG. 11B, the one or more bearings 1205 may comprise an inner ring 1223 and an outer ring 1225. The one or more bearings 1205 can also include one or more rolling elements (not visible) positioned between the inner ring 1223 and the outer ring 1225. The one or more rolling elements can facilitate rotation of the inner ring 1223 relative the outer ring 1225. The one or more rolling elements can be positioned within a cage 1227. The inner ring 1223 may be fitted on the shaft 1215. For example, the inner ring 1223 can have an inner diameter through which a shaft or other mechanical component passes (for example, the shaft 1215). The outer ring 1225 may have an outer diameter over which an enclosure or other mechanical component passes (for example, the bearing enclosure 1105). The rolling elements and the cage 1227 may be disposed between the inner ring and the outer ring (moving within one or raceways formed in the inner ring and/or the outer ring) to enable rotation movement of the inner ring relative to the outer ring, or vice versa. In some embodiments, different particularities for the bearing support 1100 may depend on the application in which the bearing support 1100 is used. The gaps between the bearing spacer 1110 and each of the bearings 1105*a* and 1105*b* is not clearly shown in the perspective view of FIG. 11B.

Often, as the shaft 1215 rotates, friction between the rolling elements and the inner and outer rings 1223, 1227 (or other components of the device) generates heat. As noted above, if such heat is not dissipated, it can cause damage to the components, which may reduce or destroy their ability to facilitate rotation of the shaft 1215. Accordingly, the bearing support 1100 can be configured to facilitate heat dissipation as will be described in more detail below.

As shown in FIGS. 11A and 11B, the bearing enclosure 1105 of the bearing support 1100 can comprise a housing or enclosure that is configured to receive at least a portion of the bearing assembly 1110. In the illustrated embodiment, the bearing enclosure 1105 comprises an exterior surface 1106 having a substantially cylindrical shape and an interior surface 1107 having a cylindrical shape. Other shapes of the exterior and interior surfaces 1106, 1007 are also possible. In some embodiments, the shape of the exterior surface 1106 of the bearing enclosure 1105 is dependent on an application and/or installation location of the bearing enclosure 1105. For example, the exterior surface 1106 of the bearing enclosure 1105 can be configured to facilitate connection of the bearing support 1100 to other components.

An interior portion 1108 of the bearing enclosure 1105 may be hollow and at least partially defined by the interior surface 1107. As noted above, in the illustrated embodiment, the interior surface 1107 comprises a cylindrical shape such that the hollow interior portion 1108 is substantially cylindrical. Such a shape can be configured to correspond with the generally circular or cylindrical shape of the one or more bearings 1205 of the bearing assembly 1105 such that the bearing assembly 1105 can be received within the interior portion 1108.

In some embodiments, the shape of the interior surface 1107 of the bearing enclosure 1105 is dependent on a shape of a bearing or similar device (for example, bearing 1205, described herein) that is inserted into the interior portion 1108 of the bearing enclosure 1105. The interior portion 1108 of the bearing enclosure 1105 may receive the bearing assembly 1110 such that the bearing assembly 1110 fits, at least in part, within the interior portion 1108 of the bearing enclosure 1105. For example, the bearing assembly 1110 may be inserted, at least in part, into the interior portion 1108 of the bearing enclosure 1105 in a horizontal direction (e.g., a direction parallel to an axis of the shaft 1215 or parallel to the axis of rotation of the bearings 1205), such that only a portion of the bearing assembly 1110 extends out of the bearing enclosure 1105. For example, the shaft 1215 can extend out from the bearing enclosure 1105. When the interior surface 1107 is cylindrical to accept the round or cylindrical bearing 1205 (for example, the pair of bearings 1205*a* and 1205*b* included in the bearing assembly 1110), the cylindrical interior portion 1108 may have a diameter substantially the same as (but slightly larger than) an outer diameter of the bearing 1205. Thus, the interior surface 1107 of the bearing enclosure 1105 is configured to hold the bearing 1205 or any bearing assembly 1110 pressed into the interior portion 108 in place using friction and compressive forces once the bearing 1205 or bearing assembly 1110 is pressed into the bearing enclosure 1105.

In the assembled state, the inner rings 1223 of the bearings 1205 can spin or rotate within the outer rings 1225 of the bearing 1205 while the outer rings 1225 remain stationary within the bearing enclosure 1105, such that the shaft 1215 that is coupled to the inner rings 1223 of the bearings 1205 can rotate or move relative to the bearing enclosure 1105. As noted previously, such rotation and movement can create heat within the bearings 1205, a build-up of which can cause the bearing 1205 to fail prematurely or otherwise damage one or more of the bearings 1205, the bearing enclosure 1105, and the shaft 1215 within the bearings 1205.

Accordingly, the bearing support 1100 can be configured to facilitate improved airflow within the bearing enclosure 1105 which may reduce the heat build-up within the bearing enclosure 1105 around the bearings 1205. Introducing ports or paths for airflow into the bearing enclosure 1105 can the improve airflow therethrough. For example, the bearing enclosure 1105 may include one or more slots, holes, perforations, or other openings that extend from the exterior surface 1106 to the interior surface 1107 through a side of the bearing enclosure 1105. The one or more slots, holes, perforations, or other openings allow air to better flow from outside the bearing enclosure 1105 to the interior portion 1108 of the bearing enclosure 1105.

Additionally, the interior surface 1107 may comprise one or more indentations, dimples, fingers, channels, or tabs (each hereinafter referred to as indentations) at a location to which the bearings 1205 are coupled. The one or more indentations may create individual points or portions at which the interior surface 1107 contacts the bearing 1205 such that the interior surface 1107 is not in contact with an entire exterior surface of the bearing 1205. The one or more indentations may allow air to flow around the bearings 1205 (for example, from a first side of the bearing 1205 to a second side of the bearing 1205) within the bearing enclosure 1105. Such air flow may further reduce heat build-up around the bearing 1205 when the bearing 1205 is enabling rotation or movement in the bearing enclosure 1105. In some embodiments, the one or more indentations may be of varying depths, shapes, lengths, and heights. For example, the one or more indentations in the interior surface 1107 of the bearing enclosure 1105 may have a depth in the thousandths of an inch (for example, approximately 0.001", 0.002", 0.003", 0.004", 0.005", 0.006", 0.007", 0.008", 0.009", 0.01", 0.02", 0.1" and so forth, or any value therebetween). In some embodiments, the one or more indentations may have any shape or height (for example, approximately 0.001", 0.002", 0.003", 0.004", 0.005", 0.006", 0.007", 0.008", 0.009", 0.01", 0.02", 0.1" and so forth, or any value therebetween). The one or more indentations may also have a width sufficient to ensure that air flows from the first side to the second side of the bearing 1205 (for example a width that is slightly larger than a width or thickness of the bearing 1205). In some embodiments, the width of the one or more indentations is slightly larger than the width of the bearing 1205. For example, the width of the one or more indentations may be long enough such that the indentation extends on either side of the bearing 1205 by a distance of one of approximately or at least 0.001", 0.002", 0.003", 0.004", 0.005", 0.006", 0.007", 0.008", 0.009", 0.01", 0.02", 0.1" and so forth, or any value therebetween. While described primarily as indentations, protrusions, which extend outwardly from the interior surface 1107 of the bearing enclosure 1105 may also be used. For example, the protrusions can extend to and contact the bearings 1205, while also allowing air to flow around the protrusions to facilitate cooling of the bearings 1205. In cases where protrusions are utilized, the protrusions may have a height equal to the various depths of the indentations described above.

The one or more indentations (or protrusions) may reduce an amount of surface contact between the bearing 1205 (for example, the outer ring 1225) and the interior surface 1107 of the bearing enclosure 1105. In order to prevent the bearing 1205 from moving laterally within the bearing enclosure 1105, a tab, wedge, key, or similar device (hereinafter referred to as tab) may be inserted into one of the one or more indentations or otherwise pressed against the bearing 1205 and the interior surface 1107 of the bearing enclosure 1105 to ensure that the bearing 1205 does not move laterally within the bearing enclosure 1105. Thus, the introduction of any of the indentations or holes described herein may improve air flow within the bearing enclosure 1105, reducing bearing failures and improving bearing functionality and life, without increasing risk of movement of the bearing 1205.

As shown in FIG. 11A, for example, the bearing assembly 1110 may comprise one or more bearings (e.g. the first and second bearings 1205a and 1205b) mounted on the shaft 1215 and, additionally, a bearing spacer 1210 and a clamp 1220. These components of the bearing assembly 1110 may be arranged such that the bearings 1205a and 1205b are separated from each other by the bearing spacer 1210. The arrangement of the bearing 1205a, the bearing spacer 1210, and the bearing 1205b may be positioned at an end of the shaft 1215 and the clamp 1220 may hold the arrangement on or at the end of the shaft 1215. In some embodiments, the bearing spacer 1210 is separated from each of the bearings 1205a and 1205b on one or more sides of the bearing spacer 1210 by a predetermined length gap. The predetermined length gap may be one of 1 millimeter (mm), 2 mm, 3 mm, 4 mm, 5 mm, 6, mm, 7 mm, 8 mm, 9 mm, or 10 mm in length, and so forth, or any value therebetween. In some embodiments, the predetermined length gap is determined during manufacturing of the bearing assembly 1110 and the bearing support 1100. In some embodiments, the predetermined length gap may be selected or determined based on one or more of an expected load on the bearing assembly (for example, the expected rotational speed, expected working temperatures, expected duration of use, and so forth). The gaps created by the bearing spacer 1210 may further facilitate cooling and heat dissipation be creating spaces for air to flow around the one or more bearings 1205.

The clamp 1220 may be separated from the arrangement of the bearing 1205a, the bearing spacer 1210, and the bearing 1205b or may be positioned flush with the arrangement (for example, flush with the bearing 1205b). The clamp 1220 may include a mechanical device (for example, a locking screw or similar component) to mechanically prevent the clamp 1220 from moving one or more of rotationally around the shaft 1215 or laterally along the shaft 1215. Thus, the clamp 1220 may prevent other components from moving along or around the shaft 1215 or limit movement of the other components along or around the shaft 1215. The clamp 1220 may have an outer diameter that is large enough to prevent the bearings 1205 and/or the bearing spacer 1210 from moving over the clamp 1220 but smaller than the diameter of the interior portion 1108 of the bearing enclosure 1105.

In some embodiments, the shaft 1215 comprises a plurality of sections, including an end section 1216 and a middle section 1217. The end section 1216 comprises the section of the shaft 1215 where the bearing assembly 1110 is installed and can include a larger diameter than middle section 1217, although this need not be the case in all embodiments. For example, the shaft 1215 can, in some embodiments, comprise a shape having a constant diameter along its length. As shown in FIG. 11A, the end section 1216 may comprise a keyway 1218 into which a key 1219 is seated to prevent rotation of the arrangement of the bearing 1205a, the bearing spacer 1210, and the bearing 1205b about the end section 1216. The keyway 1218 may be formed having one or more shapes, lengths, widths, and so forth. The keyway 1218 may provide a volume into which the key 1219 is inserted to prevent the rotation. In some embodiments, the key 1219 may be one of a sunk saddle, parallel sunk, gib-head, feather, and Woodruff type key. In general, the keyway 1218 and key 1219 are configured to couple the inner rings 1215 of the one or more bearings 1205 to the shaft 1215 such that the shaft 1215 and the inner rings 1223 of the one or more bearings 1205 rotate together. In the illustrated embodiment, the end section 1216 includes an end cap 1221 that prevents the bearings 1205a and 1205b and the spacer from sliding off the end section 1216 of the shaft 1215.

In the illustrated embodiment of FIG. 11B, bearing 1205a includes a keyway 1206a on the inner ring 1223 of the bearing 1205a and a keyway 1207a on the outer ring 1225 of the bearing 1205a. The keyway 1206a may be configured to prevent the inner ring 1223 of the bearing 1205a from spinning or rotating about the end section 1216 while the keyway 1207a may prevent the outer ring 1227 of the bearing 1205a from spinning or rotating inside the interior portion 1108 of the bearing enclosure 1105. Though not shown in FIG. 11B, the bearing 1205b may also include a keyway 1206b on an interior ring of the bearing 1205b and a keyway 1207b on an exterior ring of the bearing 1205b. The keyway 1206b may prevent the inner ring of the bearing 1205b from spinning or rotating about the end section 1216 while the keyway 1207b may prevent the outer ring of the bearing 1205b from spinning or rotating inside the interior portion 1108. Though not shown in FIG. 11B, the bearing spacer 1210 may include a keyway 1211 on an interior opening of the bearing spacer 1210 and a keyway 1214 on an outer circumference of the bearing spacer 1210. The keyway 1211 may prevent the bearing spacer 1210 from spinning or rotating about the end section 1216 while the keyway 1214 may prevent the bearing spacer 1210 from spinning or rotating inside the interior portion 1108.

The larger diameter of the end section 1216 may generally match the inner diameter of the bearings 1205a and 1205b and an inner diameter of the bearing spacer 1210, as described in further detail below. The inner diameter of the bearings 1205a and 1205b may be substantially the same as (but slightly larger than) the diameter of the end section 1216. Thus, the end section 1216 can be configured to hold the bearings 1205 or any bearing assembly 1110 pressed onto the end section 1216 in place using, for example, friction and compressive forces once the bearing 1205 or bearing assembly 1110 is pressed onto the end section 1216.

In some embodiments, a surface of the end section 1216 on which the bearings 1205 and the bearing assembly 1110 are attached (e.g., pressed or otherwise coupled) may comprise one or more indentations, dimples, fingers, channels, or tabs (each hereinafter referred to as indentations) at a location to which the bearing is pressed. The one or more indentations may create individual points or portions at which the surface of the end section 1216 contacts the bearings 1205 of the bearing assembly 1110 such that the end portion 1216 is not in contact with an entire interior surface of the bearings 1205. The one or more indentations may allow air to flow around the bearings 1205 (for example, from a first side of the bearing 1205 to a second side of the bearing 1205) when pressed onto the end section 1216 and into the bearing enclosure 1105. Such air flow may further reduce heat build-up around the bearings 1205 when the bearings 1205 are enabling rotation or movement in the bearing enclosure 1105. In some embodiments, the one or more indentations may be of varying depths, shapes, lengths, and heights. For example, the one or more indentations in the surface of the end section 1216 of the shaft 1215 may have a depth in the thousandths of an inch (for example, approximately 0.001", 0.002", 0.003", 0.004", 0.005", 0.006", 0.007", 0.008", 0.009", 0.01", 0.02", 0.1" and so forth, or any value therebetween). In some embodiments, the one or more indentations may have any shape or height (for example, approximately 0.001", 0.002", 0.003", 0.004", 0.005", 0.006", 0.007", 0.008", 0.009", 0.01", 0.02", 0.1" and so forth, or any value therebetween). The one or more indentations may also have a width sufficient to ensure that air flows from the first side to the second side of the bearing 1205 (for example a width that is slightly larger than a width or thickness of the bearing 1205). In some embodiments, the width of the one or more indentations is slightly larger than the width of the bearing 1205. For example, the width of the one or more indentations may be long enough such that the indentation extends on either side of the bearing 1205 by a distance of one of approximately or at least 0.001", 0.002", 0.003", 0.004", 0.005", 0.006", 0.007", 0.008", 0.009", 0.01", 0.02", 0.1" and so forth, or any value therebetween. While described primarily as indentations, protrusions, which extend outwardly from the surface of the end section 1216 on which the bearings 1205 and the bearing assembly 1110 are attached may also be used. In cases where protrusions are utilized, the protrusions may have a height equal to the various depths of the indentations described above.

The bearing spacer 1210 is described in further detail below with reference to FIG. 13.

Figure 12A:
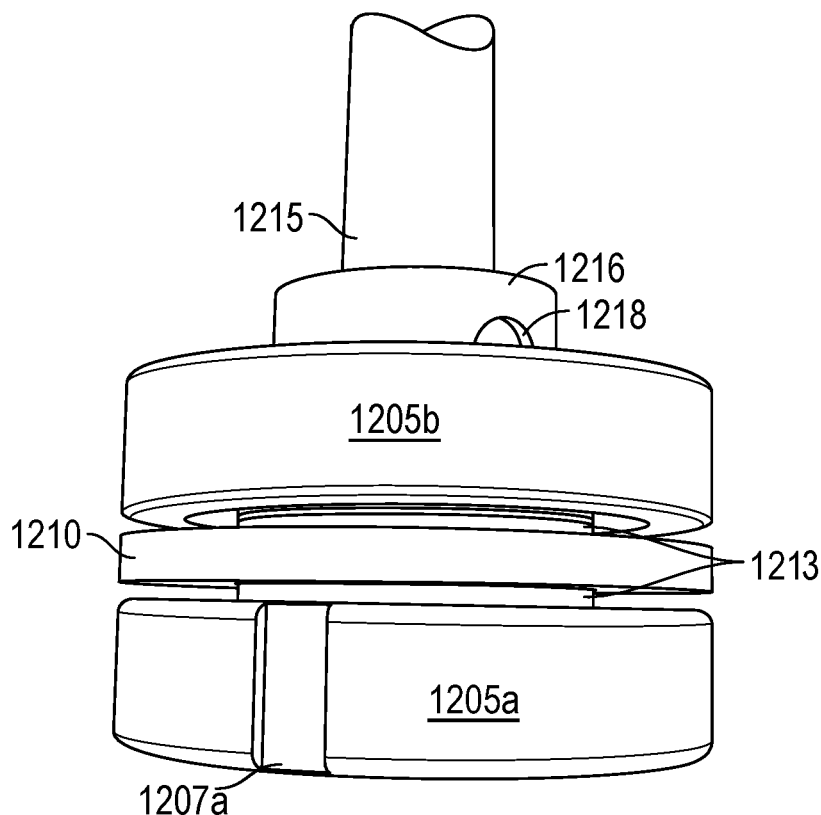
FIG. 12A-12C depict different views of the bearing assembly of FIGS. 11A-11B, including a plurality of bearings, a bearing spacer, and a shaft.

FIG. 12A shows a top down view of the bearing assembly 1110. FIG. 12A shows the the end section 1216 of the shaft 1215, some of the middle section 1217, a portion of the keyway 1218 in the end section 1216 that prevents rotation of the bearings 1205a and 1205b and the bearing spacer 1210 around the end section 1216. FIG. 12A also shows the gap between each of the bearings 1205a and 1205b and the bearing spacer 1210 on either side of the bearing spacer 1210. Additionally, the bearing 1205a also includes the keyway 1207a that is shown in FIG. 12A, while the keyway 1207b for the bearing 1205b is not shown and the keyway 1214 for the bearing spacer 1210 is not shown. Further details regarding the bearing spacer 1210 are provided below with reference to FIG. 13.

Figure 12B:
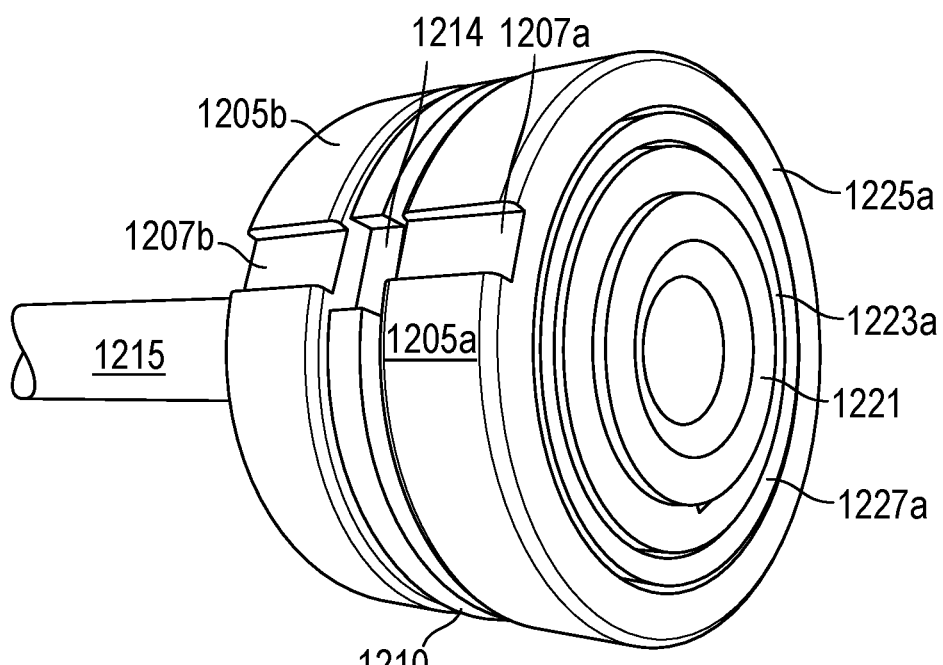

FIG. 12B shows a perspective view of the bearing assembly 1110. The bearing assembly 1110 shown includes the end cap 1221 of the shaft 1215, a portion of the middle section 1217 and the bearings 1205a and 1205b and the bearing spacer 1210 around the end section 1216. FIG. 12B also shows the gap between each of the bearings 1205a and 1205b and the bearing spacer 1210 on either side of the bearing spacer 1210. Additionally, FIG. 12B shows the keyways of the bearing 1205a, the bearing spacer 1210, and the bearing 1205b (for example, the keyway 1207a, the keyway 1214, and the keyway 120b) aligned such that the key can pass through and lock the rotation of the outer ring of the bearing 1205a, the bearing spacer 1210, and the outer ring of the bearing 1205b within the bearing enclosure 1105.

Figure 12C:
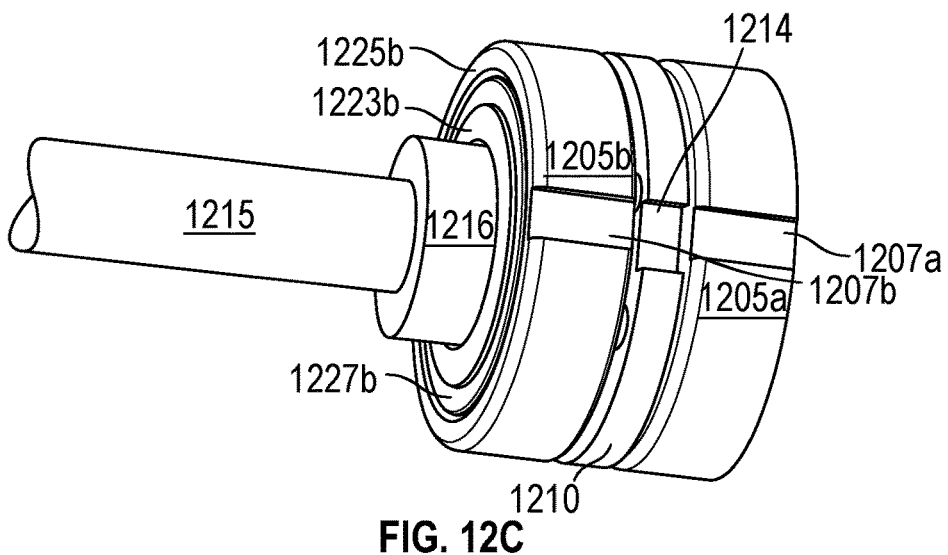

FIG. 12C shows an alternate perspective view of the bearing assembly 1110. The bearing assembly 1110 shown includes the end section 1216 of the shaft 1215, a portion of the middle section 1217, and the bearings 1205a and 1205b and the bearing spacer 1210 around the end section 1216. FIG. 12C also shows the gap between each of the bearings 1205a and 1205b and the bearing spacer 1210 on either side of the bearing spacer 1210. Additionally, FIG. 12C shows that the keyways 1207a, 1214, and 1207b are aligned such that the key can pass through them and lock the rotation of the bearing 1205, the bearing spacer 1210, and the bearing 1205b within the bearing enclosure 1105.

Figure 13:
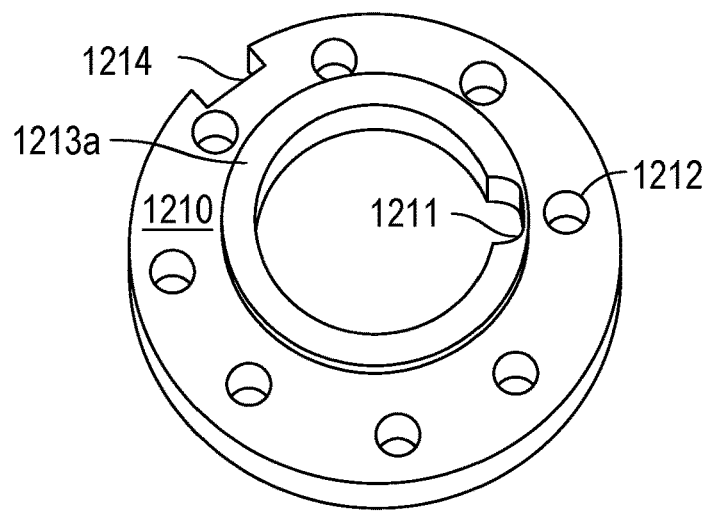
FIG. 13 shows a top-down view of the bearing spacer of the bearing assembly of FIGS. 11A-12C.

FIG. 13 shows a top-down view of the bearing spacer 1210 of the bearing assembly 1110 of FIGS. 11A-12C. The bearing spacer 1210 shown includes a number of holes 1212 that extend from a first side of the bearing spacer 1210 to a second side of the bearing spacer 1210 and through the bearing spacer 1210. The holes 1212 may be replaced by one or more slots, perforations, or other openings that connect the first and second sides of the bearing spacer 1210 through the bearing spacer 1210. The holes 1212 can further facilitate airflow through the bearing support 1100 and/or around the bearings 1205 in order to further dissipate heat and provide cooling. The bearing spacer 1210 also includes the keyway 1211 introduced above that can lock rotation of the bearing spacer 1210 around the end section 1216 and the keyway 1214 that can lock rotation of the bearing spacer 1210 inside the interior portion 1108.

In the illustrated embodiment of FIG. 13, on either side of the bearing spacer 1210, a lip 1213a and/or 1213b is affixed or otherwise extends (in a direction parallel to the axis of the shaft 1215, for example) from a main body of the bearing spacer 1210. The lips 1213a and 1213b may extend from the first and second sides of the bearing spacer 1210 and create the gaps between the bearing 1205a and the bearing spacer 1210 and the bearing spacer 1210 and the bearing 1205b discussed above. In some embodiments, the lips 1213a and 1213b have a height that defines the predetermined length gap. For example, the lips 1213a and 1213b have a height of 1 mm, 2 mm, 3 mm, 4 mm, 5 mm, 6, mm, 7 mm, 8 mm, 9 mm, or 10 mm in length and so forth, or any value therebetween. The height of the lips 1213 can be measured along a direction parallel to the axis of the shaft 1214 (when assembled). For example, the lips 1213 have a width (for example extending along the sides of the bearing spacer 1210) of 1 mm, 2 mm, 3 mm, 4 mm, 5 mm, 6, mm, 7 mm, 8 mm, 9 mm, or 10 mm in length and so forth, or any value therebetween. The width of the lips 1213 may be short enough to not impede air flow between the inner and outer rings of the bearing 1205a and 1205b. The width of the lips 1213 can be measured in a radial direction (e.g., a direction perpendicular to the axis of the shaft 1215 (when assembled)).

In some embodiments, the lips 1213 comprise one or more indentations, dimples, fingers, channels, or tabs (each hereinafter referred to as indentations) at a location where the bearings 1205 contact the lips 1213. The one or more indentations may allow air to flow around the bearing 1205 within the bearing enclosure 1105. Such air flow may further reduce heat build-up around the bearing 1205 when the bearing 1205 is enabling rotation or movement in the bearing enclosure 1105. In some embodiments, the one or more indentations may be of varying depths, shapes, lengths, and heights. For example, the one or more indentations in the lips 1213 may have a depth in the thousandths of an inch (for example, approximately 0.001", 0.002", 0.003", 0.004", 0.005", 0.006", 0.007", 0.008", 0.009, 0.01", 0.02", 0.1" and so forth, or any value therebetween). In some embodiments, the one or more indentations may have any shape or height or width (for example, approximately 0.001", 0.002", 0.003", 0.004", 0.005", 0.006", 0.007", 0.008", 0.009, 0.01", 0.02", 0.1" and so forth, or any value therebetween). Protrusions may also be used in place of the indentations.

Figure 14A:
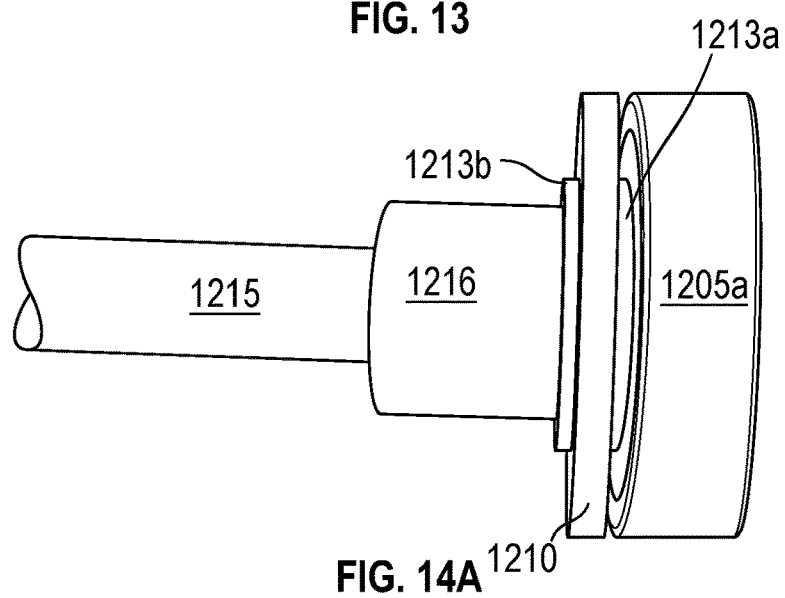
FIGS. 14A-14C show different views of a partial construction of the bearing assembly of FIGS. 12A-12C, the partial construction including a first bearing, the bearing spacer, and the shaft.
Figure 14B:
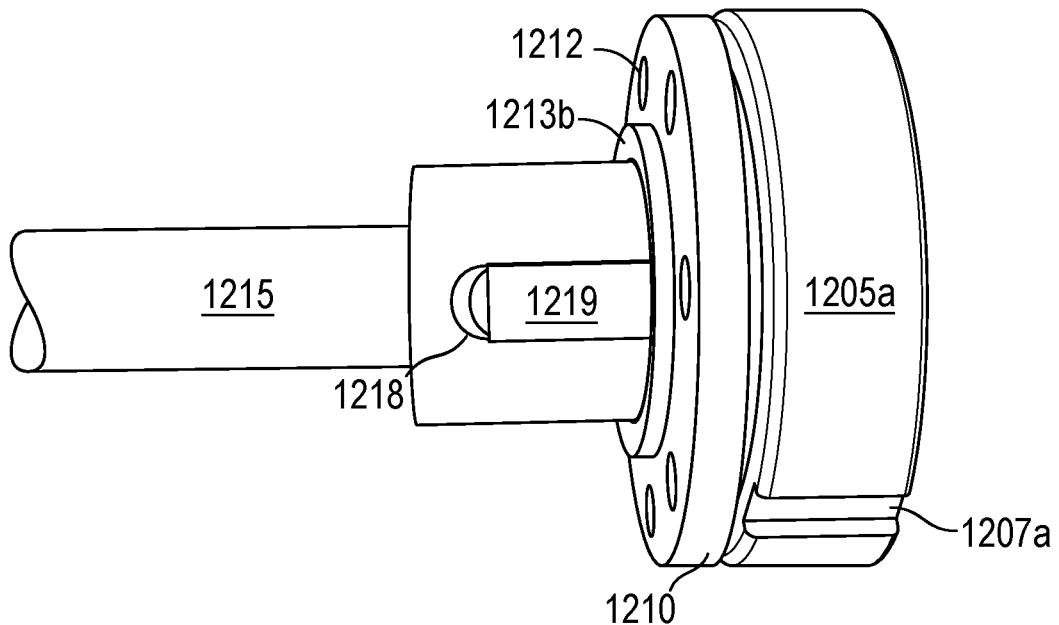
Figure 14C:
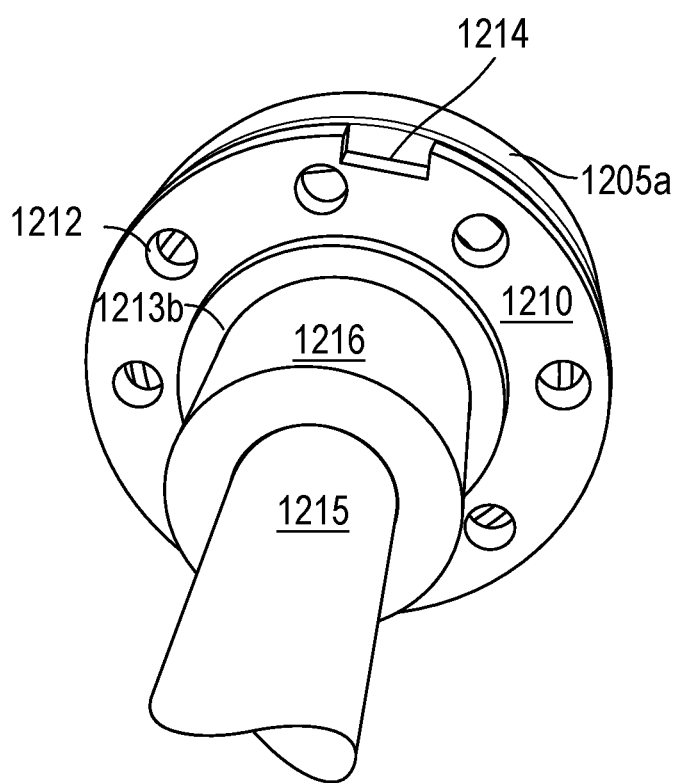

FIGS. 14A-14C show different views of a partial construction of the bearing assembly 1100 of FIGS. 11A-12C, the partial construction including the first bearing 1205a, the bearing spacer 1210, and the shaft 1215.

FIG. 14A shows a top down view of the partial construction of the bearing assembly 1110. The partial construction of the bearing assembly 1110 shown also includes the end section 1216 of the shaft 1215 and some of the middle section 1217. FIG. 14A also shows the gap between the bearing 1205a and the bearing spacer 1210. Further details regarding the bearing spacer 1210 are provided below with reference to FIG. 13.

FIG. 14B shows a slight perspective view of the partial construction of the bearing assembly 1110. The bearing assembly 1110 shown includes the end section 1216 of the shaft 1215, some of the middle section 1217, a portion of the keyway 1218 in the end section 1216 that prevents rotation of the bearings 1205a and 1205b and the bearing spacer 1210 around the end section 1216, and a portion of the key 1219 that slides into the keyway 1218 in the end section and into the keyways 1206a and 1206b of the bearings 1205a and 1205b and keyway 1211 of the bearing spacer 1210. FIG. 14B also shows the gap between the bearing 1205a and the bearing spacer 1210. Additionally, the bearing 1205a also includes the keyway 1207a that is shown in FIG. 12A, while the keyway 1211 for the bearing spacer 1210 is not shown. As shown, the key 1219 may prevent the first bearing 1205a and the bearing spacer 1210 from spinning or rotating on the end section 1216.

FIG. 14C shows a perspective view of the partial construction of the bearing assembly 1110. The bearing assembly 1110 shown also includes the end section 1216 of the shaft 1215 and some of the middle section 1217. FIG. 14C also shows the keyway 1214 of the bearing spacer 1210 and the lip 1213 that would separate the bearing spacer 1210 from the bearing 1205b with the gap between the bearing 1205b and the bearing spacer 1210 as described above.

Additionally, the bearing spacer 1210 includes the number of holes 1212 that enable air flow between the first and second sides of the bearing spacer 1210.

Exemplary Embodiments

The below items recite example use cases and are not meant to be limiting to the disclosure herein.

Item #:

1. A apparatus for providing electrical charge to a vehicle, comprising: (a) a driven mass configured to rotate in response to a kinetic energy of the vehicle, the driven mass coupled to a shaft such that rotation of the driven mass causes the shaft to rotate, wherein the driven mass exists in one of (1) an extended position in which the kinetic energy of the vehicle causes the driven mass to rotate and (2) a retracted position in which the kinetic energy of the vehicle does not cause the driven mass to rotate; (b) a generator configured to generate an electrical output based on a mechanical input, the mechanical input mechanically coupled to the shaft such that rotation of the shaft causes the mechanical input to rotate; (c) a charger electrically coupled to the generator and configured to: (c1) receive the electrical output from the generator, (c2) generate a charge output based on the electrical output, and (c3) convey the charge output to the vehicle; (d) a hardware controller configured to control whether the driven mass is in the extended position or the retracted position in response to a signal received from a communication circuit; and (e) the communication circuit configured to receive the signal from a vehicle controller.

2. The apparatus of item 1, wherein the driven mass comprises a wheel, and wherein the extended position comprises the wheel positioned in contact with a ground surface on which the vehicle travels.

3. The apparatus of any of items 1-2, wherein the charger comprises a charging cable coupled to a charging port of the vehicle and wherein the charge output is conveyed to the vehicle via the charging cable and the charging port.

4. The apparatus of item 3 further comprising a circuit element positioned in series with the generator and the charger, wherein the circuit element creates an open circuit between the generator and the charging port of the vehicle.

5. The apparatus of any of items 1-4 further comprising a filtering circuit configured to filter the electrical output from the generator before the electrical output from the generator is received by the charger, wherein filtering the electrical output includes one or more of filtering, cleaning, matching, converting, and conditioning the electrical output to reduce risk of damage to the charger by the electrical output.

6. The apparatus of any of items 1-5, wherein the driven mass comprises a gear, and wherein the extended position comprises the gear engaged with one or more of a drive shaft, a motor, and a wheel of the vehicle.

7. The apparatus of any of items 1-6, wherein the mechanical input is mechanically coupled to the shaft by one or more of a chain, a belt, a gearing system, and a pulley system.

8. The apparatus of any of items 1-7 further comprising an energy storage device configured to store any excess portion of the charge conveyed to the vehicle when a vehicle battery or a vehicle motor is unable to accept all portions of the charge output conveyed from the charger.

9. The apparatus of item 8, wherein the energy storage device is further configured to convey the excess portion of the charge to the vehicle energy storage device or to the vehicle motor on demand.

10. The apparatus of items 1-9, further comprising a battery storage device and a capacitor storage device, wherein the capacitor storage device is configured to: (a) receive at least a portion of the charge output, (b) store at least the portion of the charge output, and (c) convey at least the portion of the charge output to the battery storage device in one or more bursts based on a charge level of the battery storage device dropping below a threshold value.

11. A method of providing electrical charge to a vehicle, comprising: (a) rotating a driven mass in response to a kinetic energy of the vehicle, the driven mass coupled to a shaft such that rotation of the driven mass causes the shaft to rotate, wherein the driven mass exists in (1) an extended position in which the kinetic energy of the vehicle causes the driven mass to rotate and (2) a retracted position in which the kinetic energy of the vehicle does not cause the driven mass to rotate; (b) generating, via a generator, an electrical output based on a mechanical input via a generator, the generator having a mechanical input mechanically coupled to the shaft such that rotation of the shaft causes the mechanical input to rotate; (c) generating a charge output based on the electrical output; (d) conveying the charge output to the vehicle; (e) controlling whether the driven mass is in the extended position or the retracted position in response to a signal received from a vehicle controller; and (f) receiving the signal from the vehicle controller.

12. The method of item 11, wherein the driven mass comprises a wheel, and wherein the extended position comprises the wheel positioned in contact with a ground surface on which the vehicle travels.

13. The method of any of items 11-12, wherein conveying the charge output to the vehicle comprises conveying the charge output via a charging cable coupled to a charging port of the vehicle.

14. The method of item 13, further comprising creating an open circuit between the generator and the charging port of the vehicle via a circuit element.

15. The method of any of items 11-14 further comprising filtering the electrical output from the generator before the electrical output from the generator is received by the charger, wherein filtering the electrical output includes one or more of filtering, cleaning, matching, converting, and conditioning the electrical output to reduce risk of damage to the charger by the electrical output.

16. The method of any of items 11-15, wherein the driven mass comprises a gear, and wherein the extended position comprises the gear engaged with one or more of a drive shaft, a motor, and a wheel of the vehicle.

17. The method of any of items 11-16, wherein the mechanical input is mechanically coupled to the shaft by one or more of a chain, a belt, a gearing system, and a pulley system.

18. The method of any of items 11-17 further comprising storing any excess portion of the charge conveyed to the vehicle when a vehicle battery or a vehicle motor is unable to accept all portions of the charge output conveyed from the charger.

19. The method of item 18 further comprising conveying the excess portion of the charge from the energy storage device to the vehicle energy storage device or to the vehicle on demand.

20. The method of any of items 11-19 further comprising: (a) receiving at least a portion of the charge output at a capacitor storage device; (b) storing at least the portion of the charge output in the capacitor storage device; and (c) conveying at least the portion of the charge output to a battery storage device in one or more bursts based on a charge level of the battery storage device dropping below a threshold value.

21. The apparatus of any of items 1-10, wherein the mechanical input further comprises a flywheel configured to drive the generator to generate the electrical output.

22. The apparatus of item 21, further comprising a one-way bearing having a first side and a second side, wherein the one-way bearing is configured to allow the first side rotate independently of the second side.

23. The apparatus of item 22, wherein the flywheel is mechanically coupled to the first side of the one-way bearing, the shaft is coupled to the second side, wherein the one-way bearing is configured to allow the flywheel rotate independently of the shaft.

24. The apparatus of any of items 1-10 and 21-23 further comprising an independent suspension that supports the driven mass and the generator independently from a suspension of the vehicle, wherein the independent suspension comprises one of a linkage, a spring, and a shock absorber.

25. The apparatus of any of items 1-10 and 21-24, wherein the generator is switchable such that the electrical output is pulsed in a first switched setting and is constant in a second switched setting.

26. The apparatus of any of items 1-10 and 21-25 further comprising a capacitor and switch assembly configured to provide a backup energy storage for high voltage transfer the electrical output generated by the generator.

27. The method of any of items 11-20, wherein the mechanical input comprises a flywheel configured to drive the generator to generate the electrical output.

28. The method of item 27, wherein the mechanical input further comprises a one-way bearing having a first side and a second side, wherein the one-way bearing is configured to allow the first side rotate independently of the second side in a first direction of rotation and with the second side in a second direction of rotation.

29. The method of item 28, wherein the flywheel is mechanically coupled to the first side of the one-way bearing, the shaft is coupled to the second side, wherein the one-way bearing is configured to allow the flywheel rotate independently of the shaft in the first direction of rotation and with the shaft in the second direction of rotation.

30. The method of any of items 11-20 and 27-29, further comprising supporting, via an independent suspension, the driven mass and the generator independently from a suspension of the vehicle, wherein the independent suspension comprises one of a linkage, a spring, and a shock absorber.

31. The method of any of items 11-20 and 27-30, further comprising switching the generator such that the electrical output is pulsed in a first switched setting and is constant in a second switched setting.

32. The method of any of items 11-20 and 27-31, further comprising performing a voltage dump from the generator output terminal via a capacitor, a switch assembly, and a backup energy storage.
33. An apparatus for providing electrical charge to a vehicle, comprising: (a) a driven mass configured to rotate in response to a kinetic energy of the vehicle, the driven mass coupled to a shaft such that rotation of the driven mass causes the shaft to rotate; (b) a generator configured to generate an electrical output at a generator output terminal based on a mechanical input, the mechanical input mechanically coupled to the shaft such that rotation of the shaft causes the mechanical input to rotate; (c) a capacitor module selectively and electrically coupled to the generator output terminal and configured to: (c1) receive a first portion of the electrical output generated by the generator, (c2) store the first portion of the electrical output as a first energy as an electric field of the capacitor module, and (c3) convey the first energy to a load of the vehicle on demand; (d) a battery module selectively and electrically coupled to the generator output terminal and configured to: (d1) receive a second portion of the electrical output generated by the generator, (d2) store the second portion of the electrical output as a second energy in a chemical energy form, and (d3) convey the second energy to the load of the vehicle on demand; and (e) a hardware controller configured to control whether the capacitor module, the battery module, or a combination of the capacitor module and the battery module is coupled to the generator output terminal in response to a received signal.
34. The apparatus of item 33, wherein the mechanical input comprises a flywheel configured to store mechanical energy received from the driven mass.
35. The apparatus of item 34, further comprising a one-way bearing having a first side and a second side, wherein the one-way bearing is configured to allow the first side rotate independently of the second side in a first direction of rotation and together with the second side in a second direction of rotation.
36. The apparatus of item 35, wherein the flywheel is mechanically coupled to the first side of the one-way bearing, wherein the shaft is coupled to the second side, and wherein the one-way bearing is configured to allow the flywheel rotate independently of the shaft in the first direction of rotation and together with the shaft in the second direction of rotation.
37. The apparatus of any of items 1-10, 21-26, and 33-36, further comprising an independent suspension that supports the driven mass and the generator independently from a suspension of the vehicle, wherein the independent suspension comprises one of a linkage, a spring, and a shock absorber.
38. A method of providing electrical charge to a vehicle, comprising: (a) rotating a driven mass in response to a kinetic energy of the vehicle, the driven mass coupled to a shaft such that rotation of the driven mass causes the shaft to rotate; (b) generating, via generator, an electrical output at a generator output terminal of the generator based on a mechanical input, the mechanical input mechanically coupled to the shaft such that rotation of the shaft causes the mechanical input to rotate; (c) conveying a first portion of the electrical output generated by the generator to a capacitor module selectively and electrically coupled to the generator output terminal; (d) storing the first portion of the electrical output as a first energy in an electric field of the capacitor module; (e) conveying the first energy to a load of the vehicle on demand; (f) conveying a second portion of the electrical output to a battery module selectively and electrically coupled to the generator output terminal; (g) storing the second portion of the electrical output as a second energy in a chemical energy form; and (h) controlling whether the capacitor module, the battery module, or a combination of the capacitor module and the battery module is coupled to the generator output terminal in response to a received signal.
39. The method of item 38, wherein the mechanical input comprises a flywheel configured to store mechanical energy received from the driven mass.
40. The method of item 39, wherein the mechanical input further comprises a one-way bearing having a first side and a second side, wherein the one-way bearing is configured to allow the first side rotate independently of the second side in a first direction of rotation and together with the second side in a second direction of rotation.
41. The method of item 40, wherein the flywheel is mechanically coupled to the first side of the one-way bearing, wherein the shaft is coupled to the second side, and wherein the one-way bearing is configured to allow the flywheel rotate independently of the shaft in the first direction of rotation and together with the shaft in the second direction of rotation.
42. The method of any of items 11-20, 27-32, and 38-41, further comprising supporting, via an independent suspension, the driven mass and the generator independently from a suspension of the vehicle, wherein the independent suspension comprises one of a linkage, a spring, and a shock absorber.
43. The apparatus for providing electrical charge to a vehicle, comprising: (a) a driven mass configured to rotate in response to a kinetic energy of the vehicle, the driven mass coupled to a shaft such that rotation of the driven mass causes the shaft to rotate; (b) a generator configured to generate an electrical output at a generator output terminal based on a mechanical input, the mechanical input mechanically coupled to the shaft such that rotation of the shaft causes the mechanical input to rotate; (c) a hardware controller configured to: (c1) convey at least a first portion of the electrical output to one of a capacitor module, a battery, and a motor of the vehicle, each of the capacitor module, the battery, and the motor selectively coupled to the generator output terminal, (c2) disconnect the generator output terminal from the capacitor module, the battery, and the motor in response to an interrupt signal received, (c3) initiate a dump of a residual electrical energy in the generator for a period of time, and (c4) connect the generator output terminal to one of the capacitor module, the battery, and the motor of the vehicle after the period of time expires, wherein the interrupt signal is generated by a controller in response to one or more conditions.
44. The apparatus of item 43, wherein the interrupt signal is received at periodic intervals defined based on at least one of a period of time following a previous interrupt signal, a distance traveled by the vehicle, a speed of the vehicle, and a power generated by the generator.
45. The apparatus of item 44, wherein the hardware controller configured to dump the residual electrical energy comprises the hardware controller being configured to: (a) electrically couple the generator output terminal to a dump load for the period of time, and (b) disconnect the generator output terminal from the dump load after the period of time passes, wherein the dump load comprises one or more of a back-up battery or capacitor.

46. A method of providing electrical charge to a vehicle, comprising: (a) rotating a driven mass in response to a kinetic energy of the vehicle, the driven mass coupled to a shaft such that rotation of the driven mass causes the shaft to rotate; (b) generating an electrical output at a generator output terminal based on a mechanical input, the mechanical input mechanically coupled to the shaft such that rotation of the shaft causes the mechanical input to rotate; (c) conveying at least a first portion of the electrical output to one of a capacitor module, a battery, and a motor of the vehicle selectively coupled to the generator output terminal; (d) disconnecting the generator output terminal from the capacitor module, the battery, and the motor in response to an interrupt signal received; (e) dumping a residual electrical energy in the generator for a period of time; and (f) connecting the generator output terminal to one of the capacitor module, the battery, and the motor of the vehicle after the period of time expires, wherein the interrupt signal is generated by a controller in response to one or more conditions.

47. The method of item 46, wherein the interrupt signal is received at periodic intervals defined based on at least one of a period of time following a previous interrupt signal, a distance traveled by the vehicle, a speed of the vehicle, and a power generated by the generator.

48. The method of item 47, wherein dumping the residual electrical energy comprises: (a) electrically coupling the generator output terminal to a dump load for the period of time; and (b) disconnecting the generator output terminal from the dump load after the period of time passes, wherein the dump load comprises one or more of a back-up battery or capacitor.

49. An apparatus for providing electrical charge to a vehicle, comprising: (a) a motor configured to place the vehicle in motion; (b) a driven mass configured to rotate in response to a kinetic energy of the vehicle generated when the vehicle is in motion, the driven mass coupled to a shaft such that rotation of the driven mass causes the shaft to rotate; (c) a generator configured to generate an electrical output at a generator output terminal based on rotation of a mechanical input, the mechanical input mechanically coupled to the shaft such that rotation of the shaft causes the mechanical input to rotate; (d) a capacitor module selectively and electrically coupled to the generator output terminal and configured to: (d1) receive a portion of the electrical output generated by the generator, (d2) store the portion of the electrical output as an electric field of the capacitor module when the battery has a charge that exceeds a threshold value, and (d3) convey the first energy to a load of the vehicle on demand, (e) a hardware controller configured to control the motor, the generator, and coupling of the capacitor module to the generator module, wherein the electrical output generated is greater than or equal to a consumption of the motor of the vehicle when the vehicle is in motion.

50. A method of providing electrical charge to a vehicle, comprising: (a) rotating a driven mass in response to a kinetic energy of the vehicle, the driven mass coupled to a shaft such that rotation of the driven mass causes the shaft to rotate; (b) generating, by a generator, an electrical output at a generator output terminal based on rotation of a mechanical input, the mechanical input mechanically coupled to the shaft such that rotation of the shaft causes the mechanical input to rotate; (c) conveying a portion of the electrical output to a capacitor module selectively coupled to the generator output terminal with a battery of the vehicle; and (d) storing the portion of the electrical output in the capacitor module when the battery has a charge that exceeds a threshold value, wherein the electrical output generated by the generator is greater than or equal to a consumption of a motor of the vehicle when the vehicle in motion.

Additional Embodiments

As described herein, the generators 302a and 302b may be configured to generate a voltage of any amount, type, and so forth, for example, as specified by an operating voltage of the battery 102 and/or a bus voltage of the BEV 100/500. As such, any of the deep cycle battery 504 and the capacitor modules 502 may also have operating voltages corresponding to that of the battery 102. In some embodiments, the deep cycle battery 504 and/or the capacitor modules 502 have different operating voltages and are coupled to the battery 102 via one or more converter devices, for example the DC-to-DC converter 506. As such, the OBCS 210 and corresponding components described herein may operate at various voltages for the BEV 100/500.

As used herein, "system," "instrument," "apparatus," and "device" generally encompass both the hardware (for example, mechanical and electronic) and, in some implementations, associated software (for example, specialized computer programs for graphics control) components.

Further, the data processing and interactive and dynamic user interfaces described herein are enabled by innovations in efficient data processing and interactions between the user interfaces and underlying systems and components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein a "data storage system" may be embodied in computing system that utilizes hard disk drives, solid state memories and/or any other type of non-transitory computer-readable storage medium accessible to or by a device such as an access device, server, or other computing device described. A data storage system may also or alternatively be distributed or partitioned across multiple local and/or remote storage devices as is known in the art without departing from the scope of the present disclosure. In yet other embodiments, a data storage system may include or be embodied in a data storage web service.

As used herein, the terms "determine" or "determining" encompass a wide variety of actions. For example, "determining" may include calculating, computing, processing, deriving, looking up (for example, looking up in a table, a database or another data structure), ascertaining and the like. Also, "determining" may include receiving (for example, receiving information), accessing (for example, accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (for example, send or receive data) in accordance with one or more of the aspects described.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed is:

1. An apparatus for providing electrical charge to a vehicle, the apparatus comprising:
   a driven mass configured to rotate in response to a kinetic energy of the vehicle, the driven mass coupled to a shaft such that rotation of the driven mass causes the shaft to rotate, wherein the driven mass exists in one of (1) an extended position in which the kinetic energy of the vehicle causes the driven mass to rotate and (2) a retracted position in which the kinetic energy of the vehicle does not cause the driven mass to rotate;
   a generator configured to generate an electrical output based on a mechanical input, the mechanical input mechanically coupled to the shaft such that rotation of the shaft causes the mechanical input to rotate;
   a charger electrically coupled to the generator and configured to:
      receive the electrical output from the generator, generate a charge output based on the electrical output, and convey the charge output to the vehicle; and an energy storage device configured to:
store a portion of the charge conveyed to the vehicle from the charger, and convey the portion of the charge to a battery of the vehicle.

2. The apparatus of claim 1, wherein the driven mass comprises a wheel, and wherein the extended position comprises the wheel positioned in contact with a ground surface on which the vehicle travels.

3. The apparatus of claim 1, wherein the charger comprises a charging cable coupled to a charging port of the vehicle and wherein the charge output is conveyed to the vehicle via the charging cable and the charging port.

4. The apparatus of claim 3, further comprising a circuit element positioned in series with the generator and the charger, wherein the circuit element creates an open circuit between the generator and the charging port of the vehicle.

5. The apparatus of claim 1, further comprising a filtering circuit configured to filter the electrical output from the generator before the electrical output from the generator is received by the charger, wherein filtering the electrical output includes one or more of filtering, cleaning, matching, converting, and conditioning the electrical output to reduce risk of damage to the charger by the electrical output.

6. The apparatus of claim 1, wherein the driven mass comprises a gear, and wherein the extended position comprises the gear engaged with one or more of a drive shaft, a motor, and a wheel of the vehicle.

7. The apparatus of claim 1, wherein the mechanical input is mechanically coupled to the shaft by one or more of a chain, a belt, a gearing system, and a pulley system.

8. The apparatus of claim 1, wherein the energy storage device comprises a capacitor storage device.

9. The apparatus of claim 8, wherein the capacitor storage device is configured to:
convey at least the portion of the charge output to the battery in one or more bursts.

10. The apparatus of claim 8, wherein the capacitor storage device comprises a plurality of ultra-capacitors.

11. The apparatus of claim 1, wherein the energy storage device is further configured to convey the portion of the charge to a motor of the vehicle on demand.

12. A method of providing electrical charge to a vehicle, the method comprising:

rotating a driven mass in response to a kinetic energy of the vehicle, the driven mass coupled to a shaft such that rotation of the driven mass causes the shaft to rotate, wherein the driven mass exists in (1) an extended position in which the kinetic energy of the vehicle causes the driven mass to rotate and (2) a retracted position in which the kinetic energy of the vehicle does not cause the driven mass to rotate;

generating, via a generator, an electrical output based on a mechanical input via a generator, the generator having a mechanical input mechanically coupled to the shaft such that rotation of the shaft causes the mechanical input to rotate;

generating a charge output based on the electrical output;

conveying the charge output to the vehicle;

storing, in an energy storage device, a portion of the charge conveyed to the vehicle from the charger; and conveying the portion of the charge from the energy storage device to a battery or the vehicle.

13. The method of claim 12, wherein the driven mass comprises a wheel, and wherein the extended position comprises the wheel positioned in contact with a ground surface on which the vehicle travels.

14. The method of claim 12, wherein the driven mass comprises a gear, and wherein the extended position comprises the gear engaged with one or more of a drive shaft, a motor, and a wheel of the vehicle.

15. The method of claim 12, wherein the mechanical input is mechanically coupled to the shaft by one or more of a chain, a belt, a gearing system, and a pulley system.

16. The method of claim 12, wherein the energy storage device comprises a battery storage device.

17. The method of claim 12, further comprising conveying the portion of the charge from the energy storage device to a motor of the vehicle on demand.

18. The method of claim 12, wherein the energy storage device comprises a capacitor storage device.

19. The method of claim 12, further comprising conveying at least the portion of the charge from the energy storage device to the battery in one or more bursts.

20. The method of claim 12, further comprising conveying at least the portion of the charge output from the energy storage device to the battery based, at least in part, on a charge level of the battery dropping below a threshold value.

* * * * *